July 21, 1964 J. R. DAVEY ETAL 3,141,928

DISCRETE ADDRESS TIME DIVISION MULTIPLEX DATA TRANSMISSION SYSTEM

Filed Nov. 28, 1955 19 Sheets-Sheet 1

INVENTORS J. R. DAVEY, D. MITCHELL, B. OSTENDORF, JR., W. T. REA.

BY John E. Cassidy

ATTORNEY

INVENTORS J. R. DAVEY
D. MITCHELL
B. OSTENDORF, JR.
W. T. REA

BY *John E. Cassidy*
ATTORNEY

INVENTORS J. R. DAVEY
D. MITCHELL
B. OSTENDORF, JR.
W. T. REA
BY John E. Cassidy
ATTORNEY INVENTORS J. R. DAVEY
D. MITCHELL
B. OSTENDORF, JR.
W. T. REA
BY John E. Cassidy
ATTORNEY INVENTORS J. R. DAVEY
D. MITCHELL
B. OSTENDORF, JR.
W. T. REA
BY John E. Cassidy
ATTORNEY

INVENTORS J. R. DAVEY
D. MITCHELL
B. OSTENDORF, JR.
W. T. REA

BY John E. Cassidy
ATTORNEY

INVENTORS J. R. DAVEY
D. MITCHELL
B. OSTENDORF, JR.
W. T. REA
BY John E. Cassidy
ATTORNEY INVENTORS J. R. DAVEY
D. MITCHELL
B. OSTENDORF, JR.
W. T. REA
BY John E. Cassidy
ATTORNEY INVENTORS J. R. DAVEY
D. MITCHELL
B. OSTENDORF, JR.
W. T. REA
BY John E. Cassidy
ATTORNEY INVENTORS J. R. DAVEY
D. MITCHELL
B. OSTENDORF, JR.
W. T. REA
BY John E. Cassidy
ATTORNEY INVENTORS J. R. DAVEY
D. MITCHELL
B. OSTENDORF, JR.
W. T. REA
BY John E. Cassidy
ATTORNEY July 21, 1964 J. R. DAVEY ETAL 3,141,928

DISCRETE ADDRESS TIME DIVISION MULTIPLEX DATA TRANSMISSION SYSTEM

Filed Nov. 28, 1955 19 Sheets-Sheet 12

INVENTORS J. R. DAVEY
D. MITCHELL
B. OSTENDORF, JR.
W. T. REA

BY John E. Cassidy
ATTORNEY

INVENTORS J. R. DAVEY
D. MITCHELL
B. OSTENDORF, JR.
W. T. REA
BY John E. Cassidy
ATTORNEY INVENTORS J. R. DAVEY
D. MITCHELL
B. OSTENDORF, JR.
W. T. REA
BY John E. Cassidy
ATTORNEY INVENTORS J. R. DAVEY
D. MITCHELL
B. OSTENDORF, JR.
W. T. REA
BY John E. Cassidy
ATTORNEY INVENTORS J. R. DAVEY
D. MITCHELL
B. OSTENDORF, JR.
W. T. REA
BY John E. Cassidy
ATTORNEY INVENTORS J. R. DAVEY
D. MITCHELL
B. OSTENDORF, JR.
W. T. REA
BY
John E. Cassidy
ATTORNEY

CIRCUITS AT CONTROL CENTER
INDIVIDUAL TO EACH PLANE POSITION

INVENTORS J. R. DAVEY
D. MITCHELL
B. OSTENDORF, JR.
W. T. REA
BY
John E. Cassidy
ATTORNEY

COMMON CIRCUITS AT CONTROL CENTER

INVENTORS J. R. DAVEY
D. MITCHELL
B. OSTENDORF, JR.
W. T. REA
BY John E. Cassidy
ATTORNEY 3,141,928

DISCRETE ADDRESS TIME DIVISION MULTIPLEX DATA TRANSMISSION SYSTEM

James R. Davey, Franklin Township, Somerset County, and Doren Mitchell, Martinsville, N.J., Bernard Ostendorf, Jr., Stamford, Conn., and Wilton T. Rea, Bernardsville, N.J., assignors to Bell Telephone Laboratories, Incorporated, New York, N.Y., a corporation of New York Filed Nov. 28, 1955, Ser. No. 549,402
31 Claims. (Cl. 178—50)

This invention is an improved high-speed time division multiplex start-stop two-way radio telegraph system in which information may be transmitted selectively between a control center and a large number of outlying stations.

An object of the invention is the improvement of high-speed telegraph systems.

The manner in which the system of the invention functions will first be described generally as an aid in understanding the detailed description hereinafter.

The system incorporates arrangements whereby a single one of a large number of outlying stations may be selectively addressed from a control center and responsively the telegraph receiving apparatus in the selected station is adjusted to receive information intended solely for the selected station while all of the unaddressed stations in the systems are prevented from effectively receiving the information intended expressly for the addressed station. Thereafter, the selected station automatically transmits to the control station. It is to be understood that, instead of a single station, a plurality of the outlying stations may be arranged to be addressed simultaneously if desired by assigning to each of the plurality the same code signal station calling combination.

The invention is the present embodiment is incorporated in a data transmission system in which, following selection of the addressed station, data from the control center individual to the addressed station is effectively received by the addressed station exclusively, and data from the addressed station is thereafter automatically transmitted to the control center. Such a system may be defined, in one of its aspects, as a discrete address system, this term signifying that any one of the outlying stations may be individually selected or discretely addressed.

When a particular outlying station is addressed or when a return signal train is transmitted to the control center, each signal train, or frame, as it shall be called hereinafter, transmitted in a particular direction, consists of a fixed number of signal elements, each signal element of uniform duration so that all frames transmitted in a particular direction are of uniform duration. Transmission and reception are under control of oscillators and binary counters. There is one transmitting oscillator and one transmitting binary counter and one receiving oscillator and one receiving binary counter at the control center. There is a single oscillator and a single binary counter in each outlying station which jointly control the transmitting and receiving at the outlying stations.

In one application of the invention, the system is employed as a means of communicating from a control center, which may be an airport or a vessel, such as an airplane carrier, to any one of a large group of airplanes in flight. The telegraph system operates on a multiplex or time division start-stop basis over a single radio channel in each direction. Each one of the airplanes in a group may be addressed in any desired sequence. Each frame of signals generated at the control center intended for any particular outlying station or airplane in the group will include in the first portion of the frame a sequence of signal elements which are preparatory signal elements. These include a first group of phasing signal elements followed by a waiting interval equal in duration to an integral number of signal elements and then a start signal element. The function of the phasing, waiting and start signal elements is to start an individual oscillator in all planes or outlying stations in proper phase at the center of the start signal element. This portion of each train, that is the phasing, waiting and start signal elements, is followed by an individual code combination of signals defining the address of the particular called plane or station. All of the airplanes or stations, after having their individual oscillators set in proper phase will also receive the address signal combination in each frame and will then test the received address signal combination to see whether or not the received address combination corresponds to the address combination assigned to its particular plane. The plane which is identified by the correspondence of the received and assigned address combinations will thereupon condition its telegraph apparatus to effectively receive the remaining portion of the signal frame. The telegraph apparatus in all other planes will be restored to normal. The remaining portion of the signal frame will be divided into a plurality of code groups or combinations of elements, hereafter to be called words, each word containing specific information intended for the single plane which has been effectively addressed. Thereafter, the plane which has been addressed is arranged to automatically transmit a frame of signal elements containing phasing, waiting and start signal sequences and combinations defining words containing information, specific to the plane which was addressed, to the control center such as the airport or carrier. No address is included in the frames transmitted from the outlying stations to the control center as, since in the present embodiment there is but one control center, no address is required. The information in the words transmitted from the plane to the control center, such as the altitude, speed and bearing of the plane, will be first measured automatically by proper instruments. The measurements will then be automatically translated into code signal combinations defining them. Certain items defined by one or two signal elements of a word may be set up manually by the plane operator.

In general, after the address, the information contained in the code combinations of signals defining the words in each frame, which is transmitted in either direction between the control center and the station will depend upon the particular needs of the system in which the invention is applied. In an airport traffic control system, the individual items of information may relate, for instance, to weather reports, visibility, traffic density, crusing altitude allocation, etc. In another application, they may comprise code signal combinations to control the performance of functions such as the reading of meters and the automatic retransmission from the addressed station to the control center of code signal combinations or words defining the usage of utility services at remote stations, or the reading and retransmission of code signal combinations defining barometric pressure, temperature, wind velocity etc. at outlying weather observatories in a weather system.

Since, in the present embodiment, the invention is considered to be incorporated in a system wherein a large number of friendly airplanes in flight are directed, from a ground control center or from an airplane carrier, on individual missions, for instance, to intercept enemy planes, the information in the words is designed to facilitate this objective. The enemy planes will ordinarily be flying on different courses at different altitudes and at different speeds from the friendly planes. The information received by the individual airplane is intended to enable the pilot of the addressed plane to adjust his direction, altitude and speed to effect the interception. The addressed plane in turn transmits information as to its own specific bearing, speed, altitude, etc. to the control center.

The rate at which the signal elements comprising the various frames, addressed from the control station to the individual aircraft, are generated at the control terminal is under control of the transmitting oscillator at the control terminal. The individual oscillator in each airplane, after being set into operation under control of the incoming signals preceding the address signals in each frame, operates at the same frequency as that of the transmitting oscillator at the control center.

The signal elements in each time slot in each frame are pulses which may be of either of two conditions. These two conditions will hereinafter be termined "1's" and "0's", respectively. Omitting for the present a consideration of the preliminary phasing, waiting and start pulses, it is pointed out that in the present embodiment the address and each of the words in each frame consist of 12 signal elements arranged in any combination of "1's" and "0's" which taken together define a quantity, for instance, and a final "1" or "0" used as a check or parity count to be described hereinafter, making a total of 13 signal elements in each address and in each word in each frame.

In the present embodiment, the control center or carrier will first address and transmit to two planes in succession. Then the transmitter at the control station will be shut off and its receiver will be adjusted to receive from these two planes. Then the cycle will be repeated with two other planes. This necessitates circuits to control the cycles of transmitting and receiving both at the control terminal and at each outlying station. In the present embodiment also, an individual radio transmitter and an individual radio receiver will be employed at the control terminal. To economize in the weight of the airborne equipment, in the case of the planes, a combined radio transmitter and receiver will be employed and it will be controlled so as to receive and transmit at the proper times.

The code combinations defining the address and the data which are to be transmitted from the control terminal to the aircraft may be set up at the control terminal at individual positions for each plane or outlying station. The code combination defining the address may be established, for instance, by actuating each of a plurality of contacts to either its closed or open position. If it is assumed that 12 contacts are employed, the total number of code combinations which may be produced and of individual planes or outlying stations which may be addressed is $2^{12}$ or 4096. The items of information or words may be produced by adjusting dials so that they are in registry with encoding means which produce a code combination of signals identifying a quantity defining a measurement. The dials may be arranged so that they present opaque or translucent areas in the paths of light beams directed to impinge on phototransistors which generate pulses defining code combinations corresponding to the positions of the dials. These contacts, or dials, or other means, will be positioned in advance manually, mechanically or electrically and all of the code combinations defining the address and each of the words will be impressed, each combination in its entirety, and the various combinations in sequence, first on a transmitting shift register associated with each individual plane control point at the control center. The transfer of the information from the encoding devices to the shift register will be under control of electronic gates opened under control of a transmitting binary counter at definite numbered positions in each signal frame. The transmitting oscillator at the control center operates the transmitting binary counter to count the total number of signal elements to be transmitted in each frame. At certain numbered positions in this counting process the transmitting binary counter opens the various gates, known as matrix gates, which in turn control the transfer of information set up on the address contacts and on the word defining dials at each control position to the transmitting shift register at each control position. One particular transmitting shift register at a time is connected to the common transmitting equipment. The transmitting shift register has as many storage elements in it as there are elements in the signal combination defining the address and defining each of the words. In the present instance it is assumed that the address and each of the words has 12 elements. The transmitting shift register therefore will have 12 elements. There is an individual matrix gate controlled by the binary counter for the address and for each word. When the gate for the address is opened, for instance, the code combination, which has been set up on the 12 contacts defining the address of the particular plane which is to be called, will be transferred simultaneously to the 12 elements in the control position transmitting shift register. Deferring for the present a description of a code combination checking operation, or parity count, to be described hereinafter, as the oscillator continues to function, these 12 elements wil be read out individually in sequence and applied first to a flip-flop circuit, also controlled by the transmitting oscillator, and then will modulate the radio transmitter at the control terminal. After the address has been transmitted when the binary counter has reached the proper count another matrix gate will open and the 12 elements defining the first word will be read simultaneously into the transmitting shift register and read out of it one element at a time and impressed first on the flip-flop circuit and then on the radio transmitter. This process will be repeated until all bits of information or words required to be transmitted have in fact been transmitted.

In each program of operation, as mentioned, the control center first effectively transmits to a first plane and then to a second plane and then receives from the first plane and then from the second plane before repeating the program. After the first plane or station receives and while the second plane or station is receiving, the single combined radio receiver-transmitter in the first plane or station is switched to the transmitting condition. After the second plane or station has received, the first plane or station transmits to the central station.

While the first plane or station transmits, the second plane or station switches its combined radio receiver-transmitter to the transmitting condition and after the first plane or station has finished transmitting to the control center, the second plane or station transmits, completing the program.

The information to be transmitted to each plane or station will be accumulated at an individual control position for each plane or station at the control center. Each individual control position is arranged so that it may be effectively connected to the common transmitting equipment at the control center. When a control position has information to transmit, it will apply a condition to a gate which is arranged to give access to the common control equipment. Each control position is polled or tested in turn under control of the transmitting oscillator and its binary counter at the control center and, if found to be ready to transmit, will be effectively connected to the common transmitting equipment in the control center at the start of the following transmitting cycle.

As stated in the foregoing, the oscillators in each plane or station are set into operation in response to the preliminary or phasing, waiting and start signal elements in each frame transmitted from the control center. The address of the called plane or station is received by all.

Each oscillator in each plane or outlying station runs in phase with that of the transmitting oscillator at the control station. Each cycle of operation of the oscillators in the plane or outlying station following the start signal is counted by the individual binary counter in the planes or outlying stations. During the first cycle of operation of the oscillators in the planes or outlying stations the first signal element of the address is received and during each succeeding cycle of operation of the oscillator in the planes or outlying stations a succeeding signal element of the address is received. The total number of elements in the address are counted under control of the binary counter in the planes or outlying stations. They are impressed on an individual receiving shift register in each plane one signal element at a time until all of the address signal elements have been received. Then the entire address is tested as a unit under the joint control of the binary counter, a matrix gate which is responsive to the binary counter and an address recognizing gate. If the address is not that of the plane or outlying station, upon failing to recognize the address the oscillator therein is stopped. If the address is correct the oscillator in the addressed plane continues to operate and the binary counter to count. In the properly addressed plane, as each data signal element defining a word is received, it is impressed on the shift register, one element at a time until all of the elements of the first word are received. The incoming signals receive a parity count. If the count is satisfied, at the end of reception of the word, as indicated by the count of the binary counter, an individual matrix gate for the first word permits a pulse to pass, which transfers the word standing in the shift register to a storage device which has one storage element for each signal element in the word. The transfer from the shift register to the first-word-storage array is performed simultaneously, all of the signal elements comprising the word standing in the shift register being read out of the shift register into the individual storage array for the first word at the same time. This is known as parallel read in. The oscillator continues to operate and the binary counter to count its cycles as the second word is being received. The data signal elements of the second word are also impressed on the shift register, one element at a time. After the last element is received, the binary counter again controls an individual matrix gate to permit a pulse to pass, which, assuming that the applied parity count check for the word has been satisfied, transfers the word from the shift register to an individual storage array for the second word. The third, fourth and fifth words are similarly treated.

At the end of reception of the last word in the frame the outlying plane or station must be conditioned to transmit. It takes time to do this. The combined radio receiver in the plane must be switched over from the receiving to the transmitting condition. It is important in a high-speed system that this time should not be lost. This is the primary reason for transmitting to two planes or stations in succession and then receiving from them.

At the control center, the first signal element of the second frame which is transmitted starts immediately after the termination of the transmission of the last element of the first frame, with no interval between. The binary counter in the first plane, therefore, under control of its oscillator counts a number of signal intervals equal to the number of signal elements in a frame transmitted from the control center to the second plane. During this interval its combination radio receiver-transmitter has been switched to the transmitting condition and immediately following the counting of the last signal element of the frame transmitted to the second plane, the first plane automatically transmits a frame of signal elements to the control center.

The first portion of the frame which is transmitted from a plane or station to a control center is a group of preliminary signals comprising phasing and waiting signal elements followed by a start signal element. This portion is similar to the first portion of a frame transmitted to a plane. There are two oscillators at the control center. In addition to the transmitting oscillator which runs continuously and operates its individual binary counter to count continuously, there is a receiving oscillator which is normally at rest, as is the single oscillator on a plane, and which, like the oscillator on a plane, is set into operation in response to the preliminary signals of a received frame. The receiving oscillator at the control center has an individual binary counter. There is an individual matrix gate for each incoming word. The data signals in the incoming frame from each plane or station are directed to the particular control position which had addressed that plane or station. Each individual control position has a single receiving shift register and an individual storage register for each word. The signal elements of each word are applied successively to the receiving shift register of the individual control position assigned to the plane or station. After the shift register has been filled with any word, all of the signal elements comprising the word are first checked for parity count and then read out simultaneously under control of the receiving binary counter and the individual matrix gate assigned to the word, which gate is activated to pass the word read out pulse at the proper count. Each word is thus read out in turn to an individual word storage register. Then the words are used to control various devices. As explained the words ordinarily define magnitudes. The signal elements of the words are applied to translating devices which translate them into voltages, for instance, the magnitudes of which are linearly related to the magnitudes defined by the signal combinations of the words. The voltages are then applied to indicators or servo mechanisms.

After the reception by the control center of the first signal frame from a first plane, the receiving oscillator at the control center and its individual receiving binary counter are stopped. They are set into operation again by the preliminary signals of the frame from the second plane. Then the following data signals of this second frame are directed to the individual control position assigned to the second plane. The words of the second frame are received and treated in the manner explained in the foregoing and at the termination of reception of the signal elements of the frame from the second plane, the receiving oscillator, and its individual binary counter at the control center are stopped.

It has been explained that the transmitting oscillator and its individual binary counter at the control center run continuously. It operates through a number of cycles corresponding to the number of signal elements in the first frame transmitted to the first of two planes and then automatically recycles after counting the final signal element of a frame. It then repeats for the second frame transmitted to the second plane. Each group of signal cycles generated by the oscillator, corresponding to the number of signal elements in a frame, is counted. At the end of the second frame, the transmitter at the control center is turned off. The transmitting oscillator and binary counter at the control center continue to function however. When it has counted the number of signal elements corresponding to the number in a third frame as transmitted from the control center it recycles and counts for a fourth frame even though no signals are being transmitted from the control center during these intervals and, at the end of this time, it again turns on the transmitter.

During the third and fourth frame countings, while a number of transmitting oscillator cycles, corresponding to the number of signal elements in each of two frames as transmitted from the control center are being counted, the two frames from the two planes are being received. It is particularly pointed out that even though the transmitting oscillator and its individual binary counter continue to function during the interval while the two frames from the two planes are being received neither one of these circuits plays any part in the receiving function at the control center. The receiving function at the control center is under control of a receiving oscillator and a receiving binary counter.

The reason for operating the transmitting oscillator and transmitting binary counter during the interval while the two frames from the planes are being received is to count an interval long enough to permit the two frames from the two planes to be received and then to turn on the transmitter again.

It is particularly pointed out that, whereas the number of signal elements in each frame transmitted from the control center to each plane must be the same and the number of signal elements transmitted in each frame from each plane to the control center must be the same, the number of signal elements in each frame transmitted from the control center to the planes must usually be greater than the number of signal elements in each frame transmitted from the planes to the control center. Since it is impractical to equalize the round-trip transmission time between the control center and the planes, the frame length transmitted by the planes must be shorter than the frame transmitted by the control center by at least an amount equal to the round-trip transmission time to a plane at the maximum range of the system.

The invention may be understood from a consideration of the detailed description hereinafter when read with relation to the associated drawings which taken together disclose a preferred embodiment in which the invention is presently incorporated. It is to be understood, however, that the invention is not limited to incorporation in the present embodiment but may be incorporated in others which may be suggested to those skilled in the art by the present disclosure.

In the drawings:

FIGS. 1, 2, 3, 4, 5, 6, and 7, arranged as shown in FIG. 8, show the circuit at the control center; and FIGS. 9, 10, 11, 12, 13, 14, 15, and 16, arranged as in FIG. 18, show the circuit in the plane or outlying station.

Figure 20:
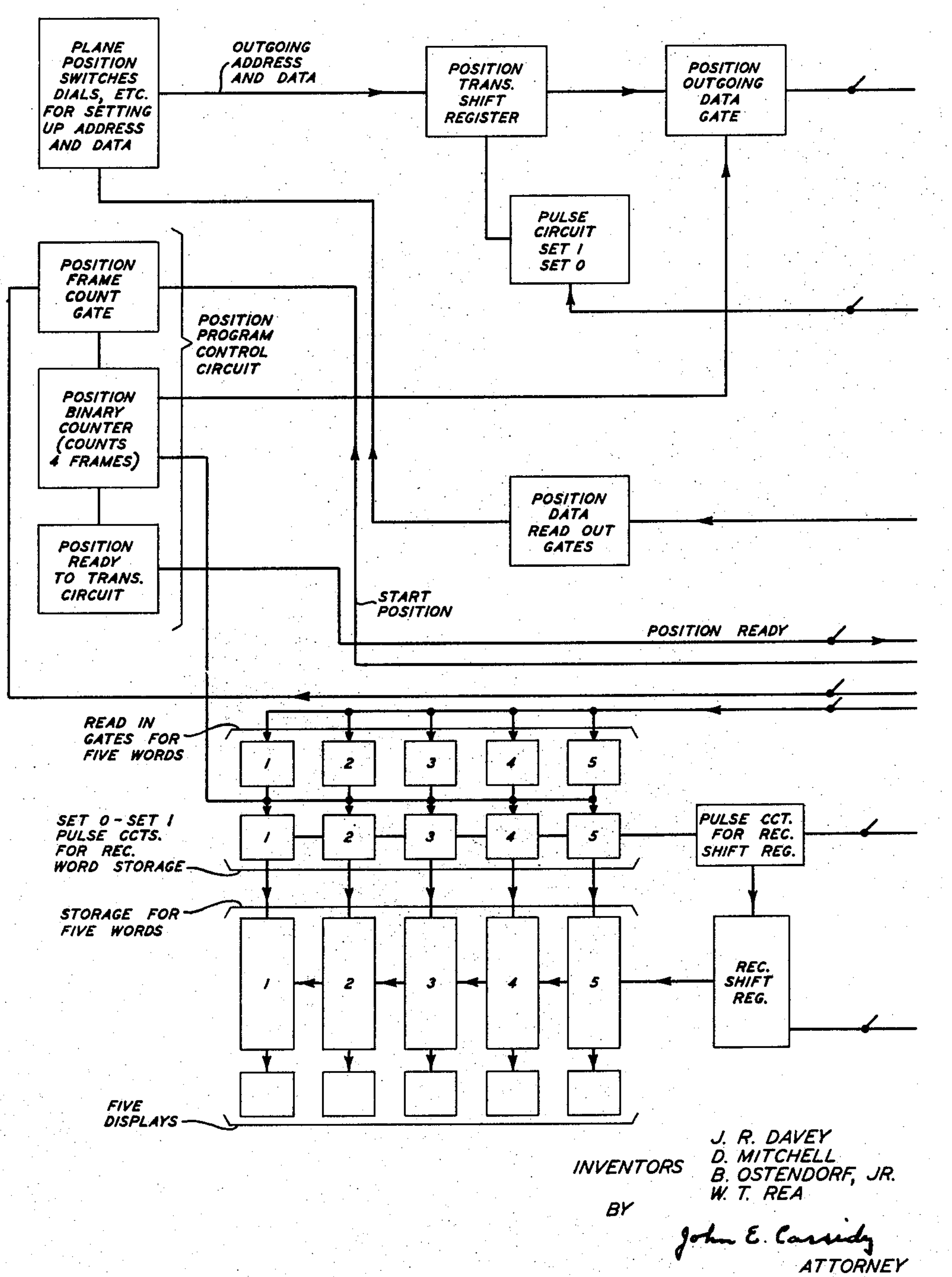
Figure 21:
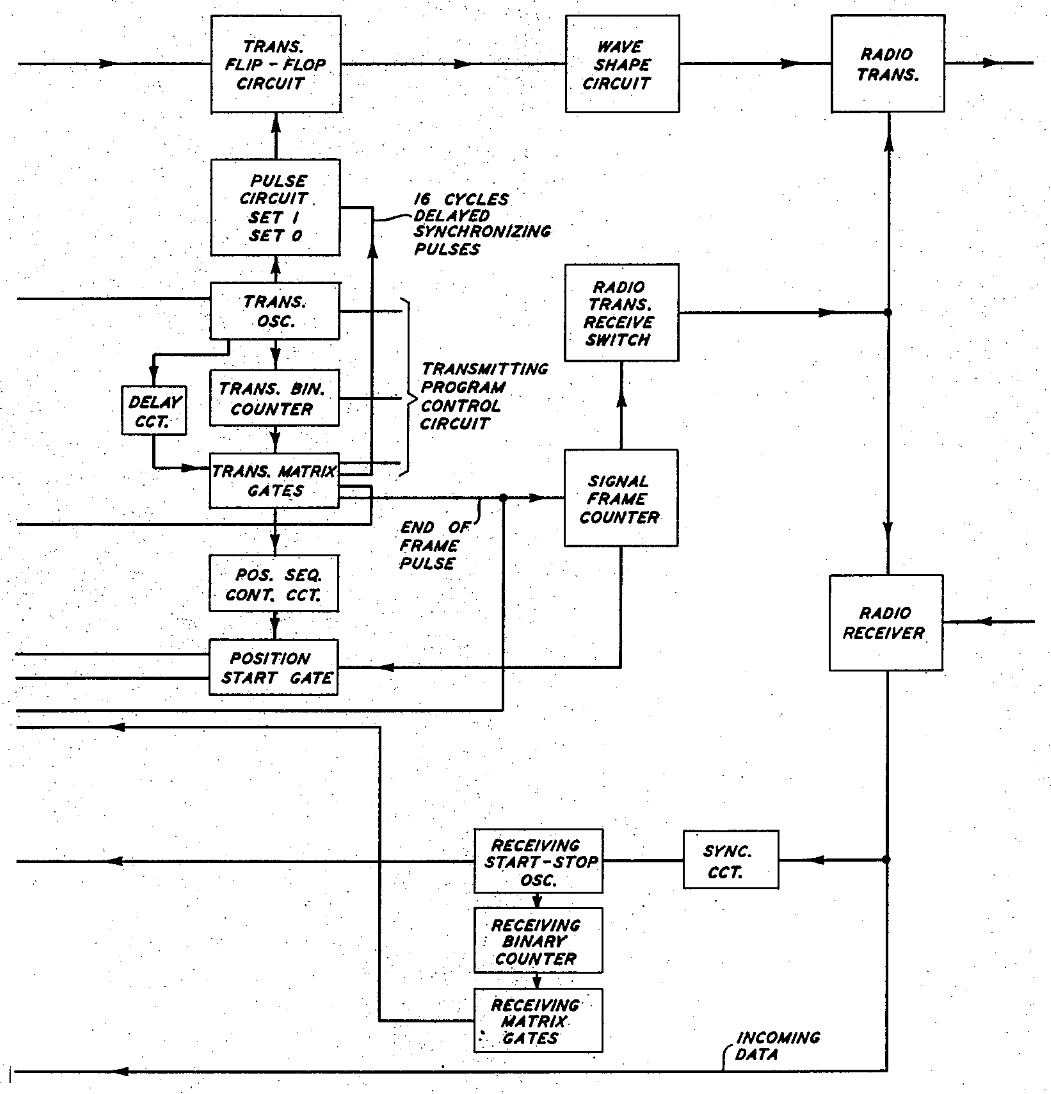

FIG. 20 shows the circuits individual to each position. FIG. 21 shows the circuits used in common by the circuits of FIG. 20. It is to be understood that there may be several hundred or more sets of individual plane control circuits, such as those shown in FIG. 20, connected to one set of circuits such as that of FIG. 21. The short diagonal spurs extending from each conductor in FIG. 20 which connects to conductors in FIG. 21, represent the points of parallel connection to other individual plane control positions, such as the position represented in FIG. 20.

In the following broad general description of the system as represented in block diagram form, the parity checking feature will be omitted. It will be assumed that the address and each of the words transmitted in each direction has 12 elements.

First, broadly, at each individual position, such as that shown in FIG. 20, data which is to be transmitted to one particular plane, is collected, by radar or other means, not shown. It is impressed on the individual transmitting equipment which forms part of FIG. 20. It passes to the common transmitting equipment which forms part of FIG. 21 and then to the radio transmitter in FIG. 21. It is received by a particular plane. The same plane transmits to the radio receiver in FIG. 21. The message passes through the common receiving equipment in FIG. 21 and then is directed to the individual receiving equipment in FIG. 20, associated with the same position from which the outgoing message was sent.

The system, as mentioned, is a single channel multiplex system. Each individual plane control position, such as that of FIG. 20, is connected to the common equipment of FIG. 21 in an ordered sequence. It is polled regularly by the common equipment and if it has a message to transmit it is connected to the common equipment so that the message may be transmitted.

The connection of the individual plane control positions to the common equipment is under the joint control of a plane position program control circuit in FIG. 20 and a program control circuit in the common equipment of FIG. 21. In the present system, each program consists of four portions, or signal frames, during which frames of signals are transmitted to a first and a second plane in succession and then frames of signals are received from the first and second plane in succession. During the first and second frames signals are transmitted to the first and second planes, respectively. During the third and fourth frames signals are received from the first and second planes, respectively.

It will be assumed that the position shown in FIG. 20 is individual to plane 1 and has signals to transmit to plane 1. The position ready to transmit circuit in the position program control circuit at the left in FIG. 20 impresses a condition on a position start gate in the common equipment in FIG. 21 and when the position sequence circuit, which polls all plane position control circuits in sequence, tests the sequence element assigned to plane 1 and recognizes the ready condition, plane control position 1 in FIG. 20 is given access to the common equipment in FIG. 21.

The four frame program is under control of a program transmitting oscillator in FIG. 21. This runs continuously, never stopping at any time. One cycle of the transmitting oscillator measures the duration of a single signal element of a frame. The total number of signal elements of a frame transmitted to a plane is counted by the program transmitting binary counter in FIG. 21, under control of the transmitting oscillator. The transmitting binary counter in turn controls the program transmitting matrix gates. These gates are opened at particular counts to pass pulses to other circuits as necessary to perform the required function.

A signal frame as transmitted from the control station has at its head end a preliminary pattern of synchronizing signals and a start signal, designed to start all of the oscillators in all of the outlying planes in proper phase. These synchronizing signals comprise a first group of signal elements which persist for 16 cycles of the transmitting oscillator followed by a single start pulse after an interval of 7 cycles. The address signals and the ordinary data signals, as distinguished from the 16 cycles of synchronizing pulses, remain in the no current, or 0 condition, or in the current, or 1 condition, substantially for the duration of a whole cycle of the transmitting oscillator. This cycle is called herein a time slot. The first 16 cycles of synchronizing signals are different. They are reversals of the 0 and 1 conditions at twice the frequency of normal data transmission. In transmitting ordinary data signals and the address, the transmitting flip-flop circuit shown in FIG. 21 is under control of a so-called set 0 and set 1 pulse circuit. It is always set to the 0 condition at the beginning of each signal slot by the set 0 pulse from the pulse circuit. If the data signal which is to be transmitted is in fact a 0 signal, the 0 condition set up in the flip-flop circuit is undisturbed by the 0 condition of the data signal. The flip-flop circuit remains in the 0 condition for the duration of the time slot. If the data signal to be transmitted is in fact a 1, within a few microseconds after the 0 condition is set into the flip-flop circuit, it is changed to the 1 condition by the data per se. The set 1 pulse from the pulse circuit serves as a gating pulse to permit the 1 condition of the actual data signal to pass into the flip-flop circuit. The short 0 condition thus appearing at the beginning of a slot in which a 1 condition is transmitted is erased by a wave shaper as the signal element is en route to the radio transmitter.

As distinguished from the address and word or data signals, the preliminary signals, which are reversals of 1's and 0's at twice the frequency of the regular data signals, are produced by first setting the flip-flop circuit to the 0 condition at the beginning of each time slot and then changing to the 1 condition at the middle of the slot. This is done in the case of the first 16 time slots at the beginning of each signal frame. This is done as it were automatically at the beginning of each signal frame transmitted from the control center.

Reference to FIG. 21 shows that the output of the transmitting oscillator is impressed, through a set 0–set 1 pulse circuit, on the transmitting flip-flop. The pulse circuit always sets the flip-flop circuit to 0 at the beginning of each signal slot. The output of the transmitting oscillator, in order to produce the double frequency synchronizing signals, is applied to a delay circuit which produces a pulse at the middle of a signal slot. The transmitting oscillator controls the binary counter which in turn controls the transmitting matrix gates so as to let the delayed pulses pass during the first 16 time slots of a frame. These pulses are applied through the pulse circuit on the transmitting flip-flop to produce the 1 condition at the middle of each of the first 16 time slots. During the next seven time slots the binary counter and matrix gates prevent any transmission. This is followed by a single 1 signal condition, produced by passing a pulse through a matrix gate to the flip-flop which serves as a start signal for all oscillators in all outlying planes.

Following the synchronizing and start signal pattern, in each frame of signals transmitted from the control center, comes the address of the called plane. This is a particular 12-element two-condition permutation code signal combination by means of which the called plane is identified. Each plane control position is assigned a single permutation combination as a plane address which identifies its individual assigned plane. This combination will be set up on switch elements, for instance, at the plane control position at the central station. When the binary counter in the transmitting program control circuit, FIG. 21, reaches the proper count, a pulse will be passed through an individual gate in the transmitting matrix gates, FIG. 21, through an individual position read-out gate, FIG. 20, to transfer the 12-element address from the 12 switches, not shown, on which it is set up, to 12 individual stages of the position transmitting shift register in FIG. 20. The transmitting oscillator in FIG. 21 controls the position transfer shift register through a set 0–set 1 pulse circuit. The pulse circuit corresponds to the one which controls the transmitting flip-flop in FIG. 21. In response to the oscillator, it produces a set 0 pulse at the beginning of each time slot followed immediately after by a set 1 gate enabling pulse. The set 0 pulse is applied in parallel at the beginning of every time slot to all 12 stages of the transmitting shift register. During the transfer of the address into the shift register, as the data from each of the 12 address switches is impressed simultaneously on its individual shift register stage, the set 1 pulse, or shift pulse, from the pulse circuit serves as a gate, which enables a 1 to pass into any of the 12 stages of the shift register, if the signal element on any of the corresponding 12 switches on which the address is stored is a 1. All 12 of the address signal elements are read into the shift register simultaneously, but they are read out to the transmitting flip-flop one signal element at a time. They are shifted from stage to stage in tandem under control of the associated pulse circuit. After being read in, as explained, each of the 12 stages of the transmitting shift register is set to 0 at the beginning of the next signal slot. Then a few microseconds later the pulse circuit applies the set 1 gate enabling condition. The set 1 actual signal condition residing in any stage is stored momentarily intermediate the register stages and is gated into a succeeding stage if it was in the next preceding stage when the set 1 gating pulse is applied. Thus, the 1 and 0 actual signal conditions are moved along the transmitting shift register in their original order, element by element, as impressed on the flip-flop from the address switches.

Intermediate the position transmitting shift register and the transmitting flip-flop there is a position transmitting data gate and, in order to explain its function, it is necessary to again consider the common circuitry in FIG. 21.

It was explained that the overall program was on a four-frame basis. The total signal elements of each frame are counted by the common transmitting binary counter in FIG. 21. The binary counter controls its associated matrix gate circuit and at the end of the frame the matrix gate circuit permits a pulse to pass to a signal frame counter, FIG. 21. This is a two-stage binary counter which is capable of counting four frames.

A position which is ready to transmit passes a signal from its position ready circuit to the position starting gate in the common equipment in FIG. 21. The position sequence control circuit, under control of the binary counter and a matrix gate, tests the position sequence circuit several times during each frame to find any position ready to transmit. When it finds such a position it alerts the position over the start position conductor. Each plane control position has a two-stage binary counter also and thus can count four frames. At the beginning of the next four-frame program, after a plane control position has been selected, a pulse is transmitted from the matrix gate in FIG. 21 into the two-stage binary counter in the plane control position of the selected plane. Then, during the first frame of a new program, the binary counter in the selected plane control position applies a condition to its associated position transmitting data gate which is enabled so as to permit its address and its five data words to be transmitted. First, the address passes out. It is impressed on the transmitting flip-flop in FIG. 21. The flip-flop, as explained, is controlled by the oscillator through its individual pulse circuit. At the beginning of every signal slot the transmitting flip-flop is set to the 0 condition where it remains if the address signal element is a 0. A few microseconds later a set 1 gating pulse is applied to a gate controlling the flip-flop and, if the address element being sensed at the moment is a 1, instead of a 0, the flip-flop is changed to the 1 condition by the pulse in the address time slot. The 12 elements of the address are thus read into and out of the flip-flop, pass through the wave shaper, are impressed on the radio transmitter and transmitted to the plane.

After the address, at the proper count, each of the five words is read out of storage under control of the transmitting binary counter, the matrix gates and the position data read-out gates. There is an individual matrix gate and position data read-out gate for the address and each of the five words. Each of the five words has 12 elements as does the address and each is passed through the flip-flop and the radio transmitter element by element. At the end of a frame, the transmitting binary counter enables another matrix gate which permits an end of frame pulse to pass. This is passed to the position program control circuit and operates the binary counter therein which disables its position outgoing data gate intermediate its transmitting shift register and the flip-flop circuit. This pulse also recycles the transmitting binary counter.

During the second frame of the four-frame program some other individual plane control position is enabled and transmits. There is no interval between frames.

At the end of the second frame, the frame counter operates a switch to turn off the radio transmitter and turn on the receiver.

In response to a signal marking the beginning of the third frame, the two-stage binary counter in the position program control circuit for plane 1 is again operated and this time it places its individual receiving equipment at its control position in condition to receive the data which its individual plane, plane 1, is transmitting.

During the third frame of a program, plane 1 transmits to the control center and its signals are directed to its individual control position.

The incoming frame of signals is received by the radio receiver, FIG. 21. The frame from any plane to a control center does not include an address as there is but one control center in the present system.

At the head end of the frame from a plane there is a synchronizing pattern of signals identical with the one transmitted to the plane. The receiving oscillator which controls the receiving program at the control station is stopped before the arrival of a frame from a plane and is set into operation in response to the synchronizing pattern. Thereafter, it conrtols a receiving binary counter and receiving matrix gates. The incoming data is impressed on a receiving shift register. At proper counts, five pulses are passed through the receiving matrix gates to the read-out gates in each plane control position. Only one set of receiving read-out gates will be enabled at this juncture. That is, the set individual to the receiving equipment associated with the plane which is transmitting. The incoming data is impressed on the receiving shift register one signal element at a time. After all of the elements of a particular word are stored, they are all transferred simultaneously into an individual storage register, of which there are five, one for each word. Each of the five word storage registers controls an individual display device.

At the beginning of the fourth frame, the frame binary counter in FIG. 21 and in FIG. 20 will be advanced to the fourth counter condition. For the plane 1 control position there will be another idle interval, while plane control position 2 receives. Then after the fourth frame, the end of frame counter in FIG. 21 will switch off the radio receiver and again switch on the radio transmitter and repeat the cycle.

In the interest of clarity in the foregoing, certain functions are not described. Among these are the operation of the parity checking circuit which is described in full in the detailed description and the Grey to binary code conversion described in a patent identified herein.

Figure 19:
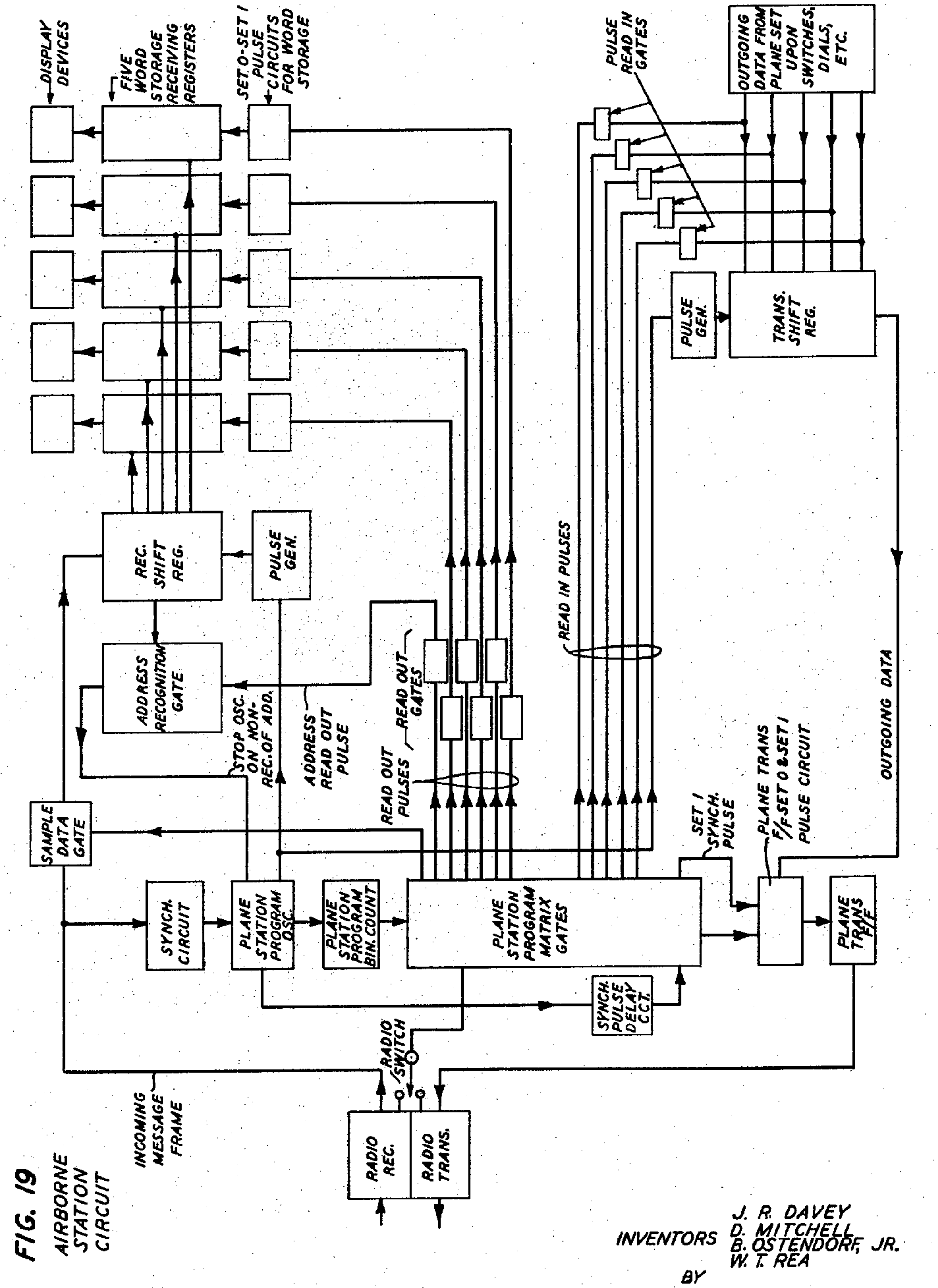
FIG. 19 is a block diagram of the basic circuit at an outlying station or plane, and FIGS. 20 and 21, taken together, with FIG. 20 to the left of FIG. 21, is a block diagram of the basic circuit at a control center.

The airborne station circuit is shown in FIG. 19. It is assumed that this is located in plane 1. The circuit of FIG. 19 affords means for receiving a frame of signals from the control station and then transmitting a frame to the control station.

It is assumed that the frame 1 signals are impressed on the radio receiver shown at the left in FIG. 19. At the head end of this frame there is a pattern of synchronizing signals. These are impressed on the synchronizing circuit. In response to this, the synchronizing circuit recognizes a particular single final pulse of the synchronizing pattern as being the start signal element and starts the plane station program oscillator in the proper phase just before the arrival of the first signal element of the address. The signal elements constituting the address of the called plane and the signal elements of each of the five words in frame 1 pass through the sample data gate shown at the top of FIG. 19 and are impressed on the receiving shift register. First, the 12 elements of the address are read into the 12 stages of the receiving shift register. This is done under control of a pulse generator which generates the set 0 pulse and the set 1 gate pulse. The pulse generator which controls the receiving shift register is under control of pulses received from the station program oscillator. After the 12 elements of the address are stored in the receiving shift register, a pulse is passed through the station program matrix gates and the address read-out gate to the address recognition gate. The address stored in the receiving shift register is transferred to the address recognition gate. If the address appearing in the incoming frame is the same as the address assigned to the plane, the pulse to the address recognition gate will be inhibited. If the addresses do not agree, the pulse passes through the address recognition gate and stops the plane station program oscillator. As a result of this, the signal combinations defining the five words in the balance of the frame will not be received.

Assuming that the address is correst, the 12 elements of each word will be impressed in turn on the receiving shift register. At the proper count, a pulse will be passed from the plane station program matrix gates through an individual read-out gate to each of the pulse circuits associated with the word storage receiving registers. In response to this each of the 12 stages of each register will first be set to 0; then all of the elements for a particular word will be read into its receiving word storage receiving register simultaneously. A set 1 shift pulse will be produced by the pulse circuits associated with the word storage register to control the gating of the 1's in the shift register into the storage register. The signal elements of the word whether 0 or 1 will be passed from the shift register and registered in the word storage receiving register, one word at a time, until all five words are registered. Associated with each register is a display device or a servo mechanism which translates the combination for the word into a display, into a voltage of a particular magnitude, or into some other form, for use in the airplane.

After the registering of the five words, the plane station program oscillator continues to oscillate and the plane station program binary counter continues to count. It will count an interval equal in duration to the duration of the second signal frame while the control station transmits to plane 2. During this interval the radio receiver in plane 1 will be switched off and the radio transmitter in plane 2 will be turned on, under control of a switch responsive to a pulse passed through the matrix gate at a particular count.

During the third frame interval, plane 1 transmits a frame of signals to the control station. At the head end of this frame there is a synchronizing pattern corresponding to the synchronizing pattern in the frame of signals received by plane 1. It is pointed out that these synchronizing signals at the head end of a frame are the same for all frames in both directions. The synchronizing pattern is produced under control of the plane station program oscillator, the plane station program binary counter and the plane station program matrix gates. Sixteen time slots at the head end of the frame are first set to the 0 condition and then, at the middle of each slot, are set to the 1 condition. This is done by delaying the 16 set 1 pulses from the plane station program oscillator so that they pass through the matrix gates during the middle of each of the first 16 time slots. This produces a 0 signal in the first half of a signal slot followed by a 1 condition in the second half of a signal slot in each of the first 16 signal slots of the transmitter frame. The plane transmitting flip-flop circuit shown at the bottom of FIG. 19 is under control of the plane transmitting flip-flop set 0–set 1 gate pulse circuit immediately above it. Set 0 pulses are passed through the pulse circuit and set the plane transmitting flip-flop to the 0 condition at the beginning of each signal frame. Before the outgoing data pulses are impressed on the flip-flop, the 16 reversals of 1's and 0's are first passed through the pulse circuit and impressed on the plane transmitting flip-flop and then passed on to the radio transmitter. After a seven-digit interval a single pulse is passed through a matrix gate to set the transmitting flip-flop to the 1 condition near the beginning of the time slot. This is the single start element of the synchronizing pattern. These synchronizing and start signals start the receiving oscillator at the control station.

Meanwhile, data has been collected at the plane and set up on controls such as switches, dials, etc. There are again five words or five two-condition, 12-element permutation code signal combinations set up on these devices. This information is transferred one word at a time and all of the elements of each word simultaneously from the switches, dials, etc. into the transmitting shift register. The transmitting shift register is controlled by a pulse generator through the program oscillator which sets the transmitting shift register to the 0 and 1 conditions as described for the corresponding circuits in the plane control positions at the control station. Each word combination after being read-in in parallel is read out in series, one signal element at a time. This outgoing data is impressed through the plane transmitting flip-flop pulse circuit on the plane transmitting flip-flop circuit and then on the radio transmitter. After the last signal element of the last word is transmitted, the plane station program oscillator is shut down and the plane station program binary counter is restored to the all 1's condition awaiting the reception of the next signal frame.

Attention is called to the fact that in the system broadly described in the foregoing, the synchronizing and start pattern of signals at the head end of each signal frame transmitted from the control station is received by all planes. The oscillator in all planes is started in response to these signals. The address signals following the synchronizing pattern are received by each plane. Thereafter, the oscillators in all planes except the oscillator in the single plane in which the incoming address agrees with the assigned address combination will be stopped, while the single properly addressed plane continues to receive.

Once again it is pointed out that in the interest of clarity certain functions performed by the detailed circuits, particularly the parity checking function, have not been described. These are described in detail hereinafter. It is pointed out that a thirteenth signal element is added to the address and to each word transmitted from the control station to the planes. It is pointed out that a thirteenth element is added to each word transmitted from any plane to the control station. This requires a binary counter associated with the common transmitting equipment in the control station and in each plane to check the number of 1 conditions in each of these combinations and means for adding a 1 when required to make the number of 1's in each combination as transmitted odd. It also requires a binary counter associated with the common receiving equipment in each plane and in the control center to perform the binary check.

Figure 8:
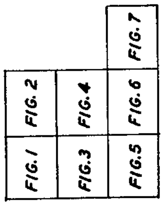

Refer now to FIGS. 1 to 7 inclusive, arranged as in FIG. 8. This group of drawings shows the circuit at the control center. Before proceeding with the detailed description, the major components of the circuits at the control center will first be described.

Figure 2:
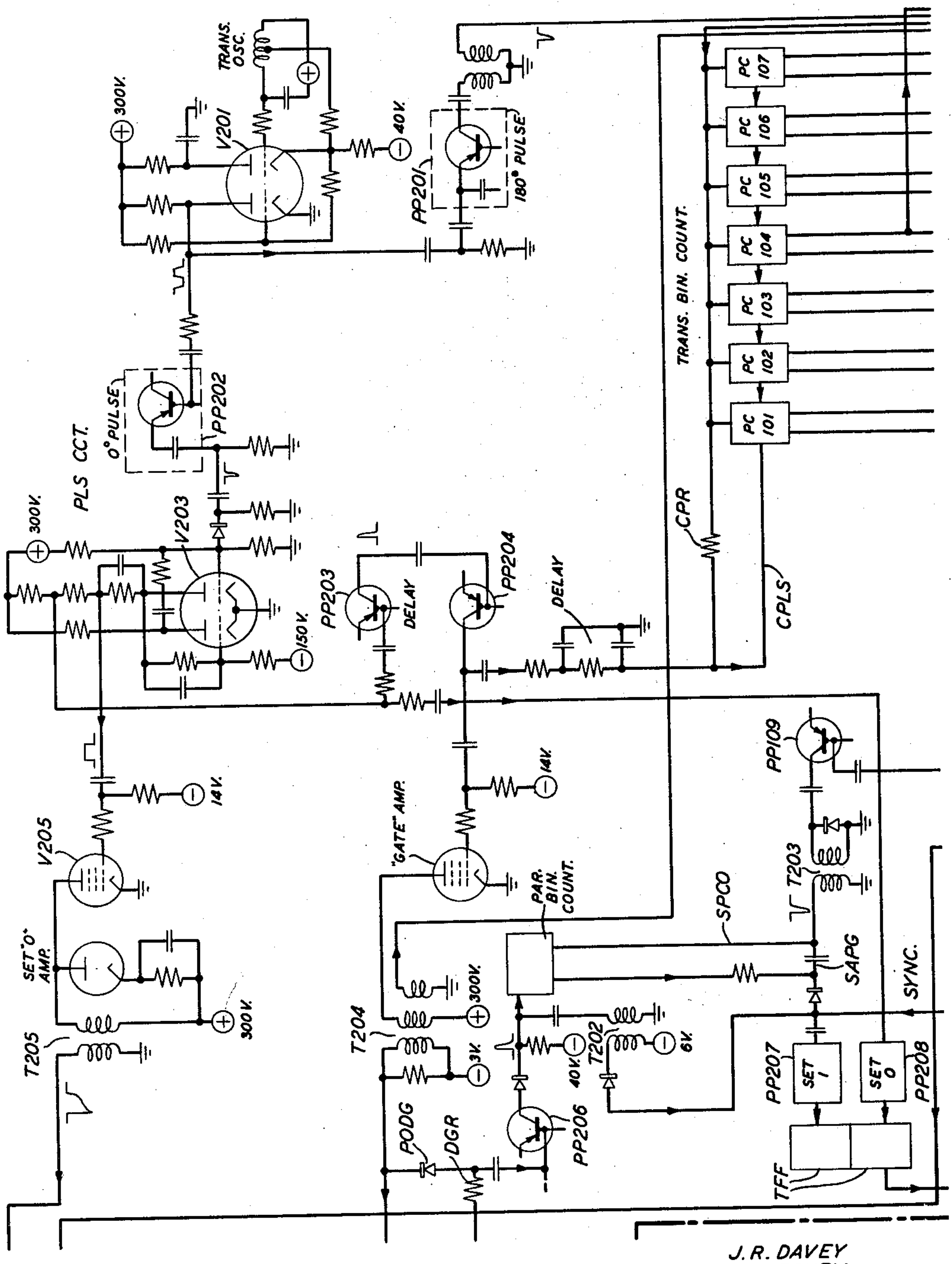

The transmitting oscillator TRANS OSC is shown in the upper right-hand corner of FIG. 2. One major function performed by the transmitting oscillator is to control the timing of the signal slots in each frame transmitted from the control center. It also controls various pulsing circuits which in turn control the insertion of the condition of the signal element that is the "0" condition or the "1" condition in each time slot in the bit storage elements. The transmitting binary counter TRANS BIN COUNT in FIG. 2 counts the cycles of the oscillator. The transmitting binary counter in turn controls the matrix gates MG—. Each matrix gate is represented by a long rectangle shown in the vertical array on the right-hand side of FIG. 4. There are 16 matrix gates MG— associated with the transmitting binary counter. Each matrix gate is designated MG followed by a numeral which indicates the count or counts at which a pulse or pulses are passed through the gate. The pulses control circuits which perform particular functions required to be performed at the counts. Among these functions are reading out the address and each of the five words following the address and recycling the transmitting binary counter at the end of a frame. These functions and the functions initiated by pulses passed at other counts will be described in detail hereinafter.

Figure 3:
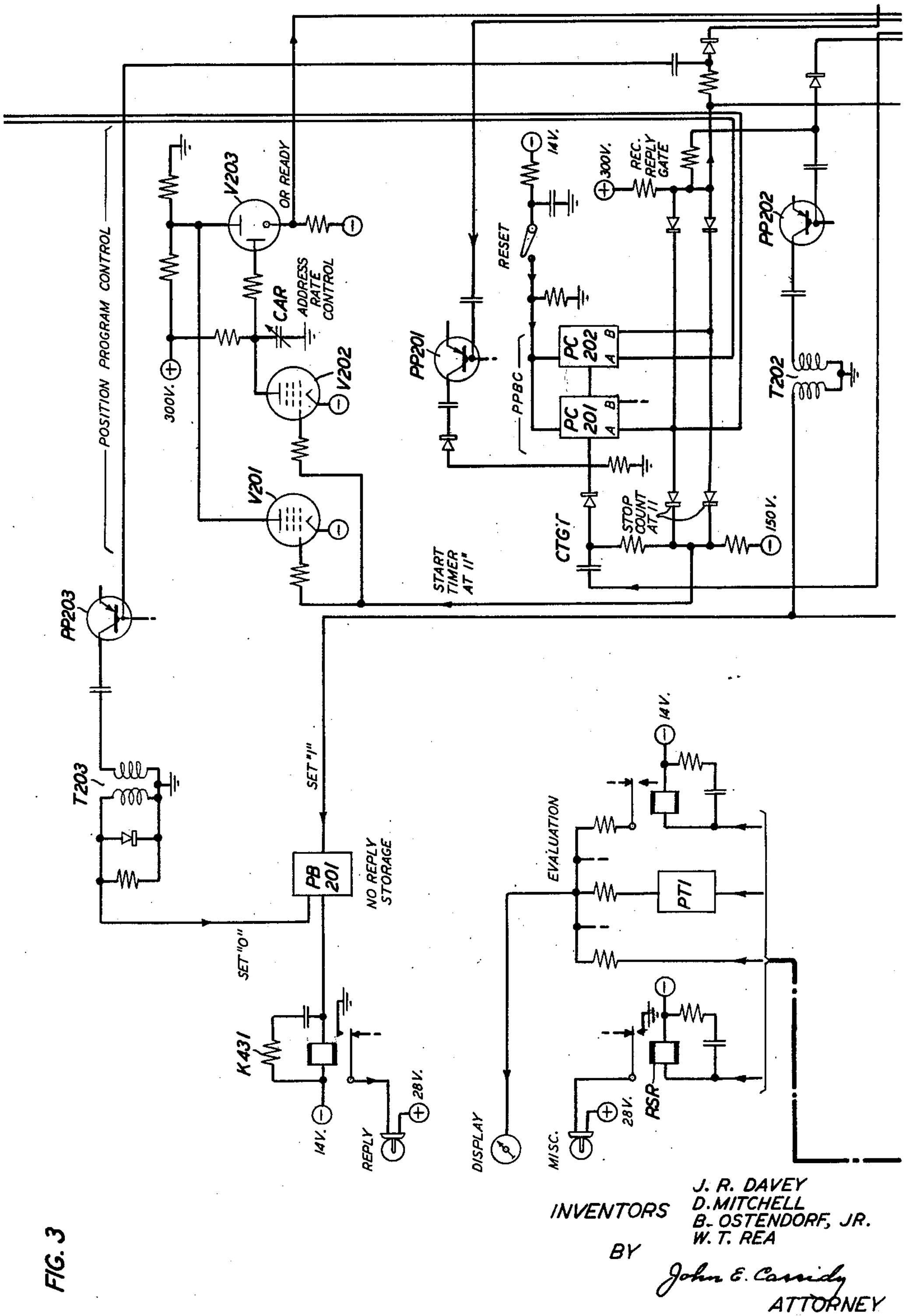

At the right-hand side in FIG. 3 is shown a POSITION PROGRAM CONTROL circuit. Each plane or outlying station as mentioned in the foregoing, has at the control center an individual control position at which the information to be transmitted to the plane is accumulated.

Figure 6:
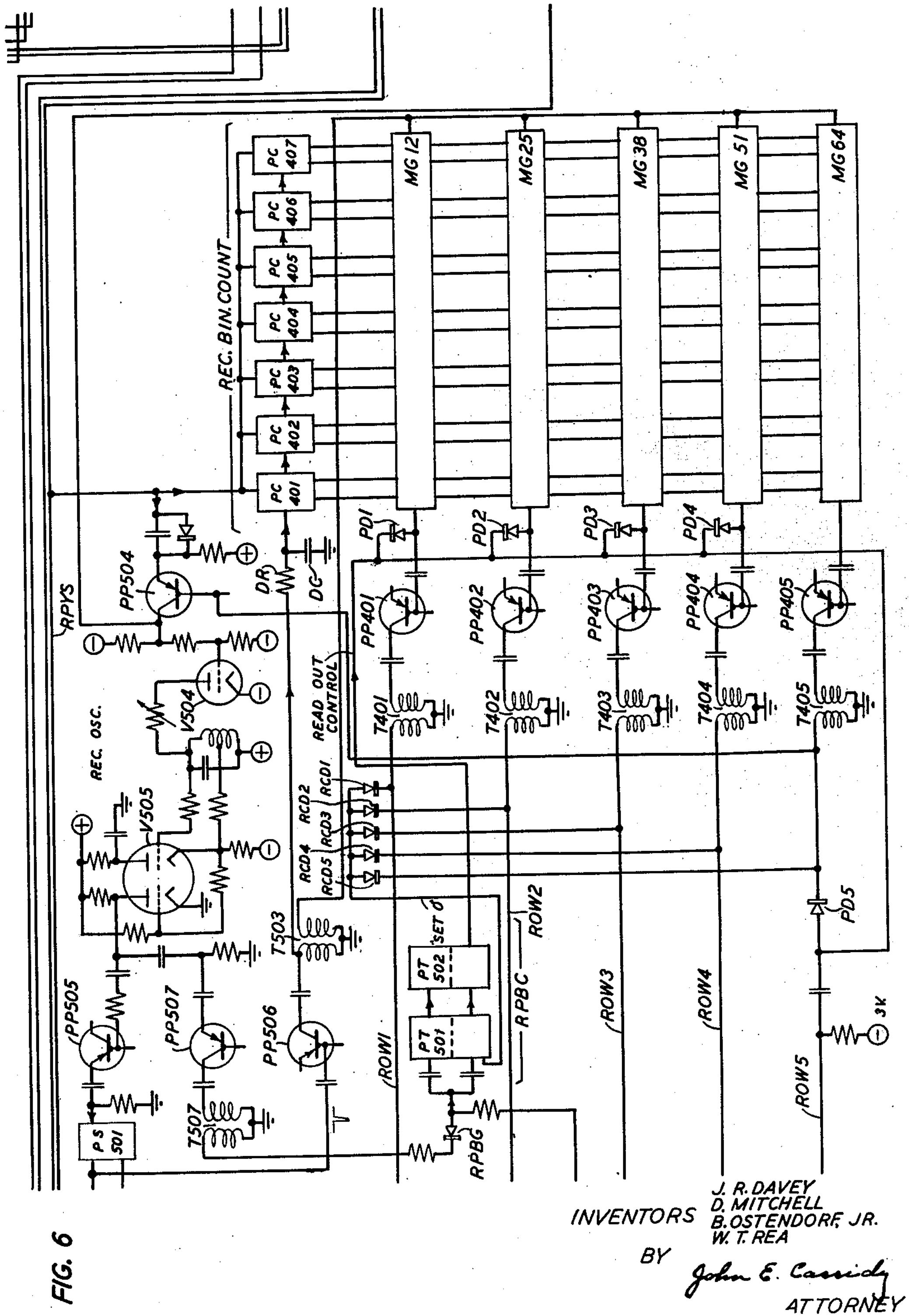
Figure 7:
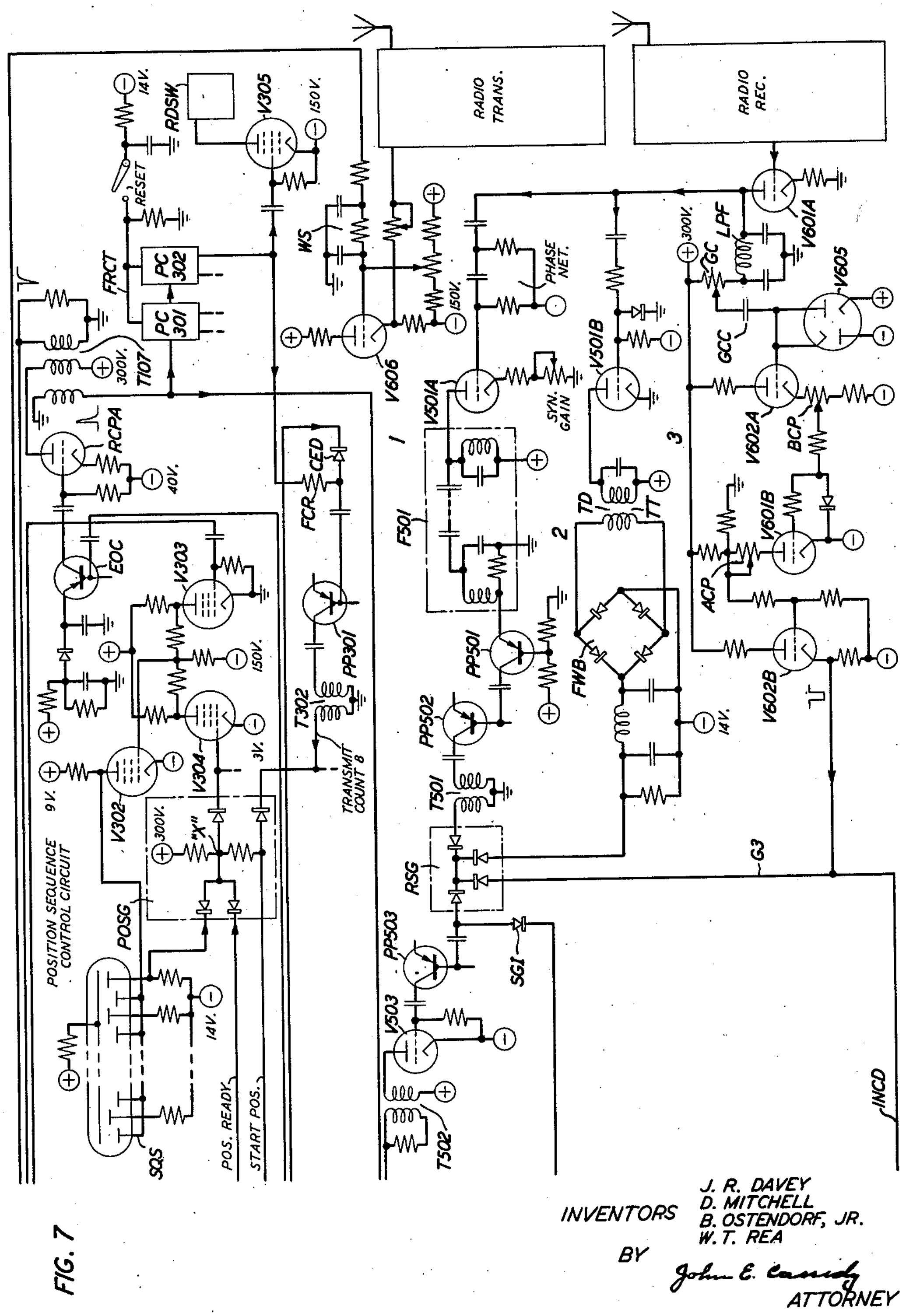

Each time the transmitting binary counter counts to 8, one of its stages, PC104, in FIG. 2, passes a pulse to a sequence stepping tube SQS, shown in the upper left-hand corner of FIG. 7 to test to determine whether any plane position is ready to transmit. This will be done seven times in each frame as binary counter stage PC104 is activated to this condition seven times during each frame. There is an individual cathode in one such position sequence control tube SQS for each plane control position at the central control station. Each cathode circuit will be activated in sequence. Associated with the position sequence control tubes, and individual to each position, is a position start gate POSG, such as shown in the upper left-hand portion of FIG. 7. When any position individual to a particular plane is in condition to transmit, it applies an enabling potential to an individual diode control in the position start gate. The position is then enabled when the sequence stepping tube activates the cathode circuit assigned to the particular position. Each position program control circuit, shown in FIG. 7, individual to a control position times the programming of its own transmit and receive periods. It includes a binary counter PPBC which counts the frames in a program or entire cycle. This binary counter controls the transmission from the position transmitting shift register, shown in a vertical array at the left in FIG. 1, through the position outgoing data gate PODG shown in the upper middle portion of FIG. 1. It also controls receiving by enabling the position read-out gates PRG 1 to 5, in the lower right-hand portion of FIG. 5, in cooperation with the receiving binary counter REC BIN COUNT and the matrix gates associated with this counter which gates MG12, MG25, MG38, MG51 and MG64 are individual to the five incoming words. The receiving binary counter and its associated matrix gates are shown at the right in FIG. 6.

Figure 1:
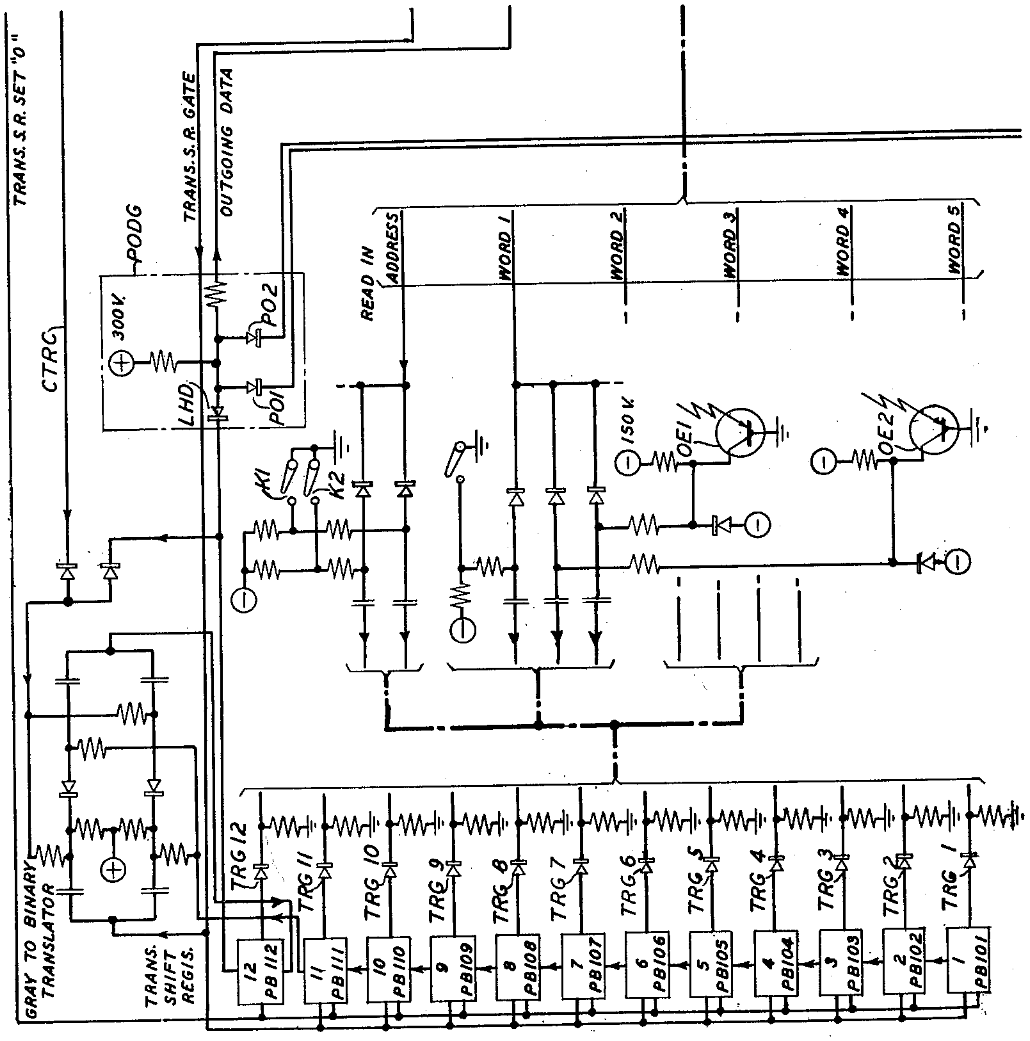

The address assigned to a plane individual to a plane position at the control center may be set up on contacts, for instance. As explained, there will be twelve signal elements comprising the address and the twelve address contacts will be opened or closed in accordance with the particular address combination assigned to a plane. Only two of these address contacts K1 and K2 are shown in FIG. 1 in order to simplify the drawing. In addition to the address, the signal combinations of the words representing the data to be transmitted to the plane will be established by means of various measuring devices, not shown, which are translated by dials or other means and phototransistors, for instance, such as OE1 and OE2 in the middle portion of FIG. 1 into an individual multi-element two-condition permutation code signal combination for each word. Again only two phototransistors of the twelve which may be employed are shown in FIG. 1, for simplification. Each such combination, as explained, will comprise twelve signal elements. Under control of the transmitting binary counter TRANS BIN COUNT, shown at the lower right in FIG. 2, and one of the matrix gates MG–23 associated therewith, shown near the upper right in FIG. 4 the address combination will first be transferred, all of the elements of the combination simultaneously, to an individual transmitting shift register associated with each control position, such as the register TRANS SHIFT REGIS shown at the left in FIG. 1. When the outgoing data gate PODG, in the upper portion of FIG. 1 is enabled by the binary counter PPBC in its position program control circuit, the signal elements of the address in the transmitting shift register will be read out of the register, one signal element at a time and impressed on the transmitting flip-flop circuit TFF shown in the lower left-hand corner of FIG. 2. The flip-flop circuit will be conditioned at the start of each signal slot by the "set 0" and "gate" or "set 1" pulses from pulse amplifiers PP208 and PP207, respectively. As the signal combination defining the address is impressed on the transmitting flip-flop circuit, it is subjected to a test, known as a parity test, by a parity binary counter PAR BIN COUNT, shown at the lower left in FIG. 2. The output of the transmitting flip-flop circuit TFF is impressed on the radio transmitter shown at the right in FIG. 7.

With respect to the parity test which is applied to the address and to each word as transmitted, each of the twelve element signal combinations may contain any number of "1" and "0" signal conditions. As the signal combinations for the address and for each of the words are transmitted, the "1" conditions for the combination for the address or the word are counted by the parity binary counter PAR BIN COUNT, at the middle left in FIG. 2. When counting is completed, the condition of the binary counter will indicate that the number of "1's" transmitted is either odd or even. It is the objective of the parity count check to assure that an odd number of "1's" are transmitted for the address and for each word combination. In order to permit this, a single signal element is added to the address and to each word. This signal element may be a "1" or a "0," as required to make the total number of "1's" in the thirteen-element signal combination odd. If the twelve-element signal combination contains an odd number of "1's," the thirteenth-signal element introduced by the parity counter will be a "0." If, however, the number of "1's" in the combination as indicated by the parity binary counter is even, the thirteenth-signal element will be a "1." How this is performed will now be described in general.

If the parity binary counter PAR BIN COUNT, in FIG. 2, counts an even number of "1's," the condition responsively established in the parity binary counter enables a start and parity gate SAPG, shown at the lower left in FIG. 2. If the "1's" counted are odd, the gate SAPG is disabled. When the next word, which follows immediately, is read into the transmitting shift register, TRANS SHIFT REGIS, FIG. 1, if the number of "1's" in the previous word is even, the pulse from the the particular one of the matrix gates MG–, shown at the right in FIG. 4, which initiates the read-in function, is passed also through one of the combining diodes CD1 to CD7 in the upper left-hand corner of FIG. 4 into FIG. 2 and through pulse amplifier PP109, transformer T203, gate SAPG and the "set 1" pulse amplifier PP207 to the transmitting flip-flop TFF. This adds a "1" as the thirteenth-signal element of the combination for the address or word to insure that the number of "1's" transmitted for each contains an odd number of "1's." At the beginning of each signal slot the transmitting flip-flop TFF is automatically set at "0" by the "set 0" pulse. If the number of "1's" in a word is odd, the "0" condition is undisturbed. To anticipate, a corresponding test is applied in the distant station when the incoming signal frame is received to determine if the thirteenth-element combination of the received address and of each of the words has an odd number of "1's." If the test is met, it indicates that the received combination is plausible and the word is accepted and read into storage. If the test is not met, the word is rejected.

Figure 4:
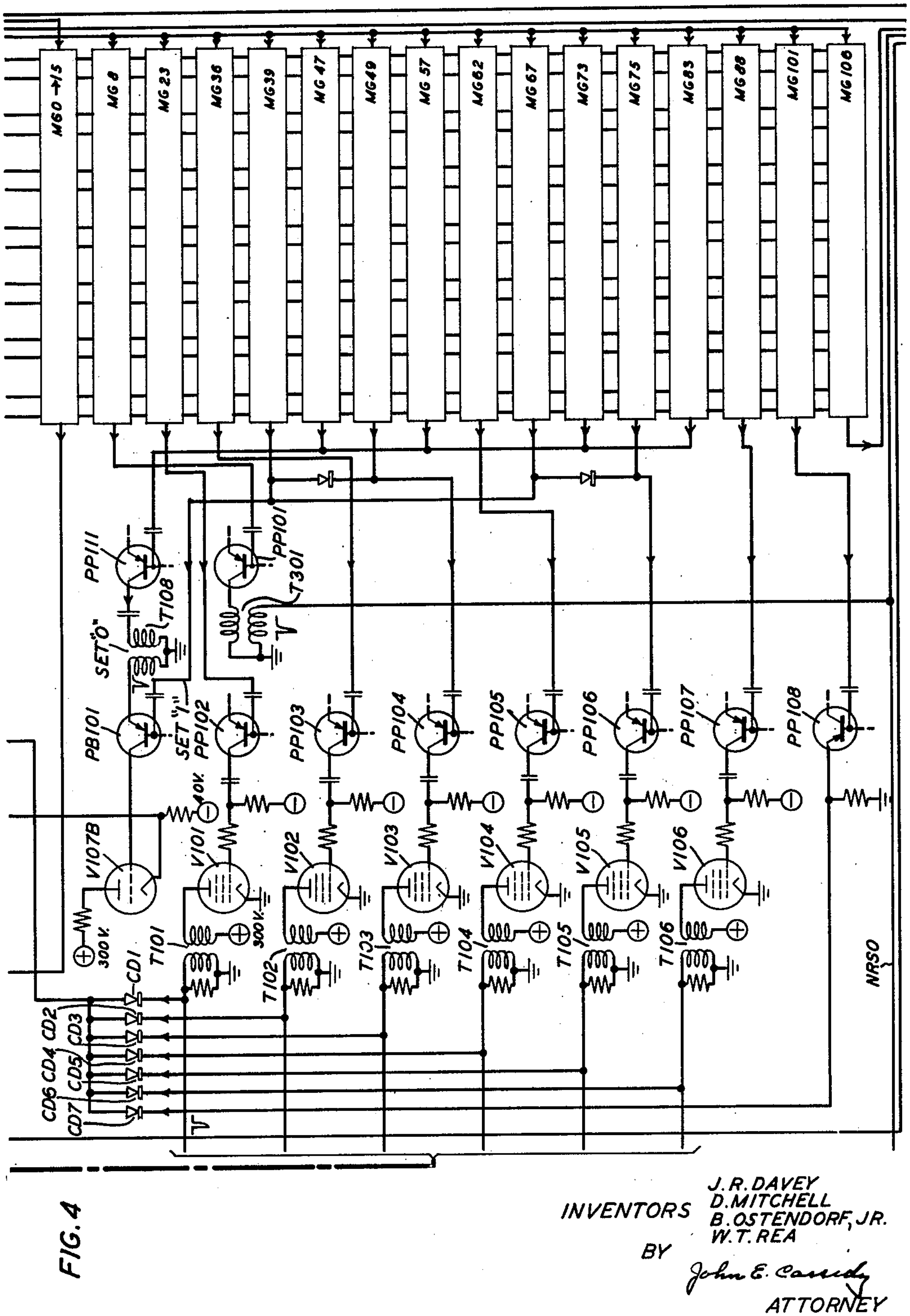

Each entire frame of signals counted by the transmitting binary counter, TRANS BIN COUNT, shown at the lower right in FIG. 2, is counted, one count for each frame, by means of a circuit which is controlled through a matrix gate MG106, shown at the bottom right in FIG. 4, which gate is opened during the final pulse of each frame. The final pulse of each frame is applied to an end-of-count circuit EOC, shown at the upper right in FIG. 7. In addition to recycling the transmitting binary counter, this circuit also impresses one pulse for each frame counted on the frame counter binary counter FRCT shown in the upper right in FIG. 7. This frame counter circuit first counts two frames. During this interval the radio transmitter transmits two frames. At the end of the second frame the frame counter applies a condition to tube V305, shown at the right in FIG. 7, which responsively controls a switch, indicated by rectangle RDSW, to turn off the transmitter during an interval while two more frames are counted. During this interval, a frame is received from each of the two planes or outlying stations which were addressed.

The incoming signals are received from a radio receiver and impressed on tube V601A, shown in the lower right in FIG. 7. The preliminary signals in the frame are passed through three parallel input circuits 1, 2 and 3 connected to the output of tube V601A, which three circuits responsively control a receiving starting gate RSG shown at the middle left in FIG. 7. The receiving start gate in turn permits the start pulse to pass to start the receiving oscillator REC OSC shown in the upper middle portion of FIG. 6. The receiving oscillator REC OSC controls the receiving binary counter REC BIN COUNT, shown in the upper right of FIG. 6. The receiving binary counter in turn controls the five receiving matrix gates MG12, MG25, MG38, MG51, and MG64. Each of these gates passes a pulse during the reception of a frame at the count indicated by the number in its designation. The incoming data pulses are passed through conductor INCD shown at the bottom left in FIG. 7 and applied to the data sample gate DSG in the right-hand middle portion of FIG. 5. Each received word, as explained, is checked for plausability by subjecting it to a parity check by counting the number of "1's" in the word. This test is applied by the receiving parity binary counter RPBC, shown at the middle left in FIG. 6, in cooperation with the data sample gate DSG. As each incoming word is sampled, one signal element at a time, by the data sample gate, the "1's" in the word are applied to the receiving parity binary counter RPBC. Simultaneously, all signals in the word are applied to an individual receiving shift register REC SHIFT REG, shown in the middle of FIG. 5, at the position assigned for the particular plane. Each signal element in each word, intended for a particular position, is directed to the position and impressed, element by element on its individual receiving shift register REC SHIFT REG until the twelve elements in the word are registered in the twelve stages RS1 to RS12 of the receiving shift register. As the parity count for the word is made, at the proper count, an individual matrix gate for each received word passes a pulse to an individual position read-out gate PRG 1–5 shown at the lower right in FIG. 5. In order to pass this gate, the gate must be enabled by a condition which is applied by the individual position program control circuit through its frame counting binary counter PDBC. This condition is applied only at the proper time in a program for the reception of a frame from the particular plane associated with the position. The word read-in pulse after passing through the position read-out gate is impressed on an individual shift pulse circuit PS201, PS202, PS203, PS204 and PS205, one for each word. The shift pulse circuit responsively applies first a "set 0" pulse followed by a "set 1" pulse to an individual storage bank SBW1 to SBW5, for words 1 to 5, respectively. The twelve signal elements for any word are resting in the receiving storage shift register REC SHIFT REG when the individual shift pulse circuit for the word conditions the storage bank for the word to receive the information from the receiving shift register. The thirteenth element after performing its function of parity check will be discarded in a manner to be described. All of the signal elements for one word after another are thus read from the receiving shift register REC SHIFT REG to an individual word storage bank for each word.

Figure 18:
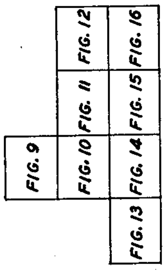

A number of the component circuit units comprising the control center circuit of FIG. 8 and the plane, or outlying station, circuit of FIG. 18 and a number of circuits to which they connect and with which they cooperate are described in detail in patent applications copending with the present application and in other patents which are hereby incorporated herein by reference as though fully set forth herein. These are as follows:

The binary counters and the manner in which they control cooperating matrix gates are disclosed in the patent application of B. Ostendorf, Jr., Serial No. 541,206 filed October 18, 1955, now Patent No. 2,803,676, granted September 8, 1959.

A so-called bit and gate circuit, which is the basic element of the present shift register circuit, and the combination of the shift register and storage circuits are disclosed in the patent application of B. Ostendorf, Jr., Serial No. 538,937 filed October 6, 1955, now Patent No. 2,873,385, granted February 10, 1959.

A circuit unit which is widely employed in the present system is known as a shift pulse circuit. This circuit generates two timed pulses in sequence, locally, during the early portion of a signal time slot. The shift pulse circuit is used to control a circuit element known as a bit storage circuit, which is the basic component of a shift register or storage register circuit and is used generally for storing a single signal element condition, that is the "1" or "0" condition. The first of the two pulses generated by the shift circuit is known as the "set 0" pulse and it is used to set a single transistor storage element in the bit storage circuit to its low current or "0" condition. The second pulse generated by the shift pulse circuit is known as the "gate" pulse or "set 1" pulse and is employed to set the bit storage circuit in the alternate "1" condition, if the data signal element incoming for the time slot is a "1" rather than a "0." The "set 0" pulse is always first registered in the bit and storage circuit. It remains there if the signal element is not a "1." Following the "set 0" pulse, the "gate" pulse otherwise known as the "set 1" pulse is applied to an input gate controlling the bit and storage circuit. If the signal element to be stored is actually a "1" instead of a "0," during the interval while the "gate" or "set 1" pulse is applied to the gate, the "set 1" pulse passes through the gate and is stored. The "set 0" and "gate" or "set 1" pulses and the incoming "1" signal elements are input voltage conditions and the "0" and "1" conditions stored in the bit and storage unit are output voltage conditions responsive to the changed current carrying condition of the transistor. The pulsing circuit is described in detail in the patent application of B. Ostendorf, Jr., Serial No. 538,903 filed October 6, 1955, now Patent No. 2,911,544, granted November 3, 1959.

It was mentioned in the foregoing that the receiving oscillator REC OSC, in FIG. 6, is controlled by a three-branch circuit and the start gate RSG. The purpose of this is to start the oscillator in the proper phase at the proper instant, under control of the preliminary group of pulses comprising the phasing pulses, waiting pulses and start pulse. The three branches, branches 1, 2 and 3, at the lower right in FIG. 7, cooperatively respond to the preliminary pulses by producing a sharp pulse at the middle of the start pulse, and other circuit elements controlled by the start gate responsively start the receiving oscillator REC OSC in the control center at the zero voltage and maximum negative current condition of the tuned circuit of the oscillator. The identical arrangement is employed to start the oscillator in the planes, or outlying stations to be described hereinafter. The receiving oscillator control circuit is described in the patent application of J. R. Davey, now Patent No. 3,002,375, issued February 20, 1962.

In the present system certain of the data is applied to the shift registers in the form of signal combinations in what is known as the reflected binary code, otherwise known as the Gray code. This code has the advantage that gross errors in encoding, that is in translating the settings of encoding discs, for instance, into signal combinations, are avoided, since in a transition from any combination to a sequential combination, representing a unit change in quantity, only a single element of a code combination changes. This is explained in detail in Patent No. 2,632,058 granted to F. Gray, March 17, 1953. After encoding in reflected binary or Gray code, it is advantageous to translate from the Gray code to regular binary code before transmitting the combinations to distant stations and applying them to evaluation circuits, which translate the combinations into analog voltages representing the quantities, because the evaluation circuits for regular binary code combinations is relatively simpler than that for combinations in the Gray code. In the present system, therefore, certain of the signal combinations, representing measurements made by code discs, for example, are applied to the shift registers in the form of Gray code. As the combinations are read out of the shift register, element by element, they, or such of them as are expressed in Gray code, are sensed and translated into regular binary code. This is explained in detail in the joint patent application of W. J. Cadden and B. Ostendorf, Jr., now Patent No. 2,982,953, issued May 2, 1961.

A circuit for translating Gray or reflected binary code combinations directly into regular binary evaluated voltages by means of a relay and a regular binary evaluation network is described in detail in the patent application of W. S. Hazlette, now Patent No. 2,973,510, issued February 28, 1961. This circuit is employed in cooperation with the present circuit to translate received Gray code combinations into linearly varying voltages to control indicating meters and servo mechanisms, for instance.

An evaluation circuit for evaluating the difference between two quantities expressed as two binary code combinations and translating the difference into an analog voltage is described in detail in the patent appplication of J. R. Davey, now Patent No. 2,954,928, issued October 4, 1960. This circuit may be employed with the present system, for instance, in defining an angle between an angle of command heading received as a binary code combination from the control center and an angle of the present line of flight of a plane as measured in the plane and expressed as a binary code combination and expressing the difference angles in terms of linearly varying voltages to control various indicators.

A display circuit for visually displaying arabic numerals representing, for instance, the airspeed and range of a controlled aircraft which have been encoded in binary-decimal code combinations in the plane and transmitted to the control center and decoded is described in the joint application of D. E. Branson-W. T. Rea Serial No. 404,165, filed January 15, 1954, now Patent No. 2,784,397, granted March 5, 1957.

The matrix gate, per se, is described in detail in Patent 2,535,303 granted to W. D. Lewis, December 26, 1950 and Patent 2,673,936 granted to J. R. Harris, March 30, 1954.

A circuit unit which is widely employed in both the control center circuit and in the airplane or outlying station circuit is a transistor pulse emplifier. Such an amplifier is described in Patent No. 2,666,139 granted to R. O. Endres, January 12, 1954.

DETAILED DESCRIPTION OF CONTROL CENTER CIRCUIT

*Common Programming Circuits Transmitting Timing Pulse*

In the following description the values of constants cited are by way of example as an aid in understanding the invention and are not to be considered as limitations.

Refer now to FIGS. 1 to 7 disposed as in FIG. 8 which show the circuit at the control center. The program of the data transmitter is timed by the continuously running oscillator TRANS OSC, shown in the upper right of FIG. 2. The right-hand triode of double triode V201 is part of the oscillator circuit. The left-hand triode is used to square up the sinusoidal wave produced by the oscillator circuit and translate it into a trapezoidal wave with steep transitions. This wave is coupled to the base of pulse amplifier PP202 causing the amplifier to trigger on the negative going transient. The trapezoidal wave is also coupled to the emitter of pulse amplifier PP201 causing it to trigger on the positive going transient. It is pointed out that the timing pulse produced in pulse amplifier PP202 is formed near the zero degree phase point of the oscillator sine wave and the pulse produced by pulse amplifier PP201 is formed near the 180-degree phase point of the oscillator sine wave. These are employed, in a manner to be explained, as timing pulses for various purposes.

The negative pulse from the emitter load of pulse amplifier PP202 triggers the monostable pulse circuit PLS CCT, built around twin triode V203. The pulse circuit generates a square positive pulse about 14 microseconds long. This is amplified by tube V205 in the set zero amplifier "SET 0" AMP which produces the "set 0" pulse which is distributed to the control positions, such as shown in FIG. 1, to control the transmitting shift register TRANS SHIFT REG in each position, in a manner to be described hereinafter. The square positive pulse from tube V203 in the pulse circuit is also coupled to the base of pulse amplifier PP203 causing it to trigger on the negative going trailing edge. The positive pulse from pulse amplifier PP203 is in turn coupled to the base of pulse amplifier PP204, in the middle of FIG. 2, causing it to trigger at the trailing edge. Pulse amplifier PP204 thus initiates a pulse about 6 microseconds after the trailing edge of the square pulse from the pulse circuit PLS CCT. The positive pulse from pulse amplifier PP204 is amplified in gate amplifier tube "GATE" AMP for distribution to the control positions. This supplies the "gate" or "set 1" pulse to the individual transmitting shift register circuit TRANS SHIFT REGIS in each position, following the "set 0" pulse. The pulses from pulse amplifier PP204 are applied also through the count pulse conductor CPLS to the input of the left-hand or least significant stage of the transmitting binary counter TRANS BIN COUNT, at the lower left in FIG. 2. These count pulses are slightly delayed by a resistor capacitor network DELAY.

*Transmitting Binary Counter and Matrix Gates*

The transmitting binary counter TRANS BIN COUNT has seven stages and thus can be actuated to assume 128 different combinations. It is arranged, however, to normally count only 108 of these. Speaking in terms of the decimal equivalent of the binary number resting in the counter, the counter counts from 0 to 106 and then is caused to jump from count 106 to count 127, when counting the elements in any signal frame, and then run again through the sequence from 0 to 106. A number of count recognizing matrix gates MG0–15, MG8, MG23, MG36, MG39, MG47, MG49, MG57, MG62, MG67, MG73, MG75, MG83, MG88, MG101 and MG106 are connected to and controlled by the binary counter and by a condition, called a count recognizing pulse, applied to the right-hand terminal of each matrix gate from the output transformer T204 of the gate amplifier tube "GATE" AMP except matrix gate MG0–15 which receives its recognizing pulses from pulse amplifier PP201. The top matrix gate MG0–15 passes 16 pulses one for each of the counts 0 to 15, to control production of the double frequency reversal phasing signals, in a manner to be explained. Each of the other matrix gates passes a single pulse at the count corresponding to the numerical portion of its designation. To again anticipate, the bottom matrix gate MG106 passes a pulse at count 106 and initiates the resetting of the transmitting binary counter TRANS BIN COUNT to the all "1's" condition preparatory to its restoration to the all "0's" condition in response to the next pulse applied to it thereafter through the count conductor CPLS. The way this is performed will now be described.

The pulse from transformer T204, in the output of gate amplifier GATE AMP, FIG. 2, is applied to the right-hand or input terminal of matrix gate MG106, which is enabled by the combination of voltages applied by the transmitting binary counter TRANS BIN COUNT at count 106. The pulse passes through matrix gate MG106 and is applied to the base of the end of count pulse amplifier EOC at the upper right in FIG. 7, the output of which is amplified by the recycle program amplifier tube RCPA. The resulting negative pulse from transformer T107 is applied to each of the seven stages PC101 to PC107 of the transmitting binary counter TRANS BIN COUNT and sets each stage to the "1" condition which corresponds to count 127. This negative resetting pulse is also coupled through resistor CPR shown at the bottom of FIG. 2, to the count pulse lead CPLS for the purpose of inhibiting the count pulse which occurs nearly at the same time. This makes the resetting easier and more sure. Another winding on transformer T107 PP208, shown at the upper right in FIG. 7, furnishes a positive pulse to mark the beginning of a new message interval or frame. This is applied to the sequence control and position program control circuits for reasons to be made clear hereinafter.

The end of count pulse amplifier EOC is arranged to self oscillate at a low frequency. If the counter does not reach count 106, because of an initial lock-up condition, this circuit will reset the binary counter TRANS BIN COUNT to the all "1's" condition independently. Normally, the end of count pulse amplifier EOC is fired at the count interval 106 which occurs at a frequency considerably greater than the self oscillation frequency of this amplifier.

*Transmitting Flip-Flop*

The signal to be transmitted over the radio link is generated by the transmitting flip-flop circuit TFF, shown at the lower left in FIG. 2. The flip-flop circuit is a symmetrical bistable circuit and is controlled by set "0" pulses and set "1" pulses produced by pulse amplifiers PP208 and PP207 respectively. The "set 1" pulse amplifier PP207 is controlled in part by the "1" and "0" conditions of the signal elements in the address combinations and the word combinations produced in the individual control positions for the planes. The "set 1" amplifier PP207 is also controlled through matrix gate MG0–15 to produce signal reversals at twice the normal signaling rate which are employed as the phasing signals in the preliminary group of signals at the start of each frame. This will be described in detail hereinafter. The "set 0" pulse amplifier SET 0, at the lower left in FIG. 2, is triggered by the negative going trailing edge of the fourteen microsecond pulse from the pulse circuit PLS CCT. This occurs every cycle of the transmitting oscillator TRANS OSC and marks the beginning of a digital time slot. If a particular time slot is to be a "0" no further action is taken. If the time slot is to be a "1," the "set 1" pulse amplifier SET 1, is triggered, in a manner to be explained, about six microseconds after the impressing of the "set 0" condition. A sequence of "1's" at the output of the transmitting flip-flop TFF has a six microsecond "0" condition at the beginning of each time slot. The time allotted for each time slot is 150 microseconds and the six microsecond intervals are so short, compared to the time slot length of 150 microseconds, that the wave shaping circuit WS at the middle right in FIG. 7 in the connecting path to the radio modulator, removes them. The output of the transmitting flip-flop TFF is fed to the modulator of the radio equipment by way of this wave shaping circuit WS and the cathode of amplifier V606. This cathode follower is provided with controls for adjusting the amplitude and the direct-current level of the signal.

The "set 1" pulse which may occur just after the "set 0" pulse, as described in the foregoing, may originate in any of three different manners: first, from a "1" in the encoded data; second, from the requirement for a "1" parity digit as explained heretofore, and third, after a delay equal to the duration of one-half a time slot, from a pulse from pulse amplifier PP201 through matrix gate MG0–15. The "ready and phasing" portion of the synchronizing pattern, at the start of each signal frame, consists of 16 cycles of alternate "1's" and "0's," but at a cycle frequency the same as that of the transmitting oscillator. This requires setting the transmitting flip-flop to the "1" condition at the center of the time slot instead of setting it immediately after the normal "set 0" pulse which occurs at the beginning of each time slot. These 3 ways of setting the transmitting flip-flop to the "1" condition are described below.

*Generation of Synchronizing Pattern*

It was explained that the first portion of each frame consists of a preliminary group of signals which is employed to set the oscillator at the distant station in operation in synchronism with the transmitting oscillator at the station from which the signals are sent. It was explained also that this synchronizing pattern of signals consisted of a number of signal reversals, at twice the normal rate of signal transmission, followed by an interval equal in duration to an integral number of standard signal elements and then by a single start signal element. Specifically, a total of 24 signal slots are allotted to the preliminary group of signals before the start signal element is transmitted. Of these 24 signal slots, the first 16 are allotted to the transmission of the double frequency signal and during the following 8 no signals are transmitted. While each of the 16 signal intervals allotted to the transmission of synchronizing signals are being transmitted, during the first portion of each signal element interval, the "0" signal condition is transmitted and during the second half of each signal interval the "1" condition is transmitted.

In the transmission of the ordinary data signal elements, as distinguished from the preliminary synchronizing signal elements, as explained in the foregoing, if a "0" signal is to be transmitted the "0" condition is set into the transmitting flip-flop circuit TFF at the beginning of the signal slot and remains undisturbed throughout the duration of the signal element. If a "1" condition is to be transmitted, the "0" condition is inserted in the transmitting flip-flop circuit initially for a very short interval, specifically six microseconds, and then is replaced by a 1 condition which persists for the balance of the 150 microsecond interval. During the transmission of normal duration data signal elements the short "0" interval, which would appear as a short interruption only during the transmission of successive "1" condition signal elements, is eliminated by the wave shaping network WS. As distinguished from this, during the transmission of the preliminary phasing signal elements, the beginning of the "0" condition is established in the transmitting flip-flop TFF at the normal time, but the "0" condition is permitted to persist for the duration of one-half a normal signal element, or for 75 microseconds, and then is replaced by a "1" condition for the balance of the signal element interval or for 75 microseconds. Sixteen such reversals of 0's and 1 are thus produced at twice the normal signaling rate and are employed for synchronizing.

It has been explained that pulse amplifier PP201 shown at the middle right in FIG. 2, produces a negative pulse at the 180-degree phase position of the transmitting oscillator TRANS OSC. A series of negative pulses produced by pulse amplifier PP201 are, therefore, applied at the center of each signal element in a frame and the first 16 of them in a frame, those produced during the count 0 to 15, are passed through the top matrix gate MG0–15. The controlling inputs to gate MG0–15 are connected to the last four stages of the binary counter TRANS BIN COUNT and the matrix gate MG0–15 is enabled during counts 0 through 15. Since the transmitting oscillator produces a "set 0" pulse which is applied to pulse amplifier "SET 0" at the zero degree phase of each signal element in the entire frame, a "0" signalling condition will be produced at the beginning of every signal element in the frame. However, during the first 16 signal elements, the condition will be permitted to persist for one-half of each signal element and then will be replaced as the "set 1" pulses are applied from the output of matrix gate MG0–15 through pulse amplifier SET 1 on transmitting flip-flop circuits TFF. During the next 8 signal intervals in each frame, a "0" signal is transmitted.

*Generation of Start and Read-In Pulses*

At count 23 matrix gate MG23 is enabled. A pulse is passed to the transmitting flip-flop circuit TFF to set it to the "1" condition which is used as the start pulse to start the distant oscillators. This pulse is also used to "read in" the address, that is to transfer the address, which has been set up at the position allotted to the plane which is to be called from the contacts on which the address is set up, simulated by the two contacts K1 and K2 of a group of 12 such contacts, to the individual transmitting shift register TRANS SHIFT REG, shown at the left in FIG. 1, for the position.

The output of matrix gate MG23 triggers pulse amplifier PP102. The positive output pulse from pulse amplifier PP102 is amplified by tube V101 and impressed on transformer T101 which impresses it on all of the control positions, only one of which will be effectively connected to the transmitting flip-flop circuit TFF for reasons which will be made clear hereinafter. The negative read-in pulse from transformer T101 is also applied, through combining diode CD1, on pulse amplifier PP109, in FIG. 2, to trigger pulse amplifier PP109. The resulting negative pulse from transformer T203 passes through the start and parity gate SAPG to trigger amplifier SET 1 of the transmitting flip-flop TFF to the "1" signaling condition. The start and parity gate SAPG is enabled at this time by a "0" condition of the parity binary counter PAR BIN COUNT in a manner which will be made clear hereinafter. The pulse from transformer T203 is also applied through conductor SPCO to set the parity binary counter PAR BIN COUNT at the "0" counting condition, preparatory to counting the "1" signaling conditions among the elements of the following address combination.

*Generation of Data Pulses and Parity Digits*

When the transmitting shift register TRANS SHIFT REGIS at the particular plane position which has been enabled, in a manner to be described, has had all of the elements of the address read into it, the 12 signal elements constituting the address are read out, one element at a time. By this is meant that the condition in stage 12 is first applied to the output of the transmitting shift register followed in turn by the elements which have been transferred from stages 11, 10, 9, etc., the signal condition in each stage being transferred to a higher numbered stage, one signal element for each time slot. The signal elements in the transmitting shift register comprise a group of "0" and "1" conditions in any combination. The first "1" signaling condition to appear at diode LHD, in the position outgoing data gate PODG, which diode is connected to the 12th stage of the transmitting shift register TRANS SHIFT REGIS in FIG. 1, enables the gate. This pulse, after passing through the gate, through the outgoing data conductor, is applied through resistor DGR, at the middle left in FIG. 2, to the lower terminal of the position data diode gate PODG. This permits the "gate" or "set 1" pulse from transformer T204 to trigger pulse amplifier PP206 on the base. The positive pulse output is applied by way of transformer T202 and pulse amplifier SET 1 to set the "1" condition in the transmitting flip-flop TFF. The positive pulse from pulse amplifier PP206 is also impressed on the parity binary counter PAR BIN COUNT. The function of the parity binary counter is to count the number of 1's appearing in the address and in each word in a frame. Since the parity binary counter PAR BIN COUNT was set to zero at the start pulse, it can determine whether the 12 address digits include an even or an odd number of 1's.

At count 36 parity gate MG36 passes a pulse which triggers pulse amplifier PP103. This is amplified by amplifier V102 and distributed to the control positions for all of the planes for the read-in of the signal combination defining word 1, from the elements on which the signal combination is stored, to the transmitting shift register TRANS SHIFT REGIS at the position. It is to be understood that only one such position will be enabled at any one time, in a manner to be described. This pulse also is impressed through combining diode CD2 on pulse amplifier PP109 triggering the amplifier. The output pulse from amplifier PP109 must pass through the start and parity gate interconnecting the secondary of transformer T203 and pulse amplifier "SET 1" before it can be effectively applied to the transmitting flip-flop circuit TTF.

Since the parity binary counter PAR BIN COUNT, FIG. 2, was set to "0" at the start pulse, it goes through its two-count cycle, first to the "1" condition and then to the "0" condition for every pair of "1" conditions applied to it. Therefore, if the number of "1's" in the address is even, the parity counter will be in its "0" condition at the termination of counting the "1's" in the twelve-signal elements in the combination for the address. When the parity binary counter PAR BIN COUNT is in the "0" condition, it enables the start and parity gate SAPG and permits the pulse at count thirty-six to pass. This pulse if permitted to pass, in effect, adds a "1" condition signal element to the address, so that the number of "1'" in every address is odd.

If the number of "1" condition signal elements among the twelve-signal elements in the address is odd, there is no need to add a "1" signal element condition. The parity binary counter PAR BIN COUNT, responsively, assumes its "1" counting condition which disables start and parity gate SAPG preventing the insertion of another "1" signal element condition in the transmitting flip-flop circuit TFF which therefore remains in its "0" condition throughout the transmission of the thirteenth signal element.

At the distant terminal, when the address is received, it is subjected to a parity count to determine if it contains an odd number of "1's." Only under this condition is it accepted as plausible. The same parity count is applied to each word of the five-word group comprising a frame, so that each word, also, must contain an odd number of "1's" in order to be accepted as plausible. The pulse at the thirty-sixth count is applied through conductor SPCO to set the parity binary counter to "0," as did the start pulse, so that the parity binary counter is in condition to count the number of "1's" in the first word. This process is repeated each time a word is transmitted. The pulse from the matrix gate which shifts the following word into the shift register is simultaneously applied to the start gate SAPG controlled by the parity binary counter. The start gate SAPG will be enabled only if there are an even number of "1's" in the previous word, so that the odd "1" is added as the last signal element of the preceding word. These pulses are passed also through matrix gates MG49, MG62, MG75 and MG88, respectively, pulse amplifiers PP104, PP105, PP106 and PP107, respectively, tubes V103, V104, V105 and V106, respectively, and transformers T103, T104, T105 and T106, respectively, to individual parallel branches for each circuit. One set of the parallel branches is impressed on "read-in" circuits for words 2, 3, 4 and 5, respectively, as were the pulses from matrix gates MG23 and MG39 applied to the "read-in" circuits for the address and word 1. The other parallel branches extend through combining diodes CD3, CD4, CD5 and CD6 before being applied to pulse amplifier PP109 and the start and parity gate SAPG for the parity check on words 1, 2, 3 and 4, respectively. The pulse at the end of the fifth word, at count 101, passes through matrix gate MG101, pulse amplifier PP108, combining diode CD7, pulse amplifier PP109 and start and parity gate SAPG. This pulse, as is apparent from the circuit, is not applied to any "read-in" gate, as the reading in of the five words was completed at count 88. At count 101 it is required only to perform the parity check on the fifth word. The negative pulse from the emitter circuit of amplifier PP108, which is applied through combining diode CD7 to the base of pulse amplifier PP109 and controls the insertion of the parity digit for word 5, also resets the parity binary counter so that it will be in the "0" condition when the "read-in" of the address occurs in the next message frame. It has been explained that following the phasing and waiting signals in the preliminary signal group in each frame, the first signal is a "1" condition signal element, which serves as a start signal. Setting the binary counter to the "0" count condition, in response to the pulse at count 101, sets the start and parity gate, associated with the parity binary counter, so that the start pulse can pass through the gate to the transmitting flip-flop.

*Transmit-Receive Control*

The ground terminal of the present system alternates between a transmitting and a receiving condition, transmitting for two message frames and then receiving for two message frames. The transmiter must, therefore, be keyed by a two-on two-off sequence. This is accomplished by a frame counter FRCT, shown at the upper right in FIG. 7, which is a two-stage binary counter driven by positive pulses from transformer T107 which occur at the beginning of each message frame. It will be recalled that a pulse was produced through matrix gate MG106 at the end of counting for a frame, and that this pulse was applied through the end-of-count pulse amplifier EOC and the recycle program amplifier RCPA and applied to transformer T107. Every time an entire frame has been counted, a pulse is applied, from a winding on transformer T107, on the input of frame counter FRCT. Each time the frame counter counts two cycles it applies a condition to tube V305 which switches the radio equipment by means of the radio switch RDSW, which may be a relay, for instance, between the transmitting and receiving condition.

When the transmitting binary counter TRANS BIN COUNT in FIG. 2 reaches count 8 in each frame, a pulse is passed through matrix gate MG8 in FIG. 4 and impressed on pulse amplifier PP101. The output of pulse amplifier PP101 is impressed on transformer T301 and a negative pulse produced in the secondary of this transformer is impressed on diode gate CED connected to the input of pulse amplifier PP301 in FIG. 7. The frame counter FRCT in FIG. 7 during both of the two frames in each four-frame cycle during which transmission occurs, applies an enabling condition through resistor FCR to the diode gate CED associated with pulse amplifier PP301. At count 8, therefore, in each of the two transmitting frames, a pulse is passed through pulse amplifier PP301 and transformer T302. This pulse is used to prepare the control position from which the message is to originate. This will be described in detail hereinafter.

A manual key RESET, shown at the upper right in FIG. 7, is provided for starting the frame binary counter FRCT in the "11" condition when power is first applied. The frame counter then is in condition to start its four-count cycle, 00, 01, 10 and 11, for frame counts 1, 2, 3 and 4, respectively.

*Position Sequence Control*

The order in which the control positions assigned to the planes are permitted to transmit, is determined by the position sequence control circuit, shown at the upper left in FIG. 7. The sequence is controlled by the gas stepping sequence tube SQS. This tube has ten output cathodes and is able to control ten positions. The number of tubes such as SQS which are employed will depend upon the number of planes and plane positions to be controlled. The discharge in the tube from the common anode to each of the ten individual cathodes is stepped from cathode to cathode by pulses from the output of pulse counter stage PC104 of the transmitting binary counter TRANS BIN COUNT, in the lower portion of FIG. 2. This stage produces a pulse seven times per message frame. The square wave from stage PC104 is impressed on the input of tube V303, in the upper middle portion of FIG. 7, and in turn on the input of tube V302 before being impressed in parallel on the individual cathodes of stepping tube SQS. Tube V304 serves to interrupt the stepping of stepping tube SQS when it is in the conducting condition. There is an individual position start gate POSG, such as that shown at the upper left in FIG. 7, for each plane control position . Two conditions are necessary to enable this gate which, when enabled, stops the stepping of stepping tube SQS. One of the conditions is that the particular cathode of tube SQS which is individual to the plane control position, must be activated at the time. The other condition is that the control position assigned to the particular plane should be ready to transmit. When both of these conditions obtain, the voltage applied to the right-hand terminal of each of the two left-hand diodes in the position starting gate POSG will be near "0." This will cause the point X in the position start gate, individual to the plane control position, to swing positive, causing tube V304 to conduct. This, in turn, causes tube V302 to remain non-conducting and prevents further stepping action. The discharge thus continues from the anode to this particular cathode in sequence stepping tube SQS. This stops the poling of other positions while transmission from the selected plane control position proceeds. Each plane position start gate POSG is connected in parallel to the grid of tube V304, for interruption of the stepping tube SQS when a particular plane control position is found ready. The positive swing of point X in the position start gate also enables a position start pulse from transformer T302 to be routed to the control position. As soon as the position start pulse reaches the control position for the particular plane which is to be addressed, it sets up the transmitting condition. This permits the data from the transmitting shift register TRANS SHIFT REGIS individual to the plane control position to control the transmitting flip-flop circuit in FIG. 2 and also removes the ready condition to permit the stepping tube to hunt for the next position in the sequence which is ready.

*Code Translation Control*

Part of the data read into the transmitting shift register TRANS SHIFT REGIS, associated with each plane position, shown in FIG. 8 is in the Gray or reflected binary code. These digit sequences are translated to ordinary binary code as they are shifted between the eleventh and twelfth stages of the transmitting shift register TRANS SHIFT REGIS, FIG. 1. The translation periods are switched on and off by a two-condition signal generated by a flip-flop circuit comprising transistor PB101, in the top middle portion of FIG. 4, and distributed to the plane control positions by cathode follower V107B. Flip-flop transistor PB101 is triggered on the base to the "1" condition by negative pulses from matrix gate circuits MG39, MG49, MG67 and MG75. It is set to the "0" condition by a negative pulse on the emitter of transistor PB101 obtained from pulse amplifier PP111 which is, in turn, triggered by the output of matrix gates MG47, MG57, MG73 and MG83. As explained, the matrix gates pass a pulse at the count indicated by the numbered portion of their designation. Four periods of translation are thus obtained during each message frame and portions of four words, originally encoded in the GRAY code are thus translated into the regular binary code. How this is done is described in detail in W. J. Cadden–B. Ostendorf, Jr. Patent 2,982,953, issued May 2, 1961 further identified in the foregoing.

RECEIVING FROM THE PLANES OR OUTLYING STATIONS

*Synchronization of Receiving*

The reply mesasges from the aircraft or outlying stations are similar to those sent to them from the control center except that no address is included. This makes the reply short enough so that there is sufficient time in the message frame interval of the ground terminal to allow for a round trip propagation time up to three milliseconds.

The radio equipment is indicated by a rectangle in the lower right-hand portion of FIG. 7. To anticipate, all incoming signals from the radio receiver pass through amplifier V601A. Connected to the anode output circuit of this tube are three parallel branches 1, 2 and 3. The preliminary signals are applied to all three branches to first condition the receiving start gate RSG to start the receiving oscillator in the common receiving equipment. The branches are frequently selective. Branches 1 and 2 of the three-branch input circuit pass the preliminary signals. Branch 3 passes the data bearing signal elements following the preparatory signal elements.

The demodulated radio signal is supplied to the present data multiplex terminal by way of a cathode follower, not shown, in the radio equipment indicated by a rectangle in the lower right of FIG. 7. This received signal has a voltage swing of about four volts and is normally centered and about plus two volts, but this varies with frequency variations in the transmitter and in the receiver. This incoming signal is amplified by tube 601A and passed through a low-pass filter LPF which attenuates the noise at frequencies above the fundamental signaling frequency of 3,350 cycles, for instance. The output of the low-pass filter is coupled by way of the gain control circuit GC and capacitor GCC to the grid of cathode follower V602A. Definite direct-current levels for the two-valued signals are established at this point by the suitably biased diodes of tube V605. One diode conducts if the signal on the grid of tube V602A becomes more positive than plus nine volts and the other diode conducts if the signal becomes more negative than minus thirty-two volts. When the diodes conduct, capacitor GCC changes its charge so as to keep the signal centered between these two direct-current potentials. The output from low-pass filter LPF is adjusted to have a swing of about forty-one volts, so that the diodes need to conduct only to restore the proper direct-current levels to the signal. The ouput from cathode follower V602A is applied to tube V601B which responds to a narrow range of input voltage near minus fourteen volts. The bias control potentiometer BCP is adjusted to center the large signal from tube V602A about this narrow range. The output of tube V601B is of consequence as approximate square wave corresponding to a narrow slice through the center of the signal from tube V602A. The amplifier control potentiometer ACP provides adjustment of the swing of this squared wave so that the output, as repeated by cathode follower V602B, has a direct-current signal of about zero volts for a "0" condition and minus fourteen volts for a "1" condition. A low impedance direct-current signal without varying signal bias due to frequency drifts is thus obtained to feed the digital circuits.

The output from the anode circuit of tube V601A in the coupling circuit is attenuated and advanced in phase by the resistor-capacitor network PHASE NET, the output of which is applied to amplifier V501A and passed through band-pass filter F501. This filter accepts the ready and phasing portion of the synchronizing pattern at the beginning of the incoming frame and is narrow enough so that it requires the entire sixteen cycles of the "0" condition and "1" condition reversals, described in the foregoing, to reach steady state. The current in the output section of filter F501 passes through zero in the negative direction near the center of the incoming digit intervals. This causes the emitter current of the transistor PP501 to change from positive to negative and its collector voltage to swing sharply negative. This negative transient triggers pulse amplifier PP502 on the base. A negative pulse is thus obtained from transformer T501 at the center of each incoming digit interval after the filter output has built up sufficiently. The base of the transistor PP501 is biased positively so that current output from filter F501 must reach a certain value before any output from the collector of transistor PP501 is obtained. The gain of tube V501A is adjusted so that no output from transistor PP501 is obtained in the absence of RF signal. Due to the delay through filter F501, the series of negative output pulses produced persist during the seven-element no-signal interval following the sixteen reversals and the negative pulses bracket the position of the incoming start element, which occurs immediately after the end of the seven-signal element no-current interval.

The output from the anode circuit of tube 601A in the coupling circuit is also amplified by tube V501B and applied to the tuned detector TD. This circuit has a tuned transformer TT which responds to the sixteen cycles of the ready signal. Connected to the output of the tuned transformer TT is a full wave bridge rectifier FWB which produces output voltage. This voltage builds up before the pulses from transformer T501 start and remains positive until shortly before the arrival of the start element.

Deferring for the present a description of the function of diode SGI, the receiving start gate RSG, shown at the middle left in FIG. 7, has three controls derived from the incoming signals. These are, first, the negative pulses from transformer T501, each of which tends to enable the gate; second, the output of the tuned detector TD and full wave bridge FWB which remains positive and disables the gate until just before the arrival of the start element; third, the incoming data signal pulses from tube V602B. The start gate produces a negative output pulse only after the positive wave from the tuned detector TD and the full wave bridge FWB have subsided to 0 and the negative start element from tube V602B persists, and only at the instant that a negative pulse is obtained from transformer T501 while the start element persists. The output of the tuned detector TD and full wave bridge FWB inhibits the start gate until one or two time slots before the arrival of the incoming start element. The particular short sharp negative pulse from transformer T501 which occurs at the center of the negative start element passes through the start gate.

*Start-Stop Oscillator and Generation of Timing Pulses*

The recognition of the start pulse, as described above, causes the receiving program at the control center to start. The output oft he receiving start gate RSG, at the middle left in FIG. 7, triggers pulse amplifier PP503, which in turn drives the start pulse amplifier V503. The resulting negative pulse from transformer T502 sets all stages oft he receiving binary counter REC BIN COUNT, at the right in FIG. 6, to the "1" condition, and triggers monostable circuit PP504 to the "0" condition. The negative collector swing of monostable circuit PP504 cuts off tube V504 and interrupts the "stop" current flowing in the tuned circuit of the start-stop receiving oscillator REC OSC. This causes the oscillator circuit which is associated with the right-hand half of twin diode V505 to start with the voltage at the cathode in the zero degree phase of a sine wave. The left-hand half of tube V505 serves to limit the oscillator wave to a trapezoidal form which has its negative going transient at the centers of the incoming digit intervals. These negative transients trigger pulse amplifier PP505 on the base. The output of amplifier PP505 in turn triggers monostable pulse circuit PS501. This circuit generates a twenty-microsecond "set 0" pulse followed by a "gate" or a "set 1" pulse. The "set 0" pulse is amplified by amplifier V507 and the "gate" or "set 1" pulse is amplified by amplifier V508. These pulses are distributed to the control positions for operation of the receiving shift registers.

*Sampling of Incoming Data Signal*

The "gate" pulse is used to sample the incoming data signal. The "gate" or "set 1" pulse and the incoming data signal are impressed on the data sample gate DSG, at the middle right in FIG. 5. For each signal element incoming in the data signals which is a "1" the "set 1" pulse passes through the data sample gate and triggers transistor PB501 to the "1" condition. This data sample gate together with the bistable circuit PB501 serves as the initial stage of the receiving shift registers, such as REC SHIFT REG, shown for one plane position in FIG. 5. Its direct-current output is distributed to the control positions by way of cathode follower V509A. The "set 0" pulse resets PB501 to the "0" condition preceding each data sampling by the gate or "set 1" pulse.

The positive transition oft he trapezoidal wave from the receiving oscillator circuit REC OSC, top of FIG. 6, is used to trigger pulse amplifier PP507, shown at the left in FIG. 6. The resulting negative pulses from transformer T507 are gated by the state of bit circuit PB501 and then counted by the receiving parity binary counter circuit RPBC made up of pulse amplifier PT501 and bistable stage PT502. The receiving parity binary counter gate RPBG is enabled by a "1" condition of the data sample gate PB501 so that the parity counter can determine whether the "1's" in the incoming word group are odd or even.

*Generation of Read-Out Pulses*

The "set 0" pulse from pulse circuit PS501, at the upper left in FIG. 6, triggers pulse amplifier PP506 on the base. Positive pulses from pulse amplifier PP506 are slightly delayed bf resistor DR and capacitor DC and used to drive the seven-stages PC401 to PC407 of the receiving binary counter REC BIN COUNT. Negative pulses from transformer T503 are applied to the right-hand terminal of matrix gates MG12, MG25, MG38, MG51 and MG64, in parallel, for count recognition. These gates are connected to the binary counter stage so as to be enabled at counts 12, 25, 38, 51 and 64, respectively. The output pulse from each of these gates occurs one time slot after the thirteenth digit of a code group is stored in PB501 and about one-half time slot after it has been counted by the receiving parity binary counter RPBC. The outputs of the matrix gates trigger pulse amplifiers PP401, PP402, PP403, PP404 and PP405. Negative pulses from the associated transformers T401, T402, T403, T404 and T405, respectively, are distributed to the control positions, for initiating the read-out of the accumulated word group in the receiving shift registers, such as REC SHIFT REG, in FIG. 5. The read-out pulses are inhibited by a "0" condition of the receiving parity counter RPBC, resulting from an even count of "1's" in any word. Since only an odd number of "1's" are transmitted in each word, an even count indicates an error in transmission and the erroneous data is not read out in the storage. At each read-out pulse the parity receiving binary counter RPBC is reset to the "0" condition to be prepared to count the "1's" in the next word group. This is performed by directing the pulse which reads out each word from the output of transformer T401 to T405, respectively, also through an individual combining diode RCD1, RCD2, RCD3, RCD4 and RCD5 and through the "set 0" conductor to the receiving parity binary counter RPBC. If the read-out pulse is inhibited the count requires no resetting. The inhibiting of the read-out for the first four words, that is preventing a pulse for any of the first four words from passing so as to perform the read-out function, is accomplished by a neagtive swing from stage PT502 of the receiving parity binary counter RPBC, applied to the upper terminal of diodes PD1, PD2, PD3 and PD4, respectively. The read-out for the fifth word is also inhibited by the same negative swing being applied to a separate gate PD5 on the output side of transformer T405. This is done because the pulse from the gate for the fifth word PG64 is employed also for ending the received program.

*End of Received Program*

The occurrence of the last read-out pulse from transformer T405, at the bottom of FIG. 6, triggers the monostable circuit PP504 at the top of FIG. 6 back to the "1" condition. The positive collector swing from monostable circuit PP504 causes tube V504 to conduct and clamps the oscillator, that is to say prevents the further oscillation of the receiving oscillator REC OSC, the right-hand half of tube V505. The receiving binary counter REC BIN COUNT thus rests after reaching count 65, until the reception of another synchronizing pattern, at the beginning of another received signal frame recycles the program. If for some reason the receiving binary counter REC BIN COUNT should not reach count 64, monostable circuit PP504 restores to the "1" condition automatically and stops the receiving start-stop oscillator. While monostable circuit PP504 is in the "0" condition, the output of the receiving start gate RSG in the middle left of FIG. 7 is inhibited by a negative swing from the collector of transistor PP504 through the start gate inhibiting diode SGI to prevent early recycling of the program by the sampling of "1" data pulse in the early portion of a frame following the start pulse.

CONTROL POSITION CIRCUITS

*Position Program Control*

The POSITION PROGRAM CONTROL circuit, at the right in FIG. 3, controls the gates which connect each plane control position to the common transmitting and receiving portions of the surface terminal. It also controls the rate of access to the system.

As described in connection with the common portion of the surface terminal, when a control position is to start a transmitting period, a position start pulse is routed to it. This pulse triggers pulse amplifier PP201, shown in the right middle portion of FIG. 3, on the base. The position program binary counter PPBC has two stages PC201 and PC202. It is in the "11" condition at the time of reception of the first or position start pulse and the positive pulse from pulse amplifier PP201 advances the counter to the "00" condition. In this condition the position outgoing data gate PODG, at the top in FIG. 1, individual to the plane position control circuit, is enabled by conditions applied, from stages PC201 and PC202 of the position program binary counter PPBC, to the lower terminals of diodes P01 and P02, respectively, in the gate. The enabling of the position outgoing data gate PODG provides a connection from the output of the transmitting shift register TRANS SHIFT REGIS, shown at the left in FIG. 1, individual to the enabled position, to the transmitting flip-flop circuit TFF, at the lower left in FIG. 2. At the beginning of each message frame, a frame count pulse is fed from transformer T107, at the upper right in FIG. 7, to the first binary counter stage PC201 of the position program binary counter PPBC by way of the count gate CTGT, in FIG. 3. Thus, at the end of the message frame, during which data from the transmitting shift register TRANS SHIFT REG is passed to the transmitting flip-flop, the position program binary counter PPBC, on receiving a frame count from transformer T107 advances to the "01" condition and closes the position outgoing data gate PODG. At the next frame count pulse, the position program binary counter PPBC advances to the "10" condition. This condition enables the five position read-out gates PRG1 to PRG5, at the bottom right in FIG. 5. One of these gates is in series with each of the read-out conductors for each of the five words, conductors ROW1, ROW2, ROW3, ROW4 and ROW5, respectively, and permits the data accumulated in the receiving shift register to be read out to the storage circuits by controlling the individual shift pulse circuit PS201 to PS205 individual to each of the five-word storage banks. At the end of the message interval which accommodates the reply, the counter, in response to a frame count pulse from transformer T107 in FIG. 7, advances to the "11" condition. This closes the count gate CTGT preventing the counter from following the "frame count" pulse from transformer T107. In addition tubes V201 and V202 which had been conducting during counts "00," "01" and "10" receive a negative swing on the grids and both cut off. Tube V201 being cut off restores full anode voltage to gas triode V203. Tube V202 being cut off permits capacitor CAR to charge positively. After an interval, depending on the value of the capacitance of capacitor CAR, gas triode V203 triggers and the voltage at its cathode rises from negative fourteen volts to about zero volts, for instance. This voltage swing constitutes the position ready signal. As previously explained, this results in the control position having a position start pulse routed to it in the proper sequence. When the counter is advanced to the "00" condition at the start, the count gate CTGT, in FIG. 3, is again enabled and tubes V201 and V202 again conduct. This extinguishes gas triode V203 by lowering the anode voltage and discharges the timing capacitance CAR to a low voltage. The position ready signal is thus removed and the sequence control circuit is released.

*Transmitting*

The data to be transmitted from the control positions originate either from open-and-close contacts or from code discs read by phototransistors, which apply voltage conditions, zero voltage for a "1" condition and minus fourteen volts for a "0" condition, for instance, to the individual gate for each stage. Each digit to be transmitted is provided with an individual read-in gate, TRG1–12, shown at the left in FIG. 1, which when its control lead is at zero voltage permits an individual read-in pulse for any stage to pass to the assigned shift register stage PB101 to PB112 and set it to "1." When the read-in gate control is at minus fourteen volts, the read-in pulses are blocked and the associated shift register stage is left in the "0" condition.

The shift register operates under control of the "set 0" and "gate" pulses distributed from the common equipment, the "set 0" pulse being supplied from transformer T205 in FIG. 2 and the "gate" or "set 1" pulse being supplied from transformer T204 in FIG. 2. These pulses are applied in parallel to the inputs of all stages of the transmitting shift registers TRANS SHIFT REGIS. After a word has been read into the shift register, the whole pattern of "1's" and "0's" is shifted along by one stage for each digit interval. Each digit thus appears in time sequence in the twelfth stage PB112 of the register and is passed through the position outgoing data gate PODG to the transmitting flip-flop circuit TFF, at the lower left in FIG. 2, as described previously. The last digit of the word is sent to the common equipment as it is being erased from stage PB112. The shift register thus contains all "0's" at the beginning of the next digit interval when read-in of the next word group occurs. Since, at the time of read-in, stage PB112 is in the "0" condition, no "1" data pulse can pass through the common equipment to interfere with the insertion of the parity check digits.

Most of the encoded information from the optical encoders, such as OE1 and OE2 in FIG. 8, is in the Gray or reflected binary code. This is translated to the ordinary binary code in the transmitting shift register TRANS SHIFT REGIS by a special gating arrangement which is interconnected between the eleventh and twelfth stages PB111 and PB112. This is described in detail in Patent 2,982,953, issued to W. J. Cadden and B. Ostendorf, Jr. on May 2, 1961, mentioned in the foregoing. In general, this gate structure makes a comparison between the states of the eleventh and twelfth stages and sets the twelfth stage to "1" when the states are found to be opposite. The gate has two parallel paths, one of which is enabled by a 1–0 comparison and the other by a 0–1 comparison. When no translation is required the code translation control conductor CTRC, which extends from the cathode of tube V107B in FIG. 4 to the Gray to binary translator, shown in the upper left of FIG. 1, swings negative and the gate control from the twelfth stage is made to appear as a "0" continuously. In this condition a "1" in the eleventh stage causes a "1" to be shifted into the twelfth stage.

The read-in pulses for the address and for each of the five data bearing words occur once each during every message frame, so that the data originating in the control position appears once a frame in time sequence at the output of the twelfth shift register stage PB112. However, the data are allowed to pass through the position outgoing data gate PODG and the transmitting flip-flop circuit TFF in the common equipment only during the particular frames in which the control position has access to the transmitter.

*Receiving*

Figure 5:
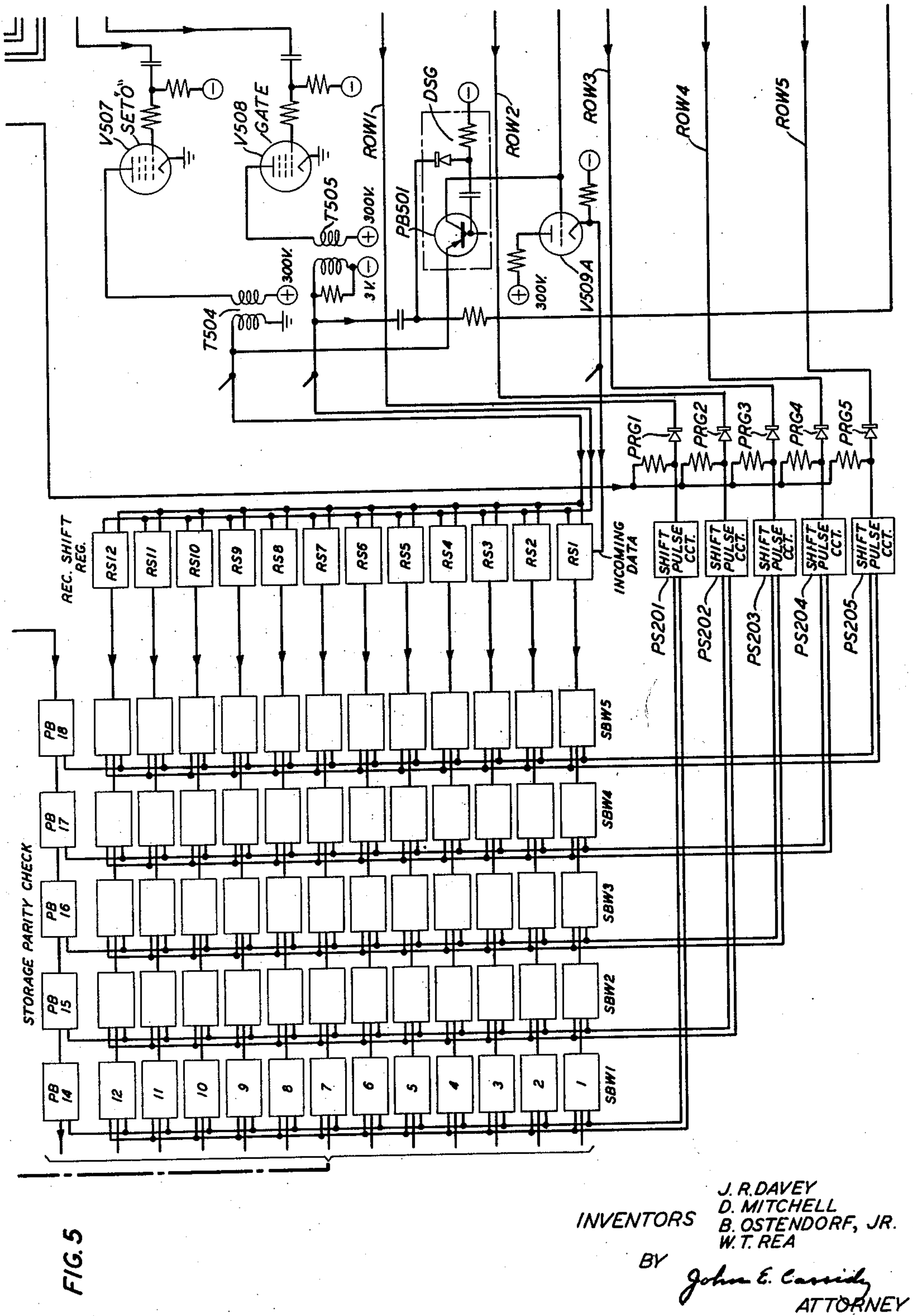

The receiving shift register REC SHIFT REGIS, with its twelve stages RS1 to RS12, is controlled by the "set 0" and "gate" amplifiers V507 and V508, respectively, at the right in FIG. 5. These amplifiers are driven by the receiving start-stop oscillator REC OSC as previously described. The first shift register stage has its gate enabled by the receiving shift register input stage PB501, at the right in FIG. 5 which is in the common equipment. The receiving shift register thus has all incoming messages shifted through it. Read-out pulses are distributed to the control positions for each received word which meets the parity check. These are effective in a particular position only if the position read-out gates PRG1 to PRG5, shown at the bottom of FIG. 5, are enabled. These gates are enabled during the second message frame after the position has transmitted, so that only the reply intended for the particular control position will be read out to storage. When the read-out pulses for word 1 passes through its enabled position read-out gate it triggers pulse circuit PS201. This circuit produces a "set 0" pulse which erases the previous data in the twelve storage bit circuits for word 1 and then the "gate" pulse causes the data then resting in the receiving shift register to be duplicated in the storage bank of word 1 SBW1. The output of the storage bank circuits may either operate relays, such as relay RSR in FIG. 3, drive evaluation amplifiers such as amplifiers PT1 in FIG. 3, or feed direct voltage swings into a code-to-voltage resistance network. These cooperative circuits are described in U.S. Hazlett Patent 2,973,510, issued February 28, 1961, and in J. R. Davey Patent 2,954,928, issued October 4, 1960, further identified in the foregoing.

Five storage parity checking circuits, PB14, PB15, PB16, PB17 and PB18 are used to store the receiving parity check results. Storage circuit PB14 at the top left in FIG. 5, for word 1, illustrates this feature. Each time a synchronizing pattern is recognized by the common receiving circuit in the lower portion of FIG. 7, and a pulse is passed from transformer T502, at the middle left in FIG. 7, to start the transmitting oscillator TRANS OSC, simultaneously a reply started pulse is sent through the reply started conductor RPYS and through a gate controlled by the position binary counter PPBC to pulse amplifier PP202, in the control position, FIG. 3. This triggers pulse amplifier PP202 when the position program control is in the receive or "10" count condition. The output from pulse amplifier PP202 is passed through transformer T202 and triggers parity count storage circuits PB14, PB15, PB16, PB17 and PB18 to the "1" condition. If the parity check for word 1 is met, read-out occurs and storage circuit PB14 is set to the "0" condition when shift pulse circuit PS201 is triggered. If the parity check for word 1 is not met, no read-out occurs, and storage circuit PB14 remains in the "1" condition, giving indication of erroneous transmission to a connected indicating circuit. Storage circuit PB14 is restored to the "0" condition at the next read-out.

Storage circuit PB201, at the upper left in FIG. 3, is arranged to indicate the absence of a reply. At count 8 of the transmitting program generator a pulse is passed through matrix gate MG8, in FIG. 4, pulse amplifier PP101 and transformer T301. This pulse is applied through the "no reply" "set 0" conductor NRS0 and through a gate controlled by the position program binary counter to the base of pulse amplifier PP203 in each position. When the control position is in the receive condition, this pulse triggers pulse amplifier PP203. The output of pulse amplifier PP203 is used to set storage circuit PB201 to "0". If a reply starts the receiving program generator, the reply received pulses from pulse amplifier PP202 in the control position, sets storage circuit PB201 back to 1. As long as replies are registered, received storage circuit PB201 keeps relay K431 operated and the reply lamp REPLY remains lighted.

DESCRIPTION OF THE TERMINAL CIRCUIT IN PLANE OR OUTLYING STATIONS

*General Description of Operation*

Before proceeding with the detailed description of the operation of the terminal circuit in the plane, or at the outlying station, the circuit will first be described generally.

Refer now to FIGS. 9 to 17 arranged as in FIG. 18. The plane or outlying station is equipped with a combined radio transmitter and receiver, shown at the left in FIG. 9, which is used both to receive the incoming signal frames from the control center and to transmit the frames of signals generated in the plane or outlying station to the control center.

The incoming signals received when the radio equipment is in the receiving condition are applied by way of a cathode follower, not shown, connected to the radio equipment on tube 601P. Connected to the output of tube 601P are three parallel branches, 1, 2 and 3, which are identical with those described for equipment connected to the receiver at the control center. The function of this equipment is to properly phase the oscillator in the plane and to positively identify the first or start signal element, following the phasing and waiting signal elements, as described heretofore. After passing through the start gate PSTG, shown at the upper right in FIG. 9, the signals are applied to the plane start amplifier PSTAM shown also at the upper right in FIG. 9. The start pulse triggers the monostable control circuit PMSC, at the upper left in FIG. 11, which in turn deactivates the plane oscillator stop tube POSP, shown at the upper left in FIG. 12. This starts the plane oscillator circuit POSC.

Figure 9:
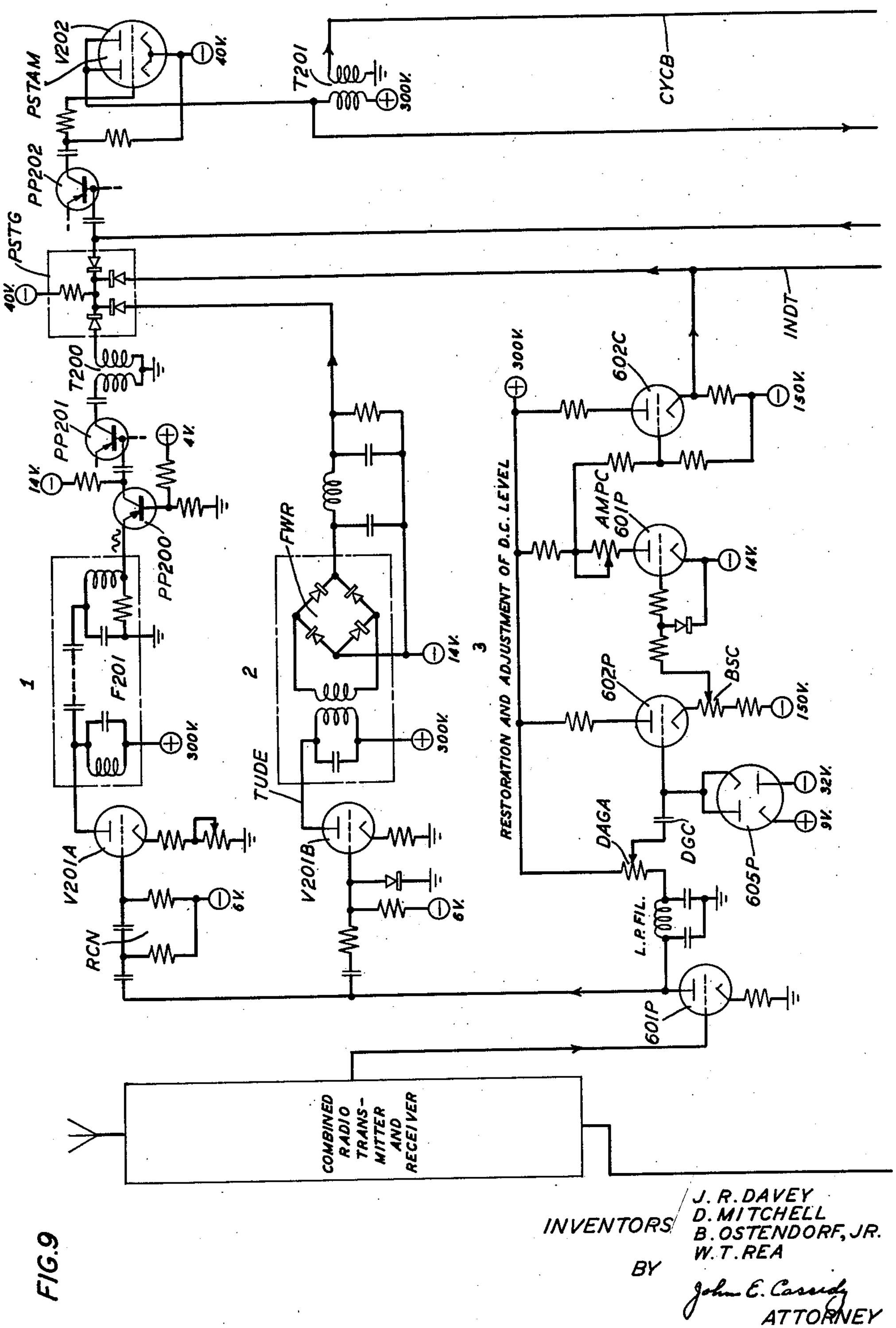
Figure 12:
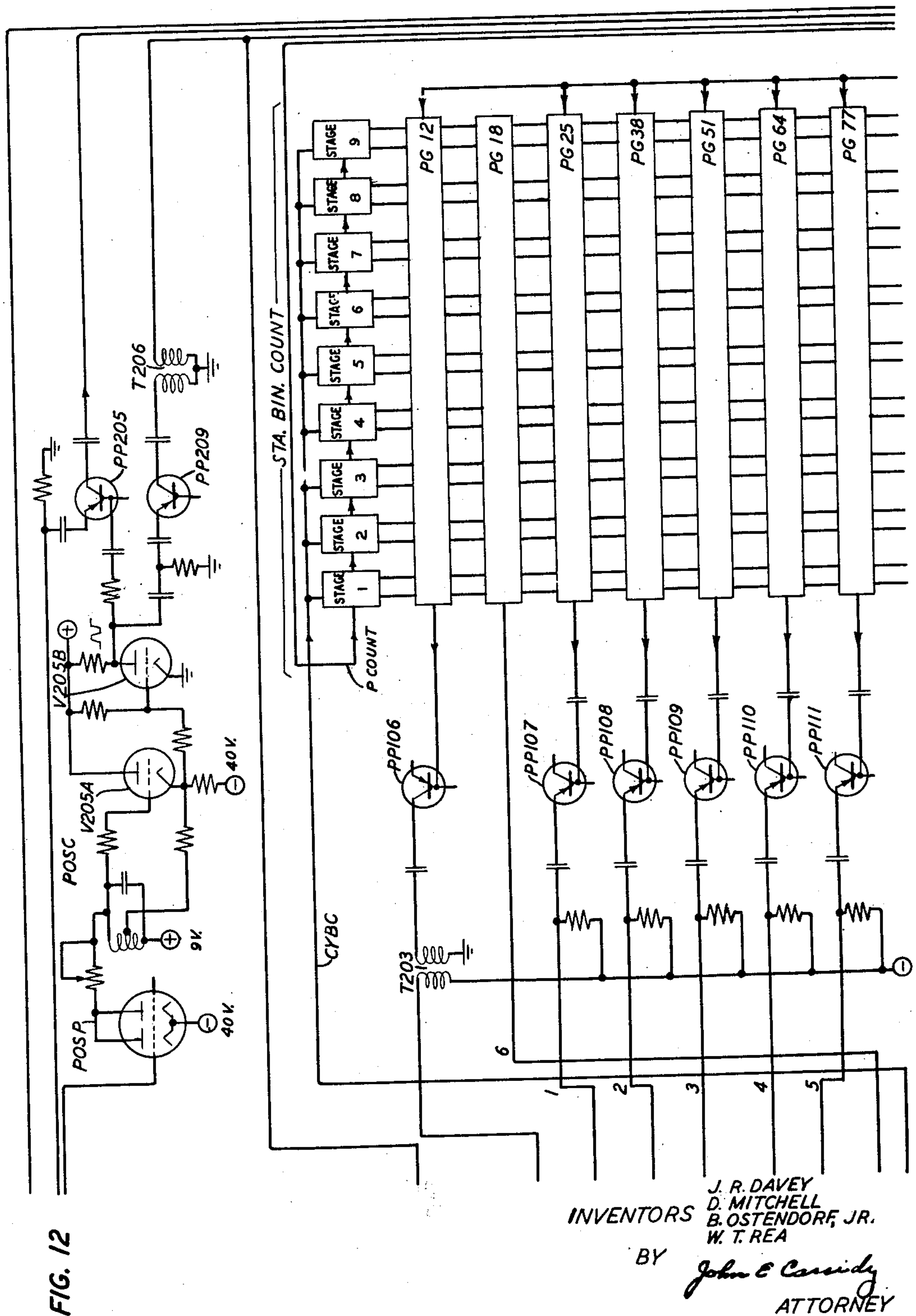
Figure 16:
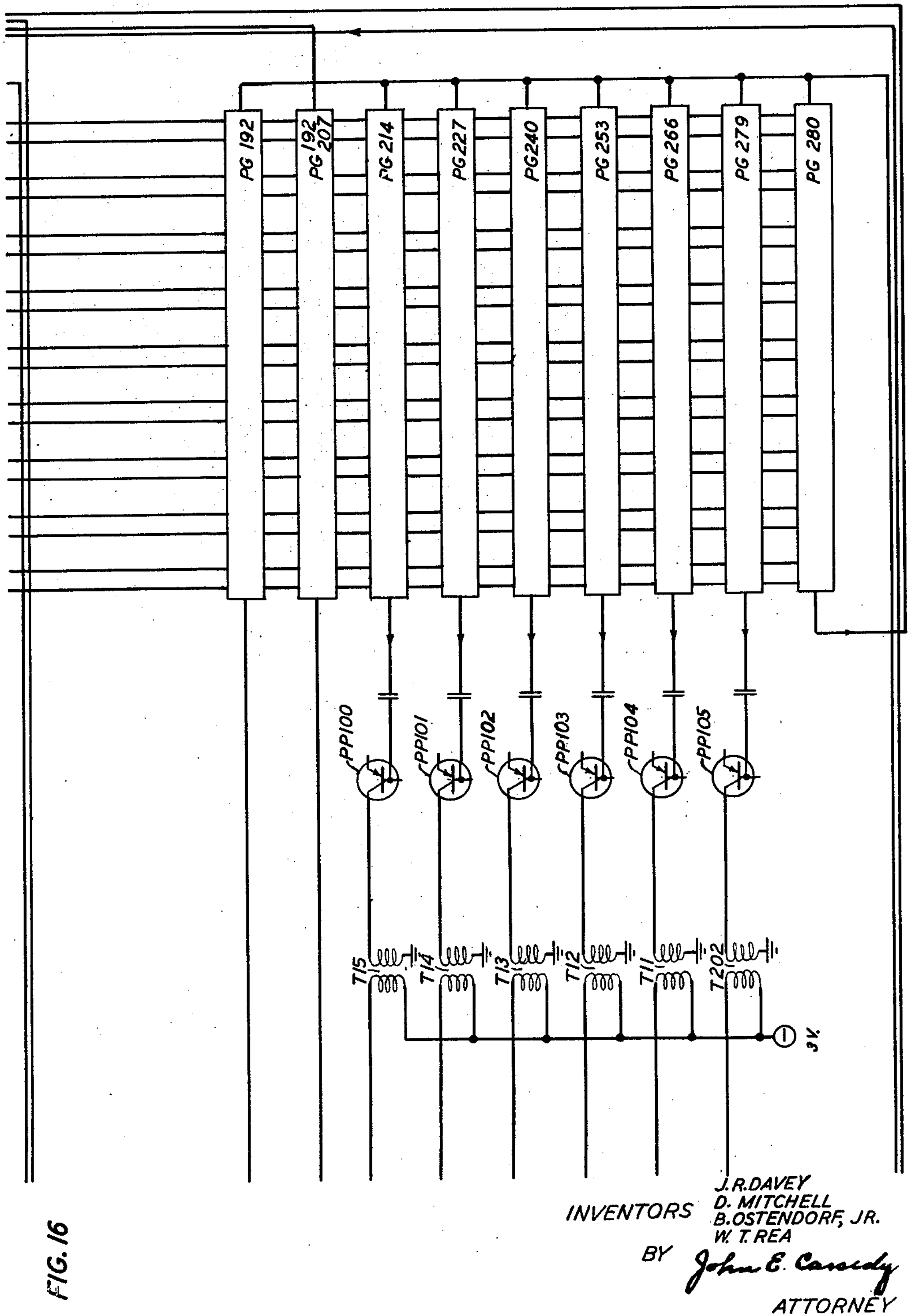

The plane or outlying station uses a single oscillator and a single binary counter STA BIN COUNT, to count its whole receiving, waiting and transmitting program. Normally, the plane oscillator POSC is in the idle or non-oscillating condition. The single binary counter STA BIN COUNT and its associated matrix gates PG12 to PG230, shown at the right in FIGS. 12 and 16 are controlled indirectly through the plane oscillator POSC to count the pulses for the full program of operation of the plane or outlying station. To anticipate, at the end of a program, a pulse is applied through matrix gate PG230 shown, at the bottom in FIG. 16, which sets the monostable control circuit PMSC back to its normal condition thus stopping the oscillator POSC. As in the case of the binary counter employed at the control center, which was operated to skip from the last needed count of a frame, through a number of intervening counts, directly to the last counting condition of the binary counter, the binary counter in the plane skips also. The start pulse from the plane start amplifier PSTAM, upper right in FIG. 9, is applied through transformer T201 to all stages of the binary counter STA BIN COUNT which sets each stage to the one condition. Thus the counter is skipped from its stopped position to count 511 at the beginning of a new program. The counter is then driven by the oscillator through counts 0 to 280 before again stopping.

Figure 10:
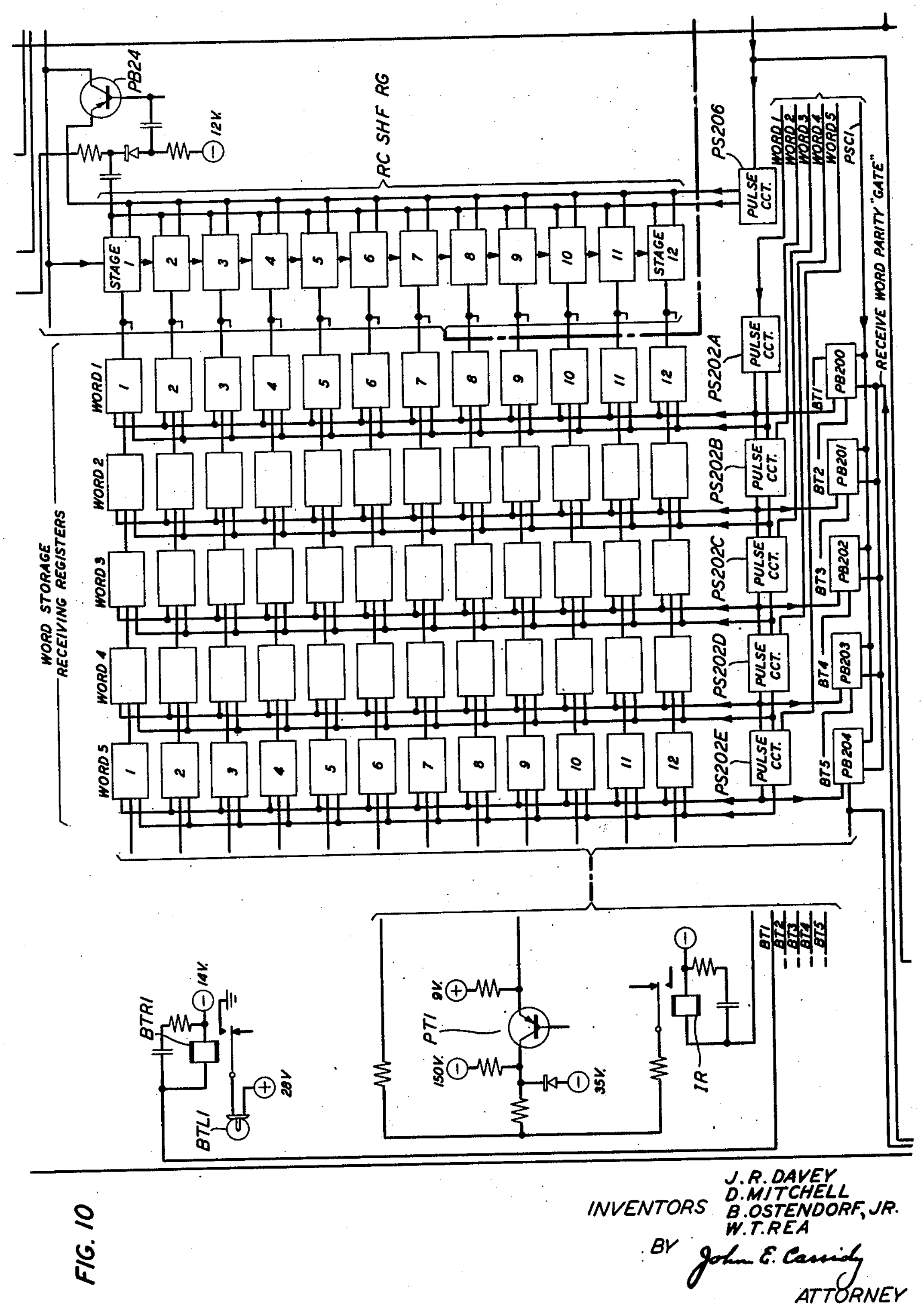
Figure 13:
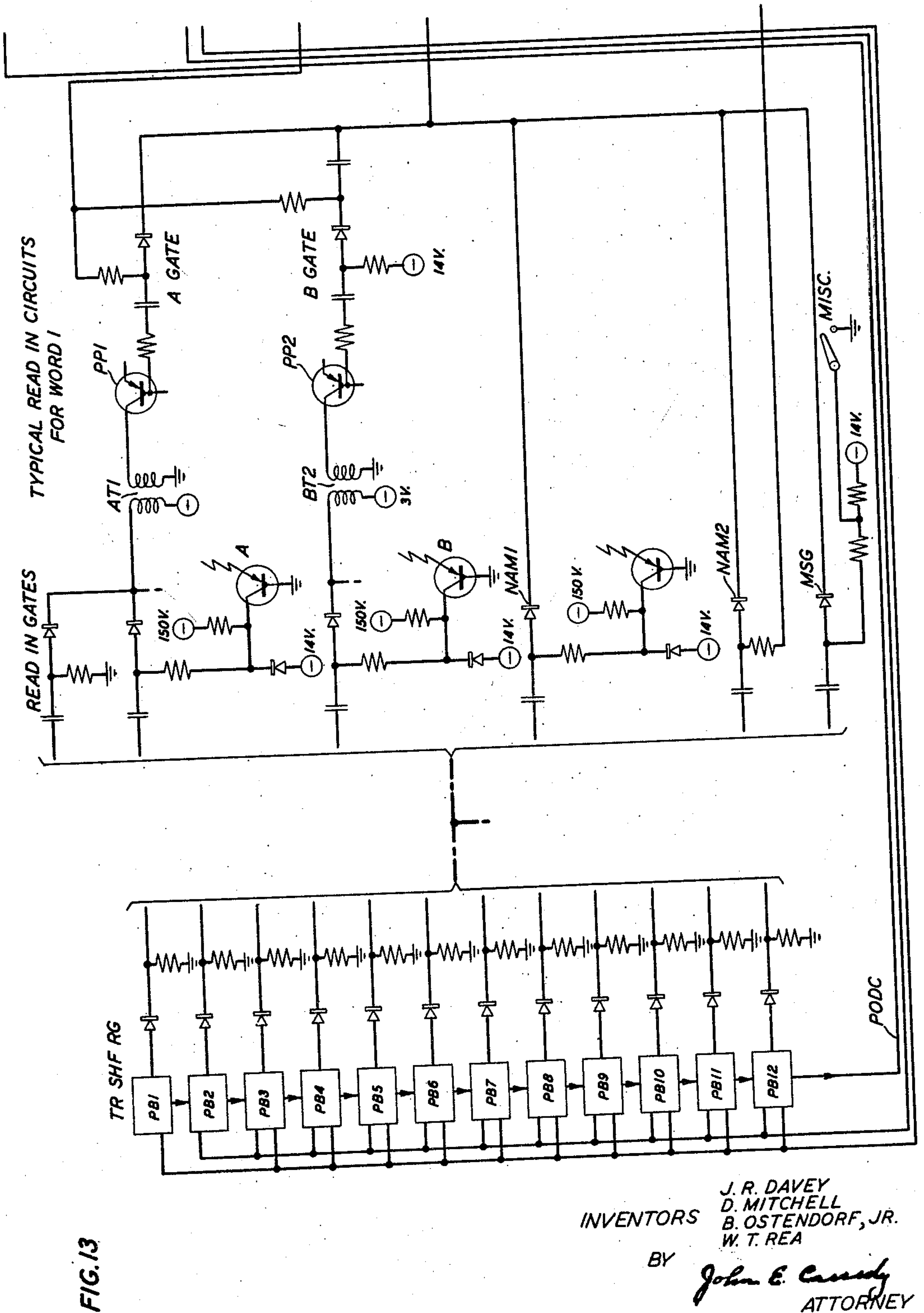
Figure 14:
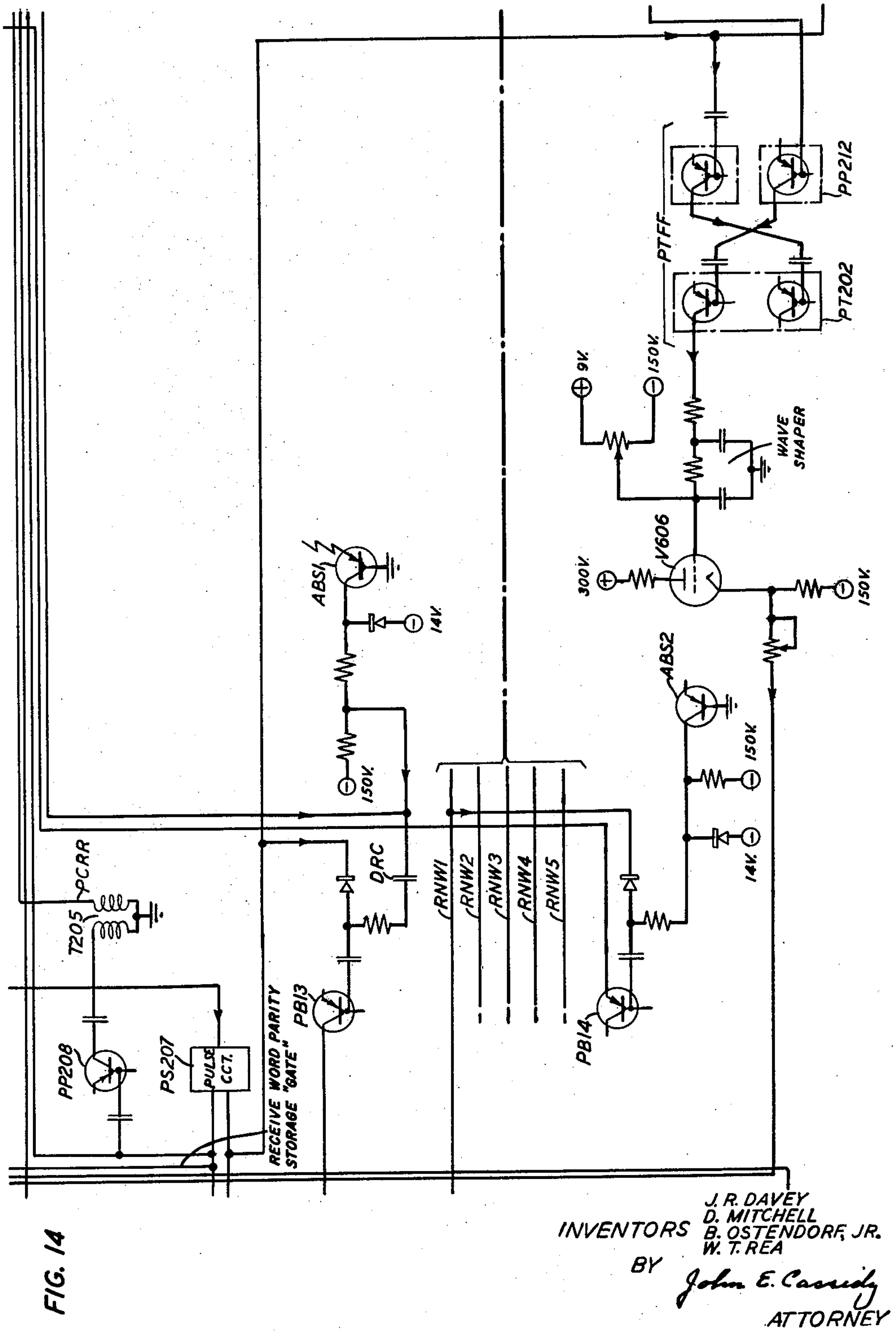

The plane oscillator POSC also controls two pulse circuits, pulse circuit PS206, shown at the lower right in FIG. 10 and pulse circuit PS207 shown at the upper left in FIG. 14. In response to single pulses produced during each cycle of the operation of the plane oscillator POSC, pulse circuit PS206 and pulse circuit PS207 are actuated so that each produces the two output pulses identified heretofore as the "set 0" and "gate" or "set 1" pulses. Pulse circuit PS206 controls the receiving shift register RC SHF RG, shown at the right in FIG. 10, and also controls a preliminary stage in which each incoming data signal element is sampled as it arrives. This preliminary stage PB24 together with the data sample gate is shown in the upper right-hand corner of FIG. 10. The pulse circuit PS207 controls the transmitting shift register, shown at the left in FIG. 13 and also supplies the "gate" pulse which times the program generator.

The incoming data signals, following the preliminary phasing, waiting and stop signal are applied first through the data sample gate to PB24 and then to the receiving shift register RC SHF RG, one signal element at a time under control of the pulse circuit PS206, which controls the data sample gate and initial stage PB24 and all of the twelve stages of the receiving shift register, setting all of them first to the "0" condition at the start of each signal time slot and then applying a "set 1" or "gate" condition to each, which causes a "1" condition to be stored in the stage if its enabling input is, or just previously was, a "1" condition data signal. The signals are applied first through the data sample gate to the input stage PB24, then to stage 1 of the receiving shift register and progressively in sequence from stage 1 to the higher numbered stages, until the whole word comprising the twelve signal elements is stored in the receiving shift register and the thirteenth or parity digit is in the input stage PB24.

It was explained heretofore that each plane or outlying station is discretely addressed. By this is meant that only one plane, or one group of planes controlled by the same address, is effectively conditioned in response to the address signal combination, following the phasing and ready and start signals so that it can receive the words bearing the intelligence in the signal frame following the address.

The way this is done will now be described generally. Each plane is assigned an individual address. This address will consist of a twelve-element two-condition permutation code signal combination, having a number of "1's" and "0's" distributed throughout the various positions of its twelve digits. Each plane is equipped with an address recognition gaate AD REC GT, shown at the left in FIG. 11. This gate comprises two groups of diodes, one of which is assigned to identify the "1's" in the plane's address combination and the other to identify the "0's." There is an individual diode for each of the twelve signal elements of the address combination. There may be, for instance, five "0's" and "1's" in an address, in which case there will be five diodes assigned to the "0" matrix gate and seven diodes assigned to the "1" matrix gate. The five diodes assigned to the "0's" will be connected individually to each stage in which a "0" will be correctly stored when the particular plane is addressed. The seven diodes assigned to the "1's" will be connected individually to the seven stages in which "1's" will be correctly stored when the particular plane is addressed. Each of these groups of diodes will be connected so as to effectively control an individual gate in an individual one of two parallel paths PPH1 and PPH2 in the address recognition gate. When the binary counter reaches count 38, the address as received, whatever it may be, will be stored in the receiving shift registered REC SHF RG, FIG. 10. At this time an individual matrix gate PG12 will pass a pulse to the two-path address recognition diode gate AD and REC GT. If the address is not the one assigned to the plane, the gate will be enabled so as to pass the pulse to the monostable control circuit PMSC shown at the upper left in FIG. 11. The effect of this pulse is to control the monostable pulse circuit PMSC in such manner as to cause the plane oscillator stop tube POSP to conduct and to stop the plane oscillator POSC. The oscillator will stop counting and the plane binary counter STA BIN COUNT will remain temporarily in the condition which it had attained at the time when the address was tested. Subsequently, it will be restored to the all "1's" condition by the start signal of the next frame which is received.

If the address which is received is correct, the address recognition gate AD REC GT will inhibit the passage of the address recognition pulse to the monostable circuit PMSC which would stop the oscillator and the binary counter will continue to count to the end of the program. Each word, as received, will be tested to see whether or not it contains an odd number of "1's", as did the word as transmitted. Assuming that a plane has been properly identified by the address and that the binary counter continues to operate, at the end of the reception of each word as indicated by the pulses counted by the binary counter, a pulse will be passed through a matrix gate, individual to the word, to transfer the word stored in the receiving register to an individual storage register for each word, shown in FIG. 10.

After counting all the words in a frame as received from the control center, the binary counter STA BIN COUNT will continue to count for an interval during which its radio equipment will be switched from the receiving condition to the transmitting condition. During this interval, another plane will receive from or transmit to the control center. Then the transmitting program will start under control of the binary counter and pulse circuit PS207. The data will be transferred from instruments such as contacts or discs which have been set automatically in the plane to measure various quantities the magnitudes of which are to be defined by the transmitted words. These quantities will be expressed as twelve-element, two-condition permutation code signal combinations and will be transferred to the transmitting shift register TR SHF REG, at the left in FIG. 13, all of the elements of any word simultaneously, and each of the words in succession, under control of the group of matrix gates shown at the right in FIG. 16.

A group of preliminary phasing and waiting signal elements and a start signal element will be set into the frame at the beginning of the frame in a manner similar to that described for the circuit at the control center. The words stored in the transmitting shift register TR SHF RG will be read out of the register, one element at a time. They will be passed through a transmitting parity count gate PTBG, at the left in FIG. 15, and the "1" condition signal elements will be counted in parity binary counter PTPC. A parity "1" digit will be added as required, so that an old number of "1's" are transmitted in each thirteen-element word.

As in the case of transmitting from the control center, the parity "1" digit for each word, if required, will be added by the read-in pulse for the following word. This succeeding read-in pulse is applied to pulse amplifier PP204 through transformer T207 and applied to one side of the start and parity gate PSPG which is controlled by the plane transmitting parity binary counter PTPC. If this parity conuter has counted an even number of "1's," it will permit the pulse to pass and its effect will add another "1," which will necessarily be an odd "1," as the thirteenth element of the signal combination. If the binary counter has already counted an odd number of "1's," the start and parity gate will be disabled and the "0" signal condition which was set up in the plane transmitting flip-flop PTFF will be permitted to remain. As each signal element is passed to be transmitting parity binary counter PTPC, it is simultaneously applied to the transmitting flip-flop circuit PTFF, shown at the lower right in FIG. 14, and then through the output circuit to the radio transmitter shown at the upper left in FIG. 9.

*Coupling of Data Multiplex Terminal to Radio Receiver*

As in the case of the synchronizing and phasing arrangement at the control center, the demodulated radio signal is fed to the data multiplex terminal by way of a cathode follower in the radio equipment. The received signal has a voltage swing of about four volts and is normally centered at about plus two volts, but this varies with frequency variation in the transmitter and in the receiver. This incoming signal is amplified by amplifier tube 601P in FIG. 9 and passed through a low-pass filter L.P.FIL in branch 3 of the three parallel branches. The low-pass filter L.P.FIL attenuates the noise at frequencies above the fundamental signaling frequency of 3,350 cycles, for instance. The output of low-pass filter L.P.-FIL is coupled by way of the gain control DAGA and capacitance DGC to the grid of cathode follower 602P. Definite direct-current levels for the two valued signals are established at this point by the suitably biased diodes of double diode tube 605P. One diode conducts as the signal on the grid of tube 602P becomes more positive than plus nine volts and the other diode conducts as the signal becomes more negative than minus thirty-two volts. When the diodes conduct, capacitor DGC changes its charge, so as to keep the signals centered between these two direct-current potentials. The output from the low-pass filter L.P.FIL is adjusted to have a swing of about forty-one volts so that the diodes need to conduct only to restore the proper direct-current levels to the signal. The output from cathode follower 602P is applied to tube 601P, which responds to a narrow range of input voltage near minus fourteen volts. The bias control BSC is adjusted to center the large signal from tube 602P about this narrow range. The output of tube 601P is consequently an approximate square wave corresponding to a narrow slice through the center of the signal from tube 602P. The output of tube 601P includes an amplifier control potentiometer AMPC which provides adjustment of the swing of the square wave so that the output, as repeated by cathode follower 602C has direct-current values of about zero volts, for a "0" and minus fourteen volts for a "1." A low impedance direct-current signal, without varying signal bias due to frequency drifts, is thus obtained to feed the digital circuits.

*Synchronization of Start-Stop Oscillator*

The output from the plate of tube 601P in the coupling circuit is attenuated and advanced in phase by resistance capacitance network RCN. The resulting signal is amplified by amplifier tube V201A and passed through a narrow band pass filter F201. This filter is centered on the frequency of the double frequency "0" and "1" condition reversals at the beginning of the frame, and is narrow enough so that it requires the entire sixteen cycles of this signal to reach steady state. The current in the output section of this filter passes through "0" in the negative direction near the centers of the incoming full digit intervals. This causes the emitter current of the transistor PP200 to change from positive to negative and the collector voltage to swing sharply negative. This negative transition triggers pulse amplifier PP201 on the base. A negative pulse is thus obtained from pulse amplifier PP201 by way of transformer T200 at the centers of the incoming digital intervals, as long as the output of the filter is sufficient to trigger pulse amplifier PP201. The base of transistor PP200 is biased positively, so that the output current from the filter F201 must reach a certain value before any output from the collector is obtained. The gain of tube V201A is adjusted so that no output is obtained from transistor PP200 as a result of noise in the absence of signal. The delay of the filter F201 is such that a train of pulses is obtained from pulse amplifier PP201 which brackets the position of incoming start elements.

Output from the plate of tube 601P in the coupling circuit is also amplified by tube V201B and applied to the tuned circrcuit of the tuned detector TUDE. This circuit is tuned to respond to the sixteen cycles of the ready phasing signal, and a full wave bridge rectifier FWR, in the output of the tuned detector, provides a positive output voltage. This voltage builds up before the pulses from transformer T200 start and dies away just before the arrival of the start pulse. The start gate PSTG has three inputs: first, the pulses from transformer T200; second, the rectified output of the tuned detector TUDE; and third, the incoming data signal from tube 602C. The start gate PSTG produces a negative output pulse only when all three inputs are at their negative excursions. Normally, this condition first occurs at the center of the incoming start element. The positive output of the tuned detector inhibits the start gate PSTG until just before the arrival of the start element. This guards against a false early start due to noise and against the mistaking of the ready phasing signal for the start element. The output of the start gate PSTG triggers pulse amplifier PP202 which in turn drives the start amplifier PSTAM with a positive pulse. The resulting negative pulse from transformer T201 is used to start the receiving program. This method of synchronizing the receiver places the selection of the start element on the same basis as the subsequent selection of the data elements. The phasing of the starting time is based on the average phase of the sixteen cycles of the ready and phasing signal. Under reasonable noise levels, this results in a tolerance to time distortion of the digits approaching that of a synchronous multiplex system.

*Synchronization of Start-Stop Timing Oscillator*

Figure 11:
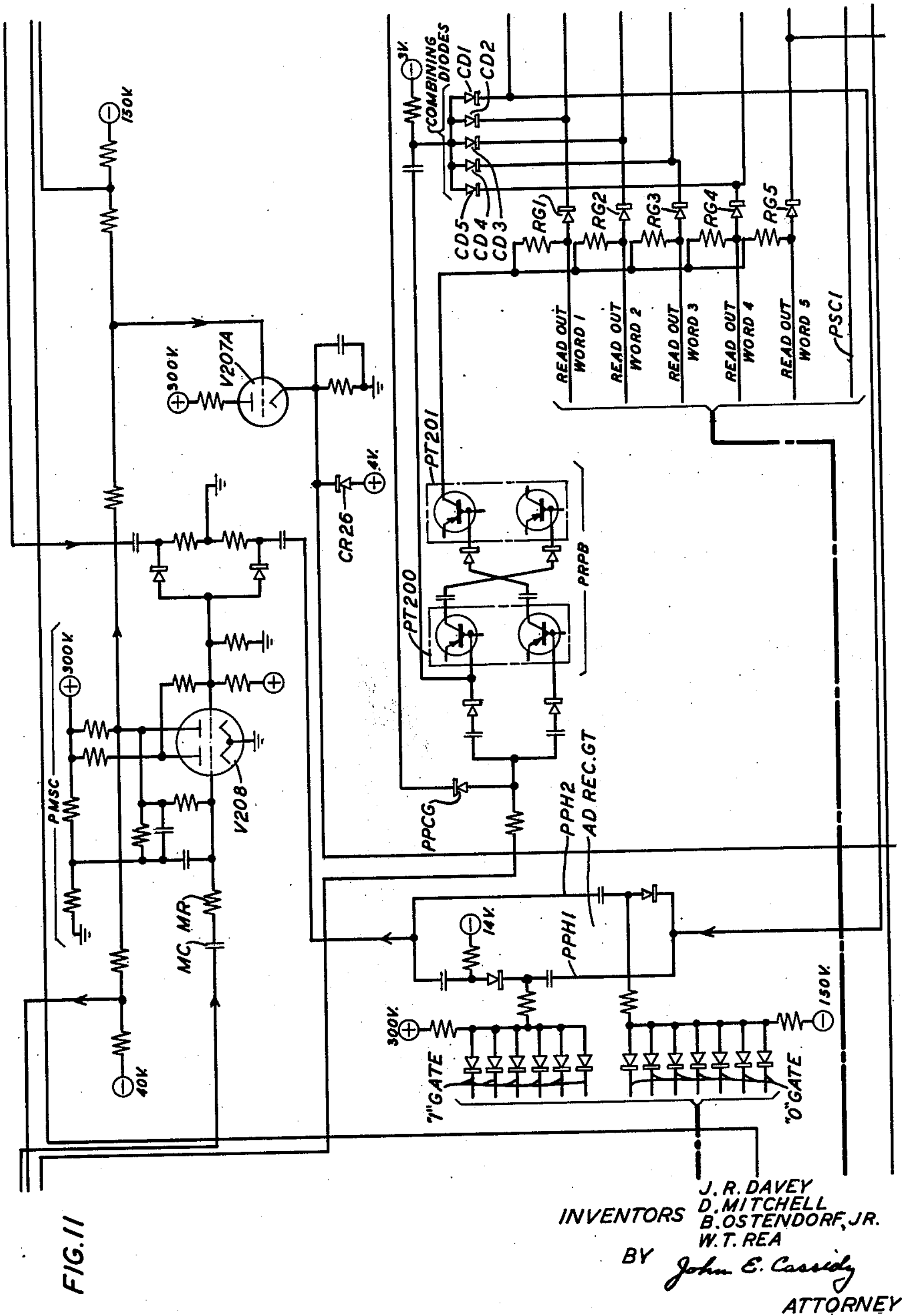

The negative pulse from the start amplifier PSTAM is applied through capacitor MC and resistor MR, both shown at the upper left in FIG. 11, on the input circuit of the monostable control circuit PMSC comprising double triode V208. The left-hand triode of V208 is normally conducting and is responsively cut off, triggering the right-hand triode of tube V208 to the "on" condition. A negative voltage pulse from the plate of the right-hand triode of tube V208 is applied to oscillator stop tube POSP, at the left in FIG. 12. This cuts off the oscillator stop tube POSP and stops the flow of current through the tuned circuit in the plane oscillator circuit POSC, connected to the output circuit of tube POSP. This in turn activates oscillator tube V205A and causes it to start with the voltage at its cathode in the zero degree phase of a sine wave. Triode V205B serves to limit the oscillator wave to a trapezoidal form which has its negative going transient near the centers of the incoming digital intervals. These negative transients trigger pulse amplifier PP205 on the base. A negative pulse obtained from the emitter load of pulse amplifier PP205 is applied to the input of pulse circuits PS206, in the lower right in FIG. 10, and PS207 at the upper left in FIG. 14. Pulse circuit PS207 generates the "set 0" and the "gate" or "set 1" pulses for control of the transmitting shift register TR SHF RG, at the left in FIG. 13. Pulse circuit PS206 serves similarly for the receiving shift register circuit RC SHF RG, at the right in FIG. 10. The "gate" pulses from PS206 and PS207 occur about twenty microseconds after the triggering pulses from pulse amplifier PP205. As will be described later, the "gate" pulse from pulse circuit PS206 is used to sample the incoming data. The "gate" pulse from pulse circuit PS207, in addition to controlling the transmitting shift register, is used to time the program generator, in a manner which will be described under the heading immediately following.

*Programming Binary Counter*

Figure 15:
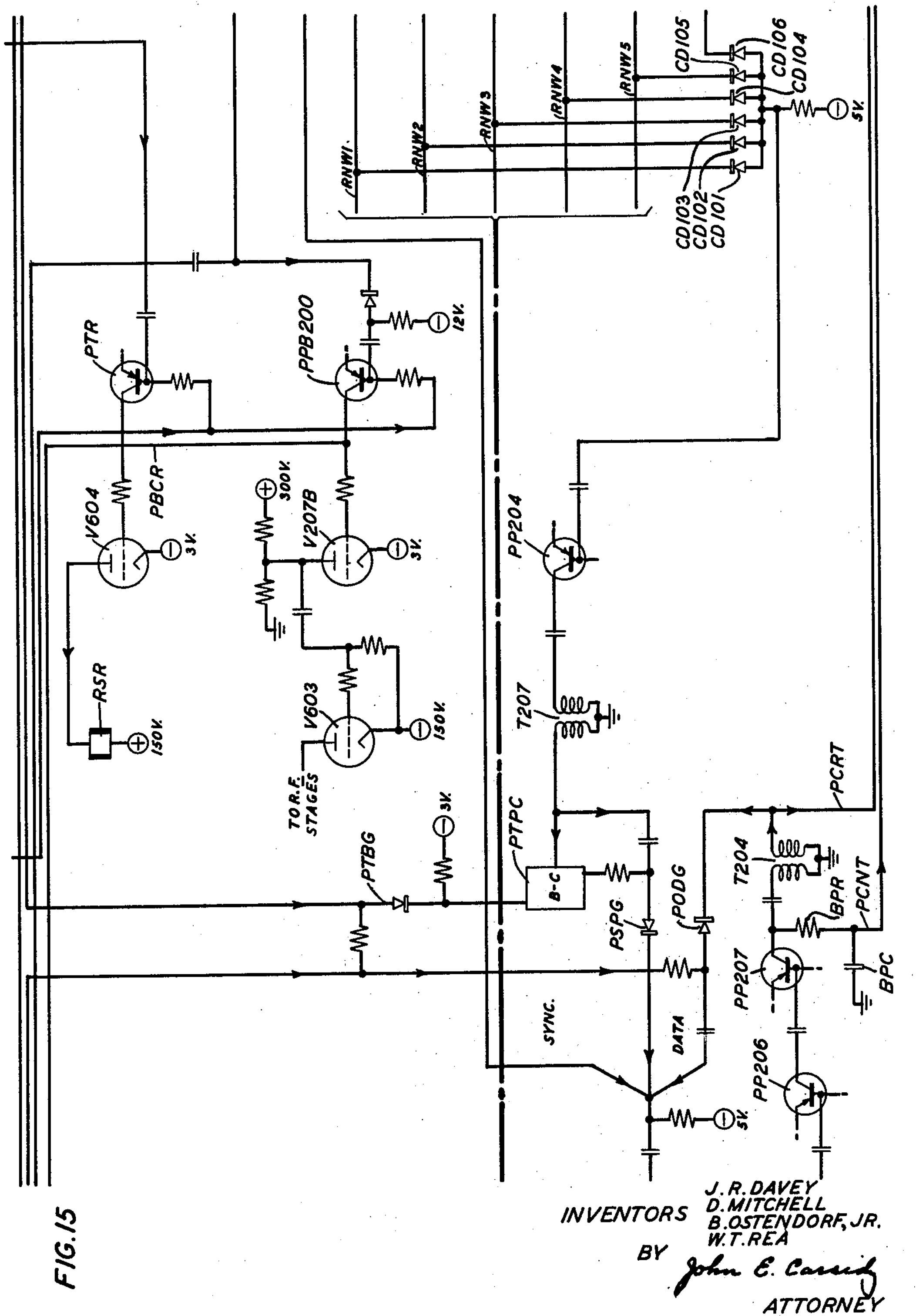

The negative "gate" or "set 1" pulse from pulse circuit PS207, at the upper left in FIG. 14, is applied to the base of pulse amplifier PP206, at the lower left in FIG. 15. The negative going trailing edge of the output pulse of pulse amplifier PP206 in turn triggers pulse amplifier PP207 on the base. The output pulse from pulse amplifier PP207 thus occurs about six microseconds after the triggering of pulse amplifier PP206. Positive pulses from the collector of pulse amplifier PP207 are slightly delayed by resistance capacitor circuits BPR and BPC and applied through conductor PCNT to the input of STAGE 1 of the outlying station binary counter STA BIN COUNT in the upper portion of FIG. 12. All nine stages, STAGE 1 to STAGE 9 of the station binary counter, are set to the "1" condition by a pulse from the secondary of transformer T201, controlled by the start amplifier PSTAM through conductor CYBC. This pulse, as has been explained, occurs at the middle of the start element. The counter then advances one count for each cycle of the oscillator. When all nine stages of the receiving binary counter are in the "1" condition, the corresponding decimal count is count 511. The first count pulse changes all nine stages of the receiving binary counter to "0." The binary counter stages connect to the matrix gates PG12, PG18, PG25, PG38, PG51, PG64, PG77, PG192, PG192–207, PG214, PG227, PG240 PG253, PG266, PG279 and PG280. Each of these matrix gates is arranged through its connection with the stages of the binary counter to pass a pulse at the count indicated by the numeral or numerals in its designation. Count recognizing pulses are applied to the matrix gates just prior to a change of count. For the receiving portion of a program, these pulses are transmitted from pulse amplifier PP208, at the upper left in FIG. 14, transformer T205 and conductor PCRR to the matrix gates in FIG. 12. For the transmitting portion of a program, these pulses are sent from pulse amplifier PP207, at the bottom left in FIG. 15, through transformer T204 and conductor PCRT, to the matrix gates for the transmitting program in FIG. 16, except matrix gate PG192–197, which controls the sixteen cycles of reversals. How matrix gate 192–207 is controlled will be described hereinafter. Since pulse amplifier PP208 is triggered by the leading edge of the "set 0" pulse from pulse circuit PS207, the pulse from transformer T205 occurs about twenty-six microseconds before the pulse from transformer T204. The reason for this will be made apparent hereinafter.

To again anticipate when the receiving binary counter reaches count 280 at the end of its counting program, the next count recognizing pulse from transformer T204 applied through matrix gate PG280, the bottom matrix gate of the vertical array, produces a negative pulse which is applied to the grid of the right-hand triode of tube V208 in the monostable circuit PMSC, at the top left in FIG. 11. This is the triode which is normally "off" but was triggered to the "on" condition at the middle of the incoming start pulse. This cuts off the right-hand triode of double triode V208 and restores the monostable control circuit PMSC to normal. When the right-hand triode of double triode V208 is cut off, a positive pulse is applied to the grid of the plane oscillator stop tube POSP at the upper left in FIG. 12, activating the tube which in turn stops the plane oscillator POSC ending the program cycle. The binary counter STA BIN COUNT then rests in this condition, corresponding to count 281, until being set to the all "1's" condition, corresponding to decimal count 511, by another synchronizing pattern, at the head of the next signal frame. This complete program cycle supplies the necessary timing pulses for routing the incoming message to storage, pausing for one entire message frame and making a reply to the central control station. If for some reason, the program circuit fails to stop the oscillator in the normal manner described above, the monostable control circuit resumes its normal condition after about two seconds and stops the oscillator.

*Sample and Accumulation of the Received Data Signals*

All incoming data signals are applied, through the incoming data conductor INDT, shown in the lower right-hand portion of FIG. 9, to the gate circuit of the input stage PB24, shown at the upper right of FIG. 10 of the receiving shift register RC SHF RG. This input stage is also controlled by the "set 0" and "gate" or "set 1" pulses from pulse circuit PS206, at the bottom right in FIG. 10. The input stage PB24 is set to the "0" condition at the beginning of each time slot by a voltage pulse applied to its emitter circuit by pulse circuit PS206. Thereafter the "gate" or "set 1" pulse applies another voltage condition to the gate associated with input stage PB24, and if the incoming data pulse is a "1" the "1" permitted to pass through the gate to the base of input stage PB24 to register the "1" condition therein. If it is a "0," no pulse passes to change the "0" condition. In this way each incoming digit interval is sampled near its center and the result is placed in the shift register. At the same time the previous information in the shift register is shifted along by one stage. The receiving shift register REC SHF RG thus accumulates the incoming data information.

*Address Recognition*

Matrix gate PG12 is enabled after the last digit of the address has been stored in the receiving shift register RC SHF RG. The twelve-signal elements comprising the address per se will be stored in the twelve stages 1 to 12, of the receiving shift register and the thirteenth or parity checking signal will be stored in the input stage PB24. The pulse from matrix gate PG12 triggers pulse amplifier PP106 and a negative pulse is obtained from the output of transformer T203. This pulse is fed to the address recognition gate AD REC GT to determine if the code combination in the shift register is the assigned address. The address recognition gate AD REC GT permits the pulse from transformer T203 to reach the monostable circuit of tube V208 and trigger it to the stop condition, if the address is not the one assigned to the aircraft. The address recognition gate has two parallel paths. One is inhibited by the correct pattern of "1's" and the other by the correct pattern of "0's." Each gate section is controlled by a matrix of diodes connecting to the shift register stages. Each shift register has a diode which may be connected by means of a toggle switch, not shown, with either the "1" or the "0" section of the gate. When the correct address rests in the register, the "1's" section is fed by a voltage of minus one volt and the "0's" section is fed by a voltage of minus thirteen volts. This results in no transmission through either section. If any one or more digits are different from that assigned, the control voltage from the diode matrix changes to the enabling value and one or both sections of the gate permit the pulse to pass through. If tube V208 is thus triggered to the stop condition at this time, the program counting is stopped after only fourteen cycles from the plane oscillator POSC. The program generator then rests until the reception of the synchronizing pattern of signals at the head of the next received signal frame.

*Parity Check and Read-Out to Storage*

If the first "word" group of a received frame is found to be the assigned address, the program continues for its complete count as heretofore described. At count 25 the second word group rests in the receiving shift register RC SHF RG and is ready to be read out to storage, if the parity count of "1's" is correct. The station receiving parity binary counter PRPB, shown in the middle of FIG. 11, is used to count the "1's" which are selected and placed in the receiving shift register preliminary stage PB24. The count pulses for counting the parity count by the plane receiving parity counter PRPB are obtained from pulse amplifier PP209, in the upper middle portion of FIG. 12. Pulse amplifier PP209 is triggered on the emitter by the positive-going transient of the trapezoidal wave from tube V205B. Negative pulses from output transformer T206 are thus produced at a time about half way between the data selecting instants. These pulses connect to the upper terminal of the diode in the parity count gate PPCG in the middle left-hand portion of FIG. 11. The gate is enabled by a "1" condition of the preliminary stage PB24 in FIG. 10 and thus causes the station receiving parity counter PRPB to change state if a "1" is received. At the time of address recognition, the negative pulse from matrix gate PG12 through pulse amplifier PP106, transformer T203 and combining diode CD1 had set the plane receiving parity binary counter PRPB to the "0" count condition. Therefore, if at count 25 the thirteen digits resting in the shift register contain an odd number of "1's," as was transmitted, the plane receiving parity binary counter PRPB will be in the "1" condition. At count 25 matrix gate PG25 is enabled and pulse amplifier PP107 is triggered. A negative pulse from the emitter of pulse amplifier PP107 is applied to the word 1 read-out control gate RG1. If this gate is enabled by an odd parity count stored in the parity binary counter PRPB, the pulse passes through the read-out word 1 conductor and is applied to the input of pulse circuit PS202A, individual to the storage register for word 1 in FIG. 10. In response to the pulse applied to its input, pulse circuit PS202A generates, first a "set 0" pulse which sets all stages of the storage register for word 1 to the "0" condition and then a "gate" or "set 1" pulse, which enables the gate of each stage and permits the "1's" which have been stored in stages 1 to 12 of the receiving shift register to be transferred to the corresponding stage in the storage register for word 1. The storage registers are designated WORD 1 to WORD 5, for words 1 to 5, respectively, in FIG. 10. The application of the "set 0" and "gate" pulses from pulse circuit PS202A, first erases any previous information which may have been stored in register WORD 1 before the information is transferred from the receiving shift register RC SHF RG. If an even parity count occurs indicating erroneous reception of the word stored in the shift register, the plane receiving parity binary counter PRPB does not enable the read-out gate RG1, FIG. 11, and the pulse circuit PS202A is therefore not triggered. There are five read-out gates RG1 to RG5, one for each of the five words. When a word is not read into a storage register, the previously stored information in the register is retained in storage. The pulse from pulse amplifier PP107, in FIG. 12, resets the plane receiving parity binary counter PRPB to "0" through combining diode CD2, of the combining diodes shown at the right in FIG. 11. This prepares the receiving binary counter for making a parity check on the next thirteen-digit word group. There is one combining diode CD1 to CD5 for each of words 1 to 5, respectively.

The read-out process as described for word 1 continues in a like manner for words 2, 3, 4 and 5. There are read-outs at counts 38, 51, 64 and 77. The output of the storage circuits may either operate relays, such as relay IR, drive evaluation amplifiers, such as amplifier PT1, or feed voltage swings directly into a code-to-voltage resistance network, as described in the patents identified in the description of the control center.

*Storage of Parity Check Results*

Five storage circuits PB200, PB201, PB202, PB203, and PB204, shown in the lower portion of FIG. 10, are used to record the result of the parity check and thus give an indication as to whether or not erroneous data was received and discarded. These bit storage circuits are connected individually to the source of the "set 0" pulses produced in pulse circuits PS202A to PS202E, which control the associated word storage, and to the source of the "gate" pulse associated with the transmitting shift register, shown in FIG. 13. During count 18 matrix gate PG18 supplies a positive signal through the parity storage conductor PSC1 to storage circuits PB200 to PB204 in parallel. This results in all five of the bit storage circuits PB200 to PB204 being set to the "1" condition at count 18, which is reached only if a correct address has been received. It will be recalled that if a correct address is not received, the program counting is stopped at count 13. Therefore, all of the bit storage circuits PB200 to PB204 are in the "1" condition prior to the storage of the first word. When the proper count pulse is reached for transferring each word from the plane receiving shift register RC SHF RG to its individual storage register WORD 1 to WORD 5, upon the generation of "set 0" pulses, which permits the transfer of the word from the shift register to its individual word storage register, the bit storage circuit individual to the word storage register, such as PB200 individual to the word 1 register, will again be set to "0."

It will be recalled that if an odd number of "1's" is not received in each word, the plane receiving parity binary counter PRPB will not enable the read-out gate individual to that word. These read-out word gates are gates RG1 to RG5 at the lower right in FIG. 11. This will prevent the passing of the read-out pulses from the matrix gate individual to the word to the pulse circuit, such as pulse circuit PS202A for word 1, which controls storage of the word in the receiving storage register WORD 1 to WORD 5. Therefore, the enabling of the pulse circuit, such as PS202A, indicates that the parity count has been satisfied and the reception, by the individual parity check storage circuit, such as PB200, of the "set 0" pulse generated by the pulse circuit, such as pulse circuit PS202A, wipes out the "1" in the parity check storage circuit individual to the word. Since all of these bit storage circuits have been set to the "1" condition upon the satisfaction of the parity count check applied to each word, all of the bit storage circuits PB200 to PB204 should be in the "0" condition at the end of reception of the incoming signal frame. Each one of the bit storage circuits PB200 to PB204 has an output conductor BT1 to BT5 which is connectable to an individual relay such as BTR1. Each one of these relays is activated to light a lamp such as BTL1 in the event that its individual bit storage circuit remains in the "1" condition, indicating false reception of the associated word.

*Preparation for Making Reply*

At count 77, the fifth and last read-out pulse for the incoming frame is passed through matrix gate PG77 and amplified by pulse amplifier PP111 in FIG. 12 and applied to pulse circuit 202E to transfer the fifth word of the incoming frame from the receiving shift register RC SHF RG to the storage register WORD 5, individual to the fifth word. The receiving of the entire frame by the plane is now finished. As explained, at this time the combined radio transmitter and radio receiver in the plane must be switched from the transmitting to the receiving condition. This takes a substantial interval of time during which another aircraft receives a frame or transmits a frame. An interval sufficient to permit this must be counted under control of the plane oscillator POSC and receiving binary counter STA BIN COUNT, while the switching of the radio apparatus is effected. The last count pulse for the received frame is arranged to control the start of switching of the radio apparatus in the plane, and simultaneously to start the counting of the allotted interval for the switching is started.

The pulse from the output of matrix gate PG77 and of pulse amplifier PP111 is applied to the base of the prepare transfer transistor PTR, shown at the upper right in FIG. 15, to trigger transistor PTR to the "1" condition. The resultant positive swing of the collector of transistor PTR activates amplifier V604 which in turn operates the radio switching relay RSR. Radio switching relay RSR, in turn, actuates elements not shown, to transfer the combined radio transmitter receiver from the receiving to the transmitting condition. The binary counter advances between counts 77 and 192 without further programming. This is the interval during which another aircraft is receiving a frame from the center control station or transmitting to the central control station.

*Transmitting Flip-Flop*

At count 192 the aircraft reply is started. In response to the data signal elements the reply data signal is generated by the plane transmitting flip-flop circuit PTFF, shown at the lower right in FIG. 14, and is fed to the modulator of the radio equipment by way of the cathode follower V606. Controls are associated with cathode follower V606 to adjust the amplitude and the direct-current level of the signal to the modulator. The plane transmitting flip-flop circuit PTFF is set to the "0" condition at the beginning of each transmitted digit interval by the "gate" pulse from pulse circuit PS207, at the upper left in FIG. 14. When a "1" data digit is to be transmitted, the transmitting flip-flop circuit PTFF is set to "1," about six microseconds later, by a data pulse received from stage 12 of the plane transmitting shift register TR SHF RG, in FIG. 13, through the plane outgoing data conductor PODC and the plane outgoing data gate PODG. During the generation of the ready and phasing portion of the synchronizing pattern, the plane transmitting flip-flop circuit PTFF is set to "1" half way between successive "set 0" pulses, as explained more fully hereinafter.

Matrix gate PG192 furnishes a negative enabling swing at count 192 which causes bit storage circuit PB200, shown at the right in FIG. 15, to be set to "1" by the "set 0" pulse from PS207. The resulting positive swing at the collector of PB200 causes tube V207B to conduct. This in turn causes tube V603 to cut off, removing a negative cut-off bias, and thus permitting the radio frequency stages of the radio transmitter to become operative.

*Generation of Ready and Phasing Signal*

The "set 1" pulses for the ready and phasing signals are obtained from matrix gate PG192–207 which is enabled in sixteen counts, counts 192 to 207, inclusive. This gate is fed pulses through transformer T206 from pulse amplifier PP209, in the upper portion of FIG. 12, which is triggered near the 180-degree phase of the oscillator wave. The squaring amplifier portion of tube V205 is biased so as to cause the positive-going transient of the trapezoidal wave to occur close to midway between successive "set 0" pulses of the plane transmitting flip-flop PTFF. The plane transmitting flip-flop PTFF thus alternates between the "0" and "1" condition, to generate the sixteen cycles of the ready and phasing signal. The outgoing signal then remains in the "0" condition for the next seven time slots.

*Generation of Start Element*

At count 214 matrix gate PG214, shown at the right in FIG. 16, passes a pulse which is amplified in pulse amplifier PP100 passed through transformer T15 and applied to the read-in conductor for word 1 RNW1. The negative pulse from transformer T15 serves to initiate the read-in of the first word and in addition is passed through combining diode CD101 to amplifier PP204 in the lower middle portion of FIG. 15. This results in a negative pulse from transformer T207. At this time the transmitting parity counter PTPC is in the "0" condition as will be explained later. This enables the start and parity gate, which permits the pulses from transformer T207, to trigger the plane transmitting flip-flop circuit PTFF to the "1" condition for the start element.

*Generation of Data Digits*

As covered in a later section, the first twelve-digit word is read into the transmitting shift register at the beginning of the start element. The data pattern in the shift register is then shifted by one stage each time pulse circuit PS207 is triggered by the oscillator timing pulse. At the beginning of the digit interval following the start element the condition of shift register stage PB12 will have been impressed on the plane outgoing data gate PODG, at the lower left in FIG. 15, for about one digit interval. If stage PB12 has been in the "1" condition the data gate PODG is enabled and the pulse from transformer T204, shown at the bottom left in FIG. 15, triggers the transmitting flip-flop to the "1" condtion. In a similar manner, as each of the data digits occupy stage PB12, its condition whether "1" or "0" controls the condition of the plane transmitting flip-flop circuit PTFF for the next digit interval.

*Insertion of Parity Digit*

The transmitting shift register stage PB12, at the lower left in FIG. 13, also connects to the plane transmitting parity binary counter gate PTBG, shown in the middle left of FIG. 15. This gate is enabled by a "1" condition and permits a positive pulse from pulse amplifier PP205, shown at the upper right in FIG. 12, to be counted by the binary counter. At the read-in of word 1 the pulse from transformer T207 had set binary counter PTPC to "0." Therefore, if word 1 has an even number of "1's" the binary counter will be in the "0" condition at the time of read-in of word 2. Read-in of word 2 occurs at count 227. Matrix gate PG227 triggers pulse amplifier PP101 and a negative pulse is obtained from transfomer T14. This pulse initiates the read-in of word 2 through conductor RNW2 and is also passed through combining diode CD102 and triggers pulse amplifier PP204. With the plane start and parity gate PSPG enabled by a "0" condition resting in binary counter PTPC, the pulse from transformer T207 triggers the plane transmitting flip-flop circuit PTFF to the "1" condition. Thus a thirteenth digit is added to the twelve digits in such a manner as to have each thirteen-digit word contain an odd number of "1's." The pulse from transformer T207 also resets the binary counter to the "0" condition in preparation for counting the "1's" in the next word. The transmitting shift register TR SHF RG contains only "0's" at this time so there can be no "1" data pulse to interfer with the insertion of the parity digit.

The process described for word 1 is repeated for the read-in of words 2, 3, 4 and 5 at counts 227, 240, 253 and 266. Considering all five words as a group, the five pulses for the five words are passed through matrix gates PG214, PG227, PG240, PG253 and PG266, respectively, pulse amplifiers PP100, PP101, PP102, PP103 and PP104, respectively, transformers T15, T14, T13, T12 and T11, respectively, and read-in word conductors RNW1, RNW2, RNW3, RNW4 and RNW5, respectively, and applied to the read-in circuits for the words, a typical one of which is shown at the right in FIG. 13, for word 1. Simultaneously the pulses are applied through combining diodes CD1, CD2, CD3, CD4 and CD5 to the start and parity gate PSPG to add a "1" to a word, for parity, if required and to set the plane transmitting the parity binary counter PTPC to the "0" counting condition for counting the "1" signal elements in the next word. At count 279, when the last data digit of word 5 has been transmitted, the last parity digit is inserted by a pulse through matrix gate PG279, pulse amplifier PP105, transformer T202 and combining diode CD106. Binary counter PTPC after being set to the "0" condition at this time, remain there until the next read-in of word 1. This prepares the way for the insertion of a "1" condition start element.

*Read-In of Data to Transmitting Shift Register*

The code discs used in the aircraft or outlying station employ a hybrid type code which is step-by-step without ambiguity for three or four of the least significant digits, but has multiple transitions with resultant ambiguity in the more significant digits, if all digits are read simultaneously along a radius of the disc. This ambiguity is avoided by providing two positions of reading which are so related that the ambiguous transitions in the code occur alternately at the two positions. By first reading the most significant digit of the step-by-step portion of the code, it is possible to determine which of the reading positions will involve no ambiguity in reading the more significant digits.

The process will be described in the following with respect to the steps involved in reading in the first word of the reply.

The two reading positions on the coding disc are designated A and B. At count 192, when the precise timing bit circuit PB200, at the middle right in FIG. 15, is triggered to the "1" condition, a positive voltage step is coupled through conductor PBCR and capacitor DRC shown at the middle left in FIG. 14, to one of the gate enabling circuits of bit circuit PB13, at the middle left in FIG. 14. The gate of bit circuit PB13 is not fully enabled, however, unless in addition a positive direct-current step is furnished from the A–B position sampling phototransistor ABS1 for word 1, shown in the middle of FIG. 14. This phototransistor reads the most significant track of the step-by-step portion of the encoding disc for word 1 and indicates whether the rest of the reading should be done at position A or position B on the disc. Thus, if the A–B phototransistor is illuminated, the next "gate" pulse from pulse circuit PS207, after count 192 is reached, will set bit circuit PB13 to the "1" condition. The program start pulse from transformer T201, shown at the upper right in FIG. 9, previously had set bit circuit PB13 to the "0" condition, so that, if the A–B phototransistor is not illuminated, the bit circuit PB13 remains in the "0" condition. If bit circuit PB13 is in the "1" condition its output is positive and enables the A reading gate, A GATE, shown in the upper right in FIG. 13. This permits the word 1 read-in pulse from matrix gate PG214 to trigger pulse amplifier PP1 connected to the output of the A reading gate A GATE and furnish a gate pulse through transformer AT1 to the read-in gates associated with the phototransistors of the A reading position. In addition, is furnishes a pulse to a permanently enabled read-in gate which serves to read in a "1" representing the A–B sampling track which had been read earlier at gate 192. If bit circuit PB13 is in the "0" condition its negative output enables the B gate, B GATE and the B pulse amplifier PP2 is triggered. In this case a gate pulse is furnished to those read-in gates associated with the B reading position.

The word 1 read-in pulse from transformer T15 connects directly to the read-in gates NAM1 and NAM2 associated with the phototransistors which read the least significant tracks having no ambiguity and also to the read-in gates MSG associated with the miscellaneous digits controlled by open and closed contacts. The word 1 read-in pulse also sets bit storage circuit PB14 at the lower left in FIG. 14 to the "1" condition if phototransistor ABS2 associated with the code disc for word 2 is conducting. Thus the A or the B gate is properly prepared for the read-in of word 2 at count 227. This method of avoiding ambiguity assumes insiginificant movement of the disc between the time of the A–B determination and the final reading.

The output of the read-in gates connect to the transmitting shift register TR SHF RG and at the time of read-in the patterns of "1's" and "0's," as read from the code discs and as set up on the miscellaneous contacts, is set into the transmitting shift register.

*End of Aircraft Reply*

At the end of transmission of the last parity digit at count 280, a negative pulse is obtained from matrix gate PG280. This negative pulse stops the program cycle by triggering tube V208 of the plane monostable stop circuit PMSC, at the top of FIG. 11 to the stop condition as previously described. When tube V208 is triggered to the stop condition, the right-hand plate in its output circuit swings positive. This causes tube V207A to conduct and the potential of its cathode rises sufficiently positive to return bit circuits PTR and PB200 to the "0" condition. During the program cycle, tube V207A in the upper right of FIG. 11, is cut off and a normal base supply voltage of plus 4 volts, for instance, is supplied through diode CR26 to bit storage circuits PTR and PB200.

*Local Storage of Heading*

Figure 17:
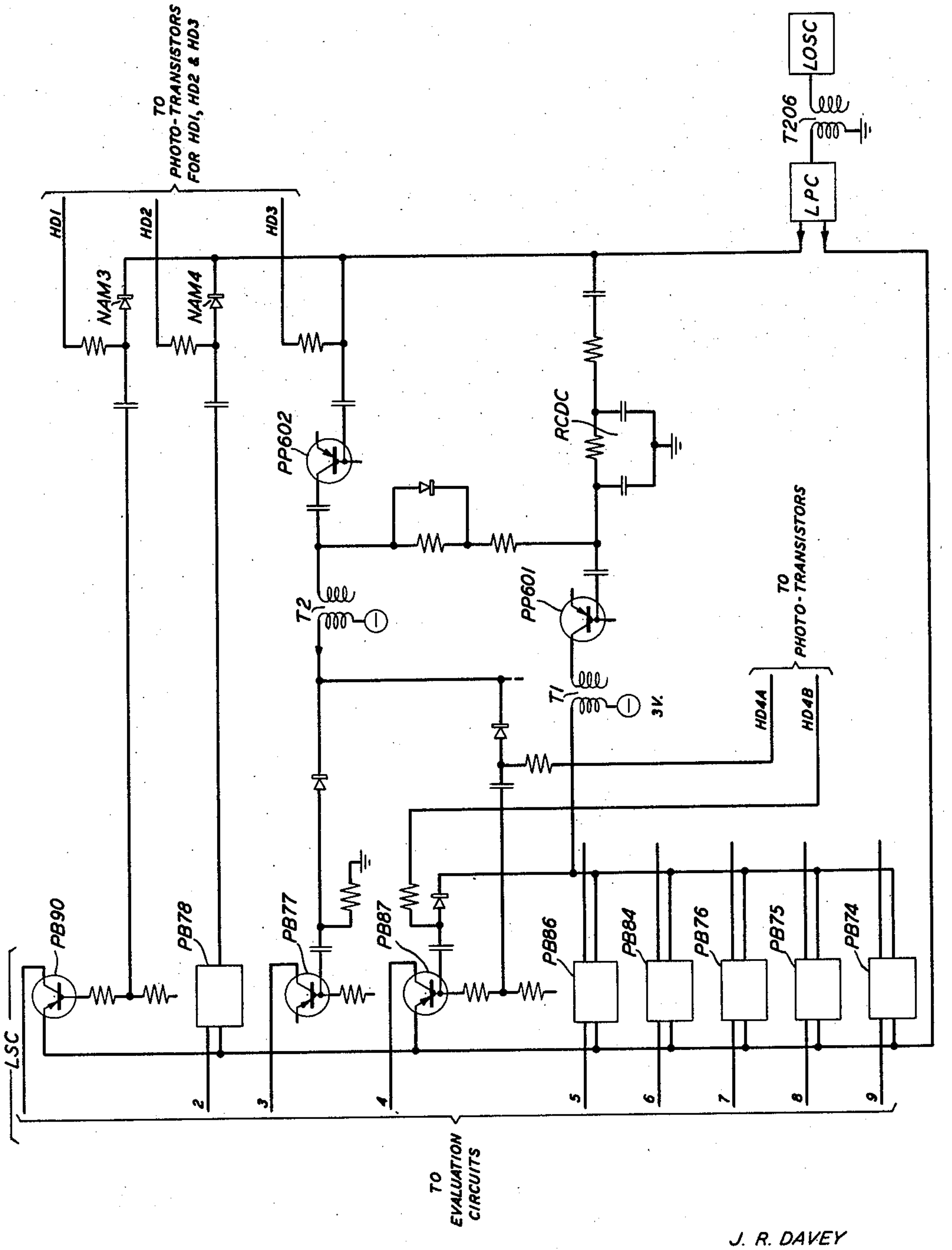
FIG. 17 is a circuit for controlling the indication or display of the angle of bearing of the enemy aircraft and the command heading or angle which the airplane is directed to take to effect interception.

Refer now to FIG. 17. The display of command heading and enemy bearing requires that it be relative to the heading of the aircraft. Storage is provided for the encoded heading of the aircraft and this data kept up to date by a program independent of the start-stop program of the rest of the terminal. The heading code disc s read by the same phototransistors as are used in reading into the transmitting shift register. However, the method of controlling the reading portion is somewhat different and is described below.

Local pulse amplifier LOSC at the bottom right in FIG. 17, is arranged as a relaxation oscillator and operates at about five cycles per second. Negative pulses from transformer T206 are used to trigger local pulse circuit LPC. The "set 0" pulse from pulse circuit LPC erases the previously stored data in the local storage circuit LSC, at the left in FIG. 17, for the heading information, and the following "gate" pulse from pulse circuit LPC initiates the read-in of the new data. The "gate" connects through a read-in gate, controlled by the A–B sample phototransistor HD3, to pulse amplifier PP602. Thus, if this phototransistor is illuminated pulse amplifier PP602 is triggered and a negative pulse from transformer T2 is obtained which reads the disc at the A position by way of read-in gates enabled by the A phototransistors. The "gate" pulse from pulse amplifier LPC also connects through a resistance-capacitance-delay circuit RCDC to pulse amplifier PP601, in the middle of FIG. 17. When pulse amplifier PP602 triggers, a positive transient from its collector is also fed to the input of pulse amplifier PP601. This positive transient cancels the slightly delayed "gate" pulse and prevents pulse amplifier PP601 from triggering if pulse amplifier PP602 is triggered. If pulse amplifier PP602 does not trigger, pulse amplifier PP601 is triggered by the negative "gate" pulse and a negative pulse is obtained from transformer T1 for reading at the B position. The reading at the B position is done by way of internal gates incorporated in the storage bit and gate circuits which are enabled by the B phototransistors. These bit circuits and the internal gates incorporated in them are described in B. Ostendorf, Jr. Patent 2,873,385, issued February 10, 1959.

The A–B sampling track HD3 of the code disc is read into storage by the A read pulse connected to bit storage circuit PB77 which has its gate permanently enabled. The "gate" pulse from pulse circuit LPC connects directly to the read-in gates NAM3 and NAM4 controlled by the phototransistors of the A group which read the code tracks having no ambiguity.

The stored aircraft heading information is evaluated as a voltage in the same way as is the incoming data. The aircraft heading is encoded as the "1's" complement as compared to the command heading and enemy bearing. This enables the two angles to be subtracted by "adding" the two evaluated voltages. Means are provided for limiting the magnitude of the expressed angular difference to a plus or minus 180-degree change. This is described in detail in J. R. Davey Patent 2,954,928, issued October 4, 1960, further identified in the foregoing.

What is claimed is:

1. A synchronized selective calling radio telegraph system having a central telegraph control station and a plurality of outlying telegraph stations, means, comprising a first oscillator and a first binary counter responsive to said oscillator, both at said control station for controlling the transmission of a frame of signal elements, said frame comprising a multi-element, two condition, permutation code signal combination of address signal elements for selectively addressing a particular one of said outlying stations, means, comprising an individual second oscillator, operable at substantially the same frequency as that of said first oscillator, and an individual second binary counter responsive to said second oscillator, both in each of said plurality of outlying stations for controlling the reception of said address combination and diode gate means in each of said outlying stations, responsive to its respective second binary counter thereat, for automatically testing said address to determine which station is addressed.

2. In a synchronized radio telegraph receiving station, means comprising an oscillator, synchronizing means for controlling said oscillator, and a binary counter, responsive to said oscillator, for receiving a telegraph multi element, two condition, permutation signal code combination, and diode gate means for comparing said received combination with an address combination assigned to said station.

3. A radio telegraph system, a radio telegraph receiver therein, a normally stopped oscillator in said receiver, means in said receiver, responsive to a preliminary group of signal elements, said group including oscillator phasing signal elements preceding an oscillator start signal element in an incoming signal frame, for starting said oscillator, diode gate means in said receiver, responsive to said starting, for comparing a group of address signal elements in said frame with an assigned combination constituting an address and means for stopping said oscillator incident to lack of correspondence between the received and assigned address combinations.

4. A radio telegraph receiver having an oscillator, means responsive to a preliminary group of signal elements in a signal frame received by said receiver for starting said oscillator in proper phase in relation with said signal elements in said frame, said group including oscillator phasing signal elements for controlling the phase of said oscillator followed by an oscillator start signal element for starting said oscillator, an address recognition diode gate in said receiver, counting means and shift pulse means both responsive to the starting of said oscillator, shift-register means jointly responsive to said shift-pulse means and said counting means for registering a succeeding group of signal elements, constituting the address of said receiver, means for transferring said address to said gate, and means responsive to the non-recognition of said address by said gate for stopping said oscillator.

5. A radio telegraph received in accordance with claim 4, including means responsive to the recognition of said address by said diode gate for effectively receiving subsequent intelligence bearing signal elements in said frame.

6. In combination, in a radio telegraph receiver, an oscillator, means for phasing and starting said oscillator in response to a preliminary group of signal elements in a frame of signal elements incoming to said receiver, a binary counter, means responsive to said oscillator for actuating said binary counter to count the oscillations of said oscillator, a matrix gate, means responsive to permutations of voltage conditions produced by said binary counter for conditioning said gate to pass a pulse at a predetermined count, means for temporarily storing a predetermined number of incoming signal elements of said frame, which elements in combination define an item of intelligence, and means responsive to the passage of said pulse for transferring said item from said temporary storage to final storage.

7. A radio telegraph receiver having storage means for temporarily storing a permutation code combination of received signal elements, defining a called receiver, said means comprising an individual storage element for each signal element of said combination, said signal elements of a plurality of conditions, a plurality of groups of signal condition sensing elements, one of said groups for each of said conditions, an individual sensing element in each respective group for each signal element of a corresponding condition in an assigned receiver address combination, a connection from each of said sensing elements to an individual one of said storage elements, said connections corresponding to the condition of the elements in the assigned address, each of said groups of sensing elements connected to an individual branch in a parallel branch gate circuit and means for applying a pulse to said gate, to test for the correspondence of said stored combination and said assigned combination.

8. In a radio telegraph system, a control center, means therein for transmitting a first and a second frame of signal elements, each of said frames comprising an address signal element combination and an intelligence bearing signal combination, means at a first and a second outlying station, responsive to the recognition of its respective address for effectively receiving its respective intelligence bearing signal combination in said first and said second frame, respectively, means in each of said outlying stations, responsive to the termination of reception of its respective frame, for measuring an interval equal to the duration of one of said frames, means at each of said first and said second outlying stations, responsive to the termination of its respective measured interval for transmitting a third and a fourth frame, respectively, and means at said central control station for receiving said third and fourth frames.

9. In a radio telegraph system, a central control station having means therein for transmitting successively a plurality of signal frames, a plurality of outlying stations, means at said outlying stations, responsive to a combination of signal elements in each of said frames for selectively effectively receiving an individual one of said frames, means in said outlying stations responsive to the termination of reception of its individual frame for measuring an interval and means at each of said outlying stations responsive to the termination of its respective measured interval for transmitting to said control center.

10. In a radio telegraph system, a control center, a first and a second outlying station, counting means at said control center for regulating a transmitting and receiving program, a first transmitting control responsive to said counting means for transmitting a first and a second signal frame to said first and said second outlying station, respectively, and a second receiving control responsive to said counting means and to the reception of said first and said second frame by said first and second outlying station, respectively, for receiving successively from said first and said second outlying station.

11. In a radio telegraph receiving system, a transmitting oscillator, a binary counter responsive to said oscillator, a matrix gate responsive to said binary counter, means for simultaneously generating a plurality of elements of a signal combination representing intelligence, a transmitting shift register, means responsive to said matrix gates for transferring said elements simultaneously to said shift register and means responsive to said oscillator for impressing said combination in said shift register, element by element on a radio transmitter.

12. A system in accordance with claim 11 having means for counting the number of elements of a particular signal condition in each combination and means for adding a single signal element of said condition to make the total number of signal elements of said condition predeterminedly either odd or even, as desired.

13. In a radio transmitting system, means for transmitting a plurality of signal combinations, each defining an item of intelligence in succession, said means comprising means including an oscillator for generating a multi-element permutation code signal combination for each of said items, a matrix gate responsive to said oscillator, a shift register, means responsive to said matrix gate, for impressing all of the elements of said combination simultaneously on said register, means responsive to said shift register for transmitting each of said combination in succession, element by element and other means responsive to said oscillator and another matrix gate for simultaneously adding a signal element of either of two conditions as required to the last preceding transmitted combination as a parity check, after the last element of each said combination is transmitted.

14. In a radio transmitting system, a plurality of groups of encoding devices for encoding a plurality of items of intelligence in a plurality of permutation code signal combinations, an oscillator, a binary counter responsive to said oscillator, an individual matrix gate for each of said items, said gates responsive to said binary counter, an individual read-in gate for each of said items, each said read-in gate responsive to an individual one of said matrix gates, means for passing an individual pulse at a plurality of predetermined counts through said matrix gates and through said read-in gates to impress each of said combinations, in its entirety, on said shift register, in succession, means for impressing each of said combinations in succession, element by element, on a radio transmitter, a parity binary counter also responsive to said oscillator for counting the number of elements of a particular condition in each of said combinations, another gate controlled by said counter and means responsive to said other gate for controlling the passage of said pulse to said transmitter, as a parity check for each of said combinations.

15. In a radio telegraph transmitting system, a central control station, a plurality of outlying stations, an individual position at said control station for each of said outlying stations, means at each of said positions for accumulating intelligence to be transmitted to its individual outlying station, a transmitting oscillator at said control center, a binary counter responsive to said oscillator, a matrix gate responsive to said counter, common transmitting equipment at said control station, a position start gate having an individual start control element therein for each of said positions, means at each of said positions for impressing a ready potential on its individual element in said gate to indicate that it is ready to transmit, means for periodically passing a pulse through said matrix gate to said elements in said start gate to selectively enable any one of said positions having a ready potential impressed on its individual element in said start gate and means responsive to the enablement of said one position for transmitting said intelligence thereat through said common transmitting equipment.

16. In a radio telegraph system, a central control station, a plurality of outlying stations, an individual position at said control station for each of said outlying stations, transmitting equipment at said control station common to all of said individual positions, means for selectively connecting said individual positions to said common equipment, said means comprising an individual gate for each said position, joint controls for each said gate, one of said joint controls being means at said position for impressing a potential on said gate incident to the ready condition of its connected position, the other of said controls being means for polling each of said positions in a predetermined order.

17. A system in accordance with claim 16, said polling means comprising an oscillator, a counter responsive to said oscillator, and a plurality of space discharge paths, one for each of said gates, responsive to said counter.

18. In a radio telegraph system, a polling circuit for interconnecting a plurality of data positions individually to common transmitting equipment, said polling circuit comprising an individual enabling gate for each of said positions, joint controls for said gate, one of said joint controls being a timed sub-frame counter, a space discharge device responsive to said counter, a diode gate responsive to said discharge device when one of said data positions is waiting to transmit, and another of said joint controls being an entire program frame counter, a timing circuit responsive to said frame counter and a diode gate responsive to said timing circuit when said common transmitting equipment is available for connection to said waiting position.

19. In a radio telegraph transmitting and receiving system, a control center, a plurality of outlying stations, an individual control position in said center for each of said outlying stations, an oscillator and a timed binary counter responsive to said oscillator, for controlling the transmission of a signal frame from said center to any one of said outlying stations and means comprising a section of said timed binary counter and a matrix gate responsive to said section for polling a plurality of said control positions during the interval while said frame is being transmitted, to determine if any of said polled positions is in condition to transmit.

20. A system in accordance with claim 19, common telegraph transmitting means at said center and means responsive to the finding of a position ready to transmit in response to said polling for connecting said ready position to said common means.

21. In a radio telegraph system, a central telegraph transmitting and receiving station, common telegraph transmitting and common telegraph receiving equipment thereat, a plurality of individual outlying telegraph stations, individual position control positions at said central station for each of said outlying stations, a position sequence control circuit at said central station for interconnecting said positions individually to said common transmitting and receiving equipment, said sequence control circuit comprising a plurality of space discharge paths said paths responsive to a binary counter, said counter controlled by an oscillator, and testing means, jointly controlled by said common equipment and said individual positions for controlling said position sequence control circuit.

22. In a radio telegraph system, a plurality of outlying stations, a central control station, means for intercommunicating selectively between said central control station and any individual one of said outlying stations, said means comprising common transmitting control equipment at said central control station for all of said outlying stations and position equipment at said central control station individual to each of said outlying stations, said means comprising also means for selectively interconnecting an individual position equipment to said common equipment, means in said position equipment, responsive to said interconnection for impressing a code combination of signal elements, defining an address of its individual outlying station, on said common transmitting equipment, means in each of said outlying stations for receiving said address combination, means in each of said outlying stations for temporarily storing said address combination, and diode gate means in each of said outlying stations for testing said stored address combination to select the particular addressed outlying station.

23. A system in accordance with claim 22 including means at said central control station for first transmitting to a plurality of said outlying stations in succession and means for thereafter receiving from said plurality of outlying stations in succession.

24. A system in accordance with claim 22, said position equipment having means for producing a second code combination of signal elements defining an item of intelligence, means for impressing said second combination on said common transmitting equipment, means in the selected outlying station for storing said second combination, and means in said other outlying station for rejecting said second combination.

25. A system in accordance with claim 22 including means in said selected outlying station, responsive to its selection for transmitting to said central control station and means at said central control station for identifying said transmission from said selected outlying station as being transmitted from said selected outlying station.

26. A system in accordance with claim 22, said system including means at said selected outlying station, responsive to its selection, for thereafter receiving another signal combination and means in said non-selected outlying station for rejecting said other signal combination.

27. A system in accordance with claim 22, having means in said common equipment at said central station for transmitting a frame of signals including said address combination and a combination defining an item of intelligence and means in said common equipment at said control station for transmitting a group of preliminary signals prior to said address combination, an oscillator in each of said outlying stations and means responsive to said preliminary signals for starting said oscillators in proper phase.

28. In a radio telegraph system, a central control station, a plurality of outlying stations, an oscillator at each of said stations, a program binary counter responsive to said oscillator at said control station, a plurality of matrix gates responsive to said counter, common transmitting control equipment and individual position control equipment at said central station, means responsive to said position control equipment and said matrix gates for producing a signal frame and impressing said frame on said transmitting control equipment, said frame comprising a preliminary group of signal elements for starting said oscillators at said outlying stations, an address signal combination for selecting a particular one of said outlying stations and a data signal combination, means at each of said outlying stations for receiving said preliminary signal elements, means responsive to the reception of said preliminary signal elements for starting each of said oscillators at said outlying stations, means at each of said outlying stations responsive to said starting for receiving said address combination, means responsive to the reception of said address for comparing said address with an address assigned to each of said outlying stations, means responsive to said comparison for selecting one of said outlying stations, and means responsive to said selection for receiving said data combination.

29. A system in accordance with claim 28, having a program binary counter at each of said outlying stations responsive to said oscillator thereat, a plurality of matrix gates responsive to each of said oscillators at said outlying stations, and means responsive to said gates at said outlying stations for controlling the reception of an incoming signal frame, means responsive to said gates for thereafter measuring an interval equal in duration to that of another signal frame before said selected station transmits and means responsive to the measuring of said interval for thereafter transmitting a signal frame from said outlying station.

30. In a radio telegraph transmitting system, an oscillator, each cycle of said oscillator defining a signal interval of normal duration, means responsive to said oscillator for producing a first and a second pulse, said pulses closely spaced, at the beginning of each said interval, a source of data signals, a flip-flop circuits, a gate controlled jointly by said second pulse and said data signals, said source connected through said gate to said flip-flop circuit, means responsive to the impressing of said first pulse on said flip-flop circuit for producing a first signaling condition therein, at the beginning of each said signal interval, means in said gate, jointly responsive to said second pulse and to a first condition of a data signal element, both impressed on said gate, for leaving said first condition in said flip-flop circuit throughout substantially said interval of normal duration, means in said gate jointly responsive to said second pulse and to a second condition of said data signal element, both impressed on said gate, for producing a second condition in said flip-flop circuit, shortly after the beginning of said signal interval of normal duration, at a first time, a delay circuit intermediate said oscillator and said flip-flop circuit for producing other delayed pulses, and means connected to said gate, responsive to said delayed pulses for producing said second condition in said flip-flop circuit, substantially at the middle of said signal interval, at a second time.

31. A system in accordance with claim 30, a binary counter responsive to said oscillator, a plurality of matrix gates responsive to said counter and means responsive to said gates, and interconnecting said gates and said flip-flop, for selectively producing said conditions at predetermined counts.

References Cited in the file of this patent

UNITED STATES PATENTS

| | | |
|---|---|---|
| 2,152,010 | Zenner | Mar. 28, 1939 |
| 2,369,935 | Bacon | Feb. 20, 1945 |
| 2,398,150 | Mumma et al. | Apr. 9, 1946 |
| 2,404,047 | Flory et al. | July 16, 1946 |
| 2,530,957 | Gilman | Nov. 21, 1950 |
| 2,582,218 | Slayton | Jan. 15, 1952 |
| 2,599,904 | Evans | June 10, 1952 |
| 2,689,950 | Bayliss et al. | Sept. 21, 1954 |
| 2,697,549 | Hobbs | Dec. 21, 1954 |
| 2,723,080 | Curtis | Nov. 8, 1955 |
| 2,746,106 | Phelps | Mar. 27, 1956 |